US012634250B2

(12) United States Patent
    Rosenberg et al.

(10) Patent No.:     US 12,634,250 B2
(45) **Date of Patent:     *May 19, 2026**

(54) METHOD AND SYSTEM FOR ENABLING REAL-TIME AI-FACILITATED CONVERSATION AMONG LARGE NETWORKED HUMAN GROUPS

(71) Applicant: Unanimous A.I., Inc., Arlington, VA (US)

(72) Inventors: Louis B. Rosenberg, San Luis Obispo, CA (US); Gregg Willcox, Seattle, WA (US); Hans Schumann, San Francisco, CA (US)

(73) Assignee: Unanimous A. I., Inc., Arlington, VA (US)

( * ) Notice: Subject to any disclaimer, the term of this patent is extended or adjusted under 35 U.S.C. 154(b) by 70 days.

This patent is subject to a terminal disclaimer.

(21) Appl. No.: 18/949,863

(22) Filed: Nov. 15, 2024

(65) Prior Publication Data

US 2025/0080481 A1      Mar. 6, 2025

Related U.S. Application Data

(63) Continuation of application No. 18/657,612, filed on May 7, 2024, now Pat. No. 12,231,383, and a
(Continued)

(51) Int. Cl.
    *H04L 51/216*          (2022.01)
    *G06F 15/16*           (2006.01)
    (Continued)

(52) U.S. Cl.
    CPC ............ *H04L 51/046* (2013.01); *G06F 40/20* (2020.01); *H04L 51/04* (2013.01); *H04L 51/216* (2022.05);
    (Continued)

(58) Field of Classification Search
    CPC ..... H04L 51/216; H04L 51/046; H04L 51/56; H04L 51/04; H04L 65/401; G06F 40/20; G06F 15/16; G06F 3/048; G06N 20/10
    See application file for complete search history.

(56) References Cited

U.S. PATENT DOCUMENTS 5,867,799 A      2/1999  Lang
6,567,797 B1     5/2003  Schuetze
        (Continued)

OTHER PUBLICATIONS

Rosenberg et al; "Hyperchat and Hypervideo: Enabling Real-time Groupwise Conversations at Unlimited Scale"; 2025 IEEE 6th Annual World AI IoT Congress; May 1, 2025; pp. 530-536.
        (Continued)

*Primary Examiner* — Alina A Boutah
*Assistant Examiner* — Adam A Cooney
(74) *Attorney, Agent, or Firm* — Fitch, Even, Tabin & Flannery LLP

(57) ABSTRACT

The present disclosure describes systems and methods for enabling real-time conversational dialog among a large population of networked human users while facilitating convergence on groupwise decisions, insight extraction, and solutions, and amplifying collective intelligence. A plurality of computing devices associated with members of a population of participants is provided, wherein the plurality of computing devices is networked via a computer network and in communication with a central server. In some cases, the central server divides the population into a plurality of subgroups and enables an LLM-powered conversational surrogate agent associated with each subgroup. The conversational surrogate agent is configured to repeatedly observe a conversation among members of its assigned subgroup and store content of the conversation to extract insights from the conversation at appropriate intervals. The conversational surrogate agent assesses a numerical measure of conviction,
        (Continued)

confidence, or scope associated with each unique insight within the conversation, passes the insights and the numerical measure to other subgroups and modulates a strength of the insights based on the numerical measures.

40 Claims, 25 Drawing Sheets

Related U.S. Application Data continuation-in-part of application No. 18/588,851, filed on Feb. 27, 2024, now Pat. No. 12,166,735, which is a continuation of application No. 18/240,286, filed on Aug. 30, 2023, now Pat. No. 11,949,638, said application No. 18/657,612 is a continuation-in-part of application No. 18/367,089, filed on Sep. 12, 2023, now Pat. No. 12,190,294, and a continuation-in-part of application No. 18/240,286, filed on Aug. 30, 2023, now Pat. No. 11,949,638.

(60) Provisional application No. 63/547,705, filed on Nov. 8, 2023, provisional application No. 63/548,107, filed on Nov. 10, 2023, provisional application No. 63/449,986, filed on Mar. 4, 2023, provisional application No. 63/451,614, filed on Mar. 12, 2023, provisional application No. 63/456,483, filed on Apr. 1, 2023.

(51) Int. Cl.

| | |
|---|---|
| *G06F 40/20* | (2020.01) |
| *G06N 20/10* | (2019.01) |
| *H04L 51/04* | (2022.01) |
| *H04L 51/046* | (2022.01) |
| *H04L 51/56* | (2022.01) |
| *H04L 65/401* | (2022.01) |
| *G06F 3/048* | (2013.01) |

(52) U.S. Cl.
CPC ............ *H04L 51/56* (2022.05); *H04L 65/401* (2022.05); *G06F 3/048* (2013.01); *G06F 15/16* (2013.01); *G06N 20/10* (2019.01)

(56) References Cited

U.S. PATENT DOCUMENTS

| | | | |
|---|---|---|---|
| 6,606,615 B1 | 8/2003 | Jennings | |
| 6,792,399 B1 | 9/2004 | Phillips | |
| 6,903,723 B1 | 6/2005 | Forest | |
| 7,040,982 B1 | 5/2006 | Jarvis | |
| 7,155,510 B1 | 12/2006 | Kaplan | |
| 7,451,213 B2 | 11/2008 | Kaplan | |
| 7,624,077 B2 | 11/2009 | Bonabeau | |
| 7,653,726 B2 | 1/2010 | Kaplan | |
| 7,690,991 B2 | 4/2010 | Black | |
| 7,856,602 B2 | 12/2010 | Armstrong | |
| 7,880,741 B2 | 2/2011 | Proebsting | |
| 7,937,285 B2 | 5/2011 | Goldberg | |
| 7,958,006 B2 | 6/2011 | Keil | |
| 8,209,250 B2 | 6/2012 | Bradway | |
| 8,229,824 B2 | 7/2012 | Berg | |
| 8,250,071 B1 | 8/2012 | Killalea | |
| 8,341,065 B2 | 12/2012 | Berg | |
| 8,396,777 B1 | 3/2013 | Fine | |
| 8,468,580 B1 | 6/2013 | Casey | |
| 8,583,470 B1 | 11/2013 | Fine | |
| 8,612,331 B2 | 12/2013 | Hanson | |
| 8,660,972 B1 | 2/2014 | Heidenreich | |
| 8,676,735 B1 | 3/2014 | Heidenreich | |
| 8,682,837 B2 | 3/2014 | Skelton | |
| 8,814,660 B2 | 8/2014 | Thompson | |
| 8,858,313 B1 | 10/2014 | Selfors | |
| 9,005,016 B2 | 4/2015 | Amaitis | |
| 9,772,759 B2 | 9/2017 | Hogan | |
| 9,852,239 B2 | 12/2017 | Natarajan | |
| 9,947,174 B2 | 4/2018 | Rangarajan | |
| 10,277,645 B2 | 4/2019 | Rosenberg | |
| 10,310,802 B2 | 6/2019 | Rosenberg | |
| 10,353,551 B2 | 7/2019 | Rosenberg | |
| 10,410,287 B2 | 9/2019 | Marsh | |
| 10,515,516 B1 | 12/2019 | Eckman | |
| 10,551,999 B2 * | 2/2020 | Rosenberg | .......... G06F 3/04847 |
| 10,713,303 B2 | 7/2020 | Ashoori | |
| 10,817,158 B2 | 10/2020 | Rosenberg | |
| 10,902,194 B2 | 1/2021 | Toronto | |
| 11,037,400 B2 | 6/2021 | Cohen | |
| 11,360,656 B2 | 6/2022 | Rosenberg | |
| 11,949,638 B1 | 4/2024 | Rosenberg | |
| 12,001,667 B2 | 6/2024 | Rosenberg | |
| 12,166,735 B2 | 12/2024 | Rosenberg | |
| 12,190,294 B2 | 1/2025 | Rosenberg | |
| 12,231,383 B2 | 2/2025 | Rosenberg | |
| 12,234,383 B2 | 2/2025 | Rosenberg | |
| 2002/0152110 A1 | 10/2002 | Stewart | |
| 2003/0023685 A1 | 1/2003 | Cousins | |
| 2003/0033193 A1 | 2/2003 | Holloway | |
| 2003/0079218 A1 | 4/2003 | Goldberg | |
| 2003/0088458 A1 | 5/2003 | Afeyan | |
| 2003/0100357 A1 | 5/2003 | Walker | |
| 2003/0119579 A1 | 6/2003 | Walker | |
| 2003/0208535 A1 * | 11/2003 | Appleman | ............ G06F 16/986 707/E17.116 |
| 2003/0210227 A1 | 11/2003 | Smith | |
| 2003/0227479 A1 | 12/2003 | Mizrahi | |
| 2004/0015429 A1 | 1/2004 | Tighe | |
| 2004/0064394 A1 | 4/2004 | Wallman | |
| 2005/0067493 A1 | 3/2005 | Urken | |
| 2006/0010057 A1 | 1/2006 | Bradway | |
| 2006/0204945 A1 | 9/2006 | Masuichi | |
| 2006/0287907 A1 | 12/2006 | Kim | |
| 2007/0011073 A1 | 1/2007 | Gardner | |
| 2007/0055610 A1 | 3/2007 | Palestrant | |
| 2007/0067211 A1 | 3/2007 | Kaplan | |
| 2007/0073606 A1 | 3/2007 | Lai | |
| 2007/0078977 A1 | 4/2007 | Kaplan | |
| 2007/0094601 A1 | 4/2007 | Greenberg | |
| 2007/0099162 A1 | 5/2007 | Sekhar | |
| 2007/0208727 A1 | 9/2007 | Saklikar | |
| 2007/0209069 A1 | 9/2007 | Saklikar | |
| 2007/0216712 A1 | 9/2007 | Louch | |
| 2007/0226296 A1 | 9/2007 | Lowrance | |
| 2008/0003559 A1 | 1/2008 | Toyama | |
| 2008/0016463 A1 | 1/2008 | Marsden | |
| 2008/0103877 A1 | 5/2008 | Gerken | |
| 2008/0140477 A1 | 6/2008 | Tevanian | |
| 2008/0140688 A1 | 6/2008 | Clayton | |
| 2008/0189634 A1 | 8/2008 | Tevanian | |
| 2009/0063379 A1 | 3/2009 | Kelly | |
| 2009/0063991 A1 | 3/2009 | Baron | |
| 2009/0063995 A1 | 3/2009 | Baron | |
| 2009/0073174 A1 | 3/2009 | Berg | |
| 2009/0076939 A1 | 3/2009 | Berg | |
| 2009/0076974 A1 | 3/2009 | Berg | |
| 2009/0170595 A1 | 7/2009 | Walker | |
| 2009/0182624 A1 | 7/2009 | Koen | |
| 2009/0239205 A1 | 9/2009 | Morgia | |
| 2009/0276764 A1 | 11/2009 | Ghorbani | |
| 2010/0100204 A1 | 4/2010 | Ng | |
| 2010/0144426 A1 | 6/2010 | Winner | |
| 2010/0145715 A1 | 6/2010 | Cohen | |
| 2010/0198648 A1 | 8/2010 | Bank | |
| 2010/0199191 A1 | 8/2010 | Takahashi | |
| 2010/0205541 A1 | 8/2010 | Rapaport | |
| 2011/0003627 A1 | 1/2011 | Nicely | |
| 2011/0016137 A1 | 1/2011 | Goroshevsky | |
| 2011/0208328 A1 | 8/2011 | Cairns | |
| 2011/0320374 A1 | 12/2011 | Wang | |
| 2012/0011006 A1 | 1/2012 | Schultz | |
| 2012/0042013 A1 | 2/2012 | Roman | |
| 2012/0088222 A1 | 4/2012 | Considine | |

(56) References Cited

U.S. PATENT DOCUMENTS

| | | |
|---|---|---|
| 2012/0101933 A1 | 4/2012 | Hanson |
| 2012/0110087 A1 | 5/2012 | Culver |
| 2012/0179755 A1 | 7/2012 | Fishkin |
| 2012/0191774 A1 | 7/2012 | Bhaskaran |
| 2012/0233229 A1 | 9/2012 | Steiner |
| 2012/0290950 A1 | 11/2012 | Rapaport |
| 2012/0322540 A1 | 12/2012 | Shechtman |
| 2013/0035981 A1 | 2/2013 | Brown |
| 2013/0097245 A1 | 4/2013 | Adarraga |
| 2013/0132284 A1 | 5/2013 | Convertino |
| 2013/0184039 A1 | 7/2013 | Steir |
| 2013/0191181 A1 | 7/2013 | Balestrieri |
| 2013/0203506 A1 | 8/2013 | Brown |
| 2013/0254146 A1 | 9/2013 | Ellis |
| 2013/0311904 A1 | 11/2013 | Tien |
| 2013/0317966 A1 | 11/2013 | Bass |
| 2014/0012780 A1 | 1/2014 | Sanders |
| 2014/0057240 A1 | 2/2014 | Colby |
| 2014/0074751 A1 | 3/2014 | Rocklitz |
| 2014/0075004 A1 | 3/2014 | Van Dusen |
| 2014/0087841 A1 | 3/2014 | Council |
| 2014/0089233 A1 | 3/2014 | Ellis |
| 2014/0100924 A1 | 4/2014 | Ingenito |
| 2014/0108293 A1 | 4/2014 | Barrett |
| 2014/0128162 A1 | 5/2014 | Arafat |
| 2014/0155142 A1 | 6/2014 | Conroy |
| 2014/0162241 A1 | 6/2014 | Morgia |
| 2014/0214831 A1 | 7/2014 | Chi |
| 2014/0257930 A1 | 9/2014 | Lehmann |
| 2014/0278835 A1 | 9/2014 | Moseson |
| 2014/0279625 A1 | 9/2014 | Carter |
| 2014/0282586 A1 | 9/2014 | Shear |
| 2014/0337097 A1 | 11/2014 | Farlie |
| 2014/0358825 A1 | 12/2014 | Phillipps |
| 2014/0364181 A1 | 12/2014 | Emura |
| 2015/0012339 A1 | 1/2015 | Onischuk |
| 2015/0065214 A1 | 3/2015 | Olson |
| 2015/0089399 A1 | 3/2015 | Megill |
| 2015/0120619 A1 | 4/2015 | Baughman |
| 2015/0156233 A1 | 6/2015 | Bergo |
| 2015/0170050 A1 | 6/2015 | Price |
| 2015/0236866 A1* | 8/2015 | Colby ................... H04L 67/104 |
| | | 709/205 |
| 2015/0242755 A1 | 8/2015 | Gross |
| 2015/0294527 A1 | 10/2015 | Kolomiiets |
| 2015/0302308 A1 | 10/2015 | Bartek |
| 2015/0310687 A1 | 10/2015 | Morgia |
| 2015/0331601 A1 | 11/2015 | Rosenberg |
| 2015/0339020 A1 | 11/2015 | D Amore |
| 2015/0347903 A1 | 12/2015 | Saxena |
| 2015/0378587 A1 | 12/2015 | Falaki |
| 2016/0034305 A1 | 2/2016 | Shear |
| 2016/0044073 A1 | 2/2016 | Rosenberg |
| 2016/0048274 A1 | 2/2016 | Rosenberg |
| 2016/0055236 A1 | 2/2016 | Frank |
| 2016/0057182 A1 | 2/2016 | Rosenberg |
| 2016/0062735 A1 | 3/2016 | Wilber |
| 2016/0078458 A1 | 3/2016 | Gold |
| 2016/0082348 A1 | 3/2016 | Kehoe |
| 2016/0092989 A1 | 3/2016 | Marsh |
| 2016/0098778 A1 | 4/2016 | Blumenthal |
| 2016/0133095 A1 | 5/2016 | Shraibman |
| 2016/0170594 A1 | 6/2016 | Rosenberg |
| 2016/0170616 A1 | 6/2016 | Rosenberg |
| 2016/0189025 A1 | 6/2016 | Hayes |
| 2016/0274779 A9 | 9/2016 | Rosenberg |
| 2016/0335647 A1 | 11/2016 | Rebrovick |
| 2016/0349976 A1 | 12/2016 | Lauer |
| 2016/0357418 A1 | 12/2016 | Rosenberg |
| 2016/0366200 A1 | 12/2016 | Healy |
| 2017/0091633 A1 | 3/2017 | Vemula |
| 2017/0300198 A1 | 10/2017 | Rosenberg |
| 2017/0337498 A1 | 11/2017 | Rahimi |
| 2018/0204184 A1 | 7/2018 | Rosenberg |
| 2018/0205676 A1* | 7/2018 | Goyal ..................... H04L 51/04 |

| | | |
|---|---|---|
| 2018/0302233 A1 | 10/2018 | Viera |
| 2018/0375676 A1 | 12/2018 | Bader-Natal |
| 2019/0066133 A1 | 2/2019 | Cotton |
| 2019/0121529 A1 | 4/2019 | Rosenberg |
| 2020/0005341 A1 | 1/2020 | Marsh |
| 2020/0265194 A1 | 8/2020 | Ohbitsu |
| 2020/0287849 A1 | 9/2020 | G |
| 2021/0004150 A1 | 1/2021 | Rosenberg |
| 2021/0136023 A1* | 5/2021 | Chang .................... G06Q 50/20 |
| 2021/0150443 A1 | 5/2021 | Shih |
| 2021/0209554 A1 | 7/2021 | Hill |
| 2021/0409354 A1* | 12/2021 | Jang ........................ H04L 51/04 |
| 2022/0276774 A1 | 9/2022 | Rosenberg |
| 2023/0236718 A1 | 7/2023 | Rosenberg |
| 2024/0177171 A1 | 5/2024 | Thangappa |
| 2024/0296420 A1 | 9/2024 | Rosenberg |
| 2024/0297857 A1 | 9/2024 | Rosenberg |
| 2024/0297858 A1 | 9/2024 | Rosenberg |
| 2024/0297859 A1 | 9/2024 | Rosenberg |
| 2024/0305711 A1 | 9/2024 | Yekollu |
| 2024/0323152 A1 | 9/2024 | Rosenberg |
| 2025/0016124 A1 | 1/2025 | Rosenberg |
| 2025/0055820 A1 | 2/2025 | Rosenberg |
| 2025/0078033 A1 | 3/2025 | Rosenberg |
| 2025/0141820 A1 | 5/2025 | Rosenberg |

OTHER PUBLICATIONS

Rosenberg et al: "Conversational Swarms of Humans and AI Agents enable Hybrid Collaborative Decision-making"; IEEE 15th Annual Ubiquitous Computing, Electronics, and Mobile Communications Conference Oct. 2024; published online Sep. 22, 2024; 7 pages.

Rosenberg; "Collective Superintelligence: Enabling Real-Time Conversational Deliberations Among Humans and AI Agents at Unprecedented Scale"; Foundations and Frontiers in Decision Science; IntechOpen; Jun. 9, 2025; 21 pages.

Rosenberg; U.S. Appl. No. 19/241,852, filed Jun. 18, 2025.

USPTO; Non-Final Office Action issued in U.S. Appl. No. 18/639,963 mailed Jun. 16, 2025.

PCT; International Search Report and Written Opinion of the International Searching Authority for PCT/US2024/017887 mailed Apr. 11, 2024.

Puleston et al.; "Predicting the Future: Primary Research Exploring the Science of Prediction"; Copyright Esomar 2014; 31 pages; (Year: 2014).

Quora; "What are Some Open Source Prediction Market Systems?"; retrieved from https://www.quora.com/What-are-some-Open-Source-Prediction-Market-systems; on Mar. 19, 2020 (Year: 2016).

Rosenberg et al; U.S. Appl. No. 18/657,612, filed May 7, 2024.

Rosenberg; U.S. Appl. No. 17/024,580, filed Sep. 17, 2020.

Rosenberg; U.S. Appl. No. 14/925,837, filed Oct. 28, 2015.

Rosenberg; U.S. Appl. No. 16/230,759, filed Dec. 21, 2018.

Rosenberg; U.S. Appl. No. 17/744,464, filed May 13, 2022.

Rosenberg; U.S. Appl. No. 18/194,056, filed Mar. 31, 2023.

Rosenberg; U.S. Appl. No. 18/240,286, filed Aug. 30, 2023.

Rosenberg; U.S. Appl. No. 18/367,089, filed Sep. 12, 2023.

Rosenberg; U.S. Appl. No. 18/584,802, filed Feb. 22, 2024.

Rosenberg; U.S. Appl. No. 18/588,851, filed Feb. 27, 2024.

Rosenberg; U.S. Appl. No. 18/639,963, filed Apr. 19, 2024.

Rosenberg; U.S. Appl. No. 18/676,768, filed May 29, 2024.

Rosenberg; U.S. Appl. No. 18/887,029, filed Sep. 16, 2024.

Rosenberg; U.S. Appl. No. 18/931,511, filed Oct. 30, 2024.

Rosenberg; U.S. Appl. No. 18/949,891, filed Nov. 15, 2024.

Rosenberg; U.S. Appl. No. 19/007,215, filed Dec. 31, 2024.

USPTO; Final Office Action issued in U.S. Appl. No. 14/925,837 mailed Aug. 7, 2019.

USPTO; Non-Final Office Action for U.S. Appl. No. 17/024,580 mailed Nov. 23, 2021.

USPTO; Non-Final Office Action for U.S. Appl. No. 16/230,759 mailed Mar. 26, 2020.

USPTO; Non-Final Office Action for U.S. Appl. No. 18/584,802 mailed Sep. 30, 2024.

USPTO; Non-Final Office Action issued in U.S. Appl. No. 14/925,837 mailed Apr. 3, 2018.

(56)              References Cited

OTHER PUBLICATIONS

USPTO; Notice of Allowance for U.S. Appl. No. 17/024,580 mailed
Apr. 12, 2022.
USPTO; Notice of Allowance for U.S. Appl. No. 18/240,286 mailed
Jan. 31, 2024.
USPTO; Notice of Allowance for U.S. Appl. No. 16/230,759 mailed
Jul. 17, 2020.
USPTO; Notice of Allowance for U.S. Appl. No. 18/194,056 mailed
Nov. 20, 2023.
USPTO; Notice of Allowance for U.S. Appl. No. 18/657,612 mailed
Oct. 3, 2024.
USPTO; Notice of Allowance for U.S. Appl. No. 14/925,837 mailed
Nov. 7, 2019.
USPTO; Notice of Allowance issued in U.S. Appl. No. 17/744,464
mailed Dec. 20, 2023.
USPTO; Notice of Allowance issued in U.S. Appl. No. 17/744,464
mailed Oct. 24, 2023.
USPTO; Notice of Allowance issued in U.S. Appl. No. 18/588,851
mailed Sep. 26, 2024.
USPTO; Notice of Allowance issued in U.S. Appl. No. 19/367,089
mailed Oct. 9, 2024.

* cited by examiner

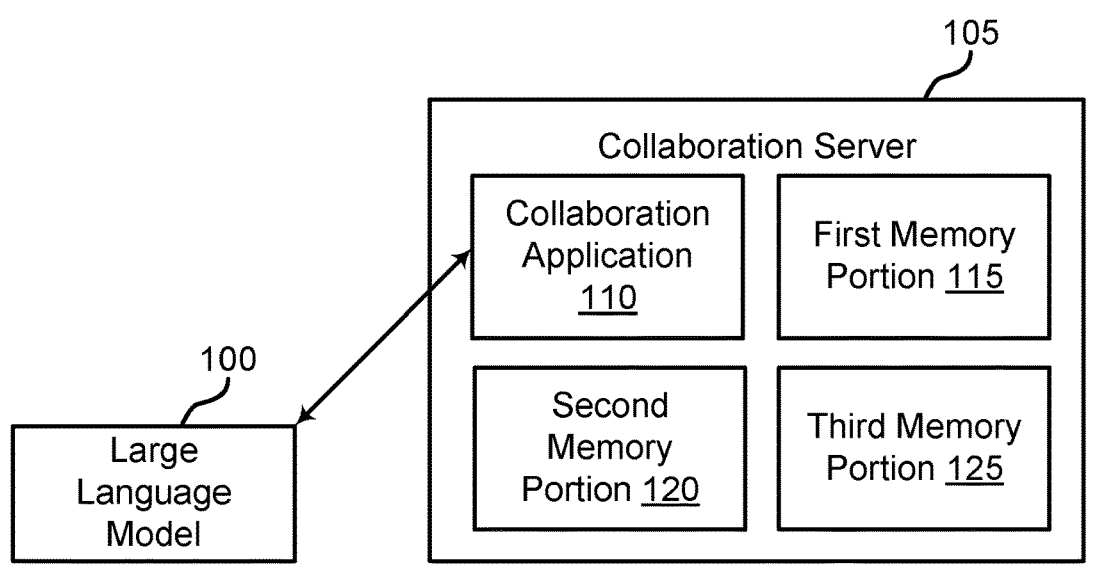
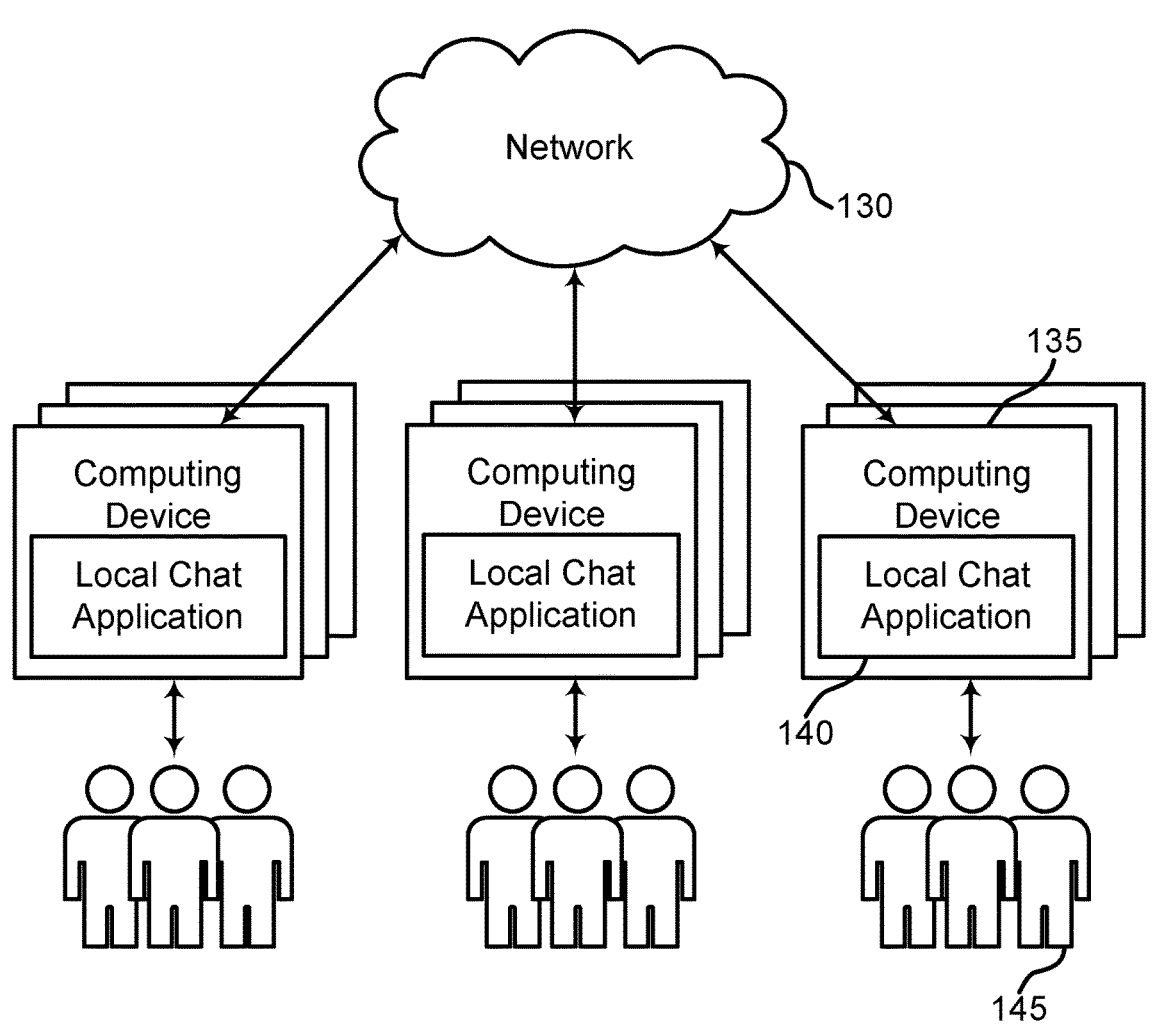
FIG. 1

Hyper Chat

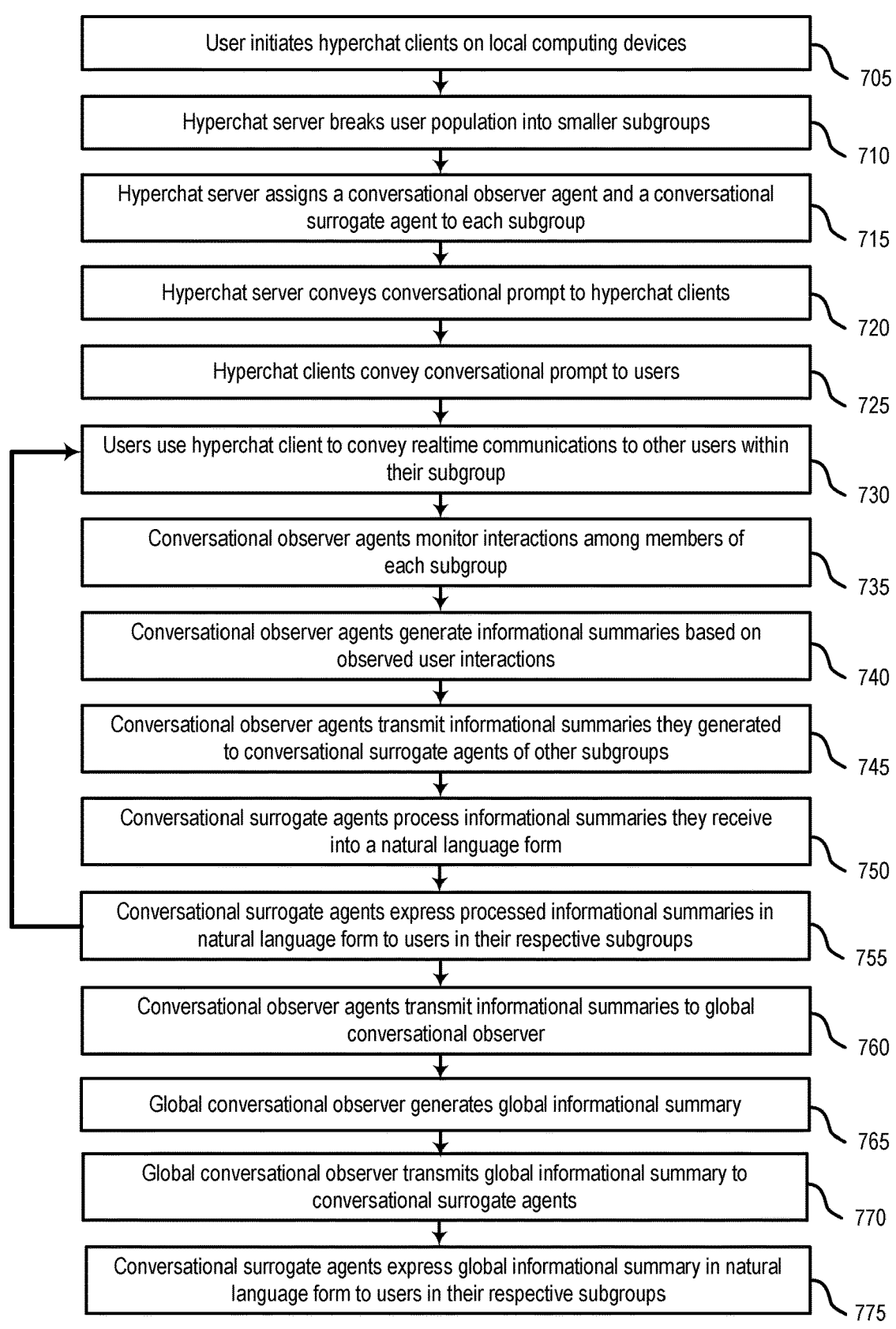

User initiates hyperchat clients on local computing devices — 705

Hyperchat server breaks user population into smaller subgroups — 710

Hyperchat server assigns a conversational observer agent and a conversational surrogate agent to each subgroup — 715

Hyperchat server conveys conversational prompt to hyperchat clients — 720

Hyperchat clients convey conversational prompt to users — 725

Users use hyperchat client to convey realtime communications to other users within their subgroup — 730

Conversational observer agents monitor interactions among members of each subgroup — 735

Conversational observer agents generate informational summaries based on observed user interactions — 740

Conversational observer agents transmit informational summaries they generated to conversational surrogate agents of other subgroups — 745

Conversational surrogate agents process informational summaries they receive into a natural language form — 750

Conversational surrogate agents express processed informational summaries in natural language form to users in their respective subgroups — 755

Conversational observer agents transmit informational summaries to global conversational observer — 760

Global conversational observer generates global informational summary — 765

Global conversational observer transmits global informational summary to conversational surrogate agents — 770

Conversational surrogate agents express global informational summary in natural language form to users in their respective subgroups — 775

FIG. 7        700

Figure 11:
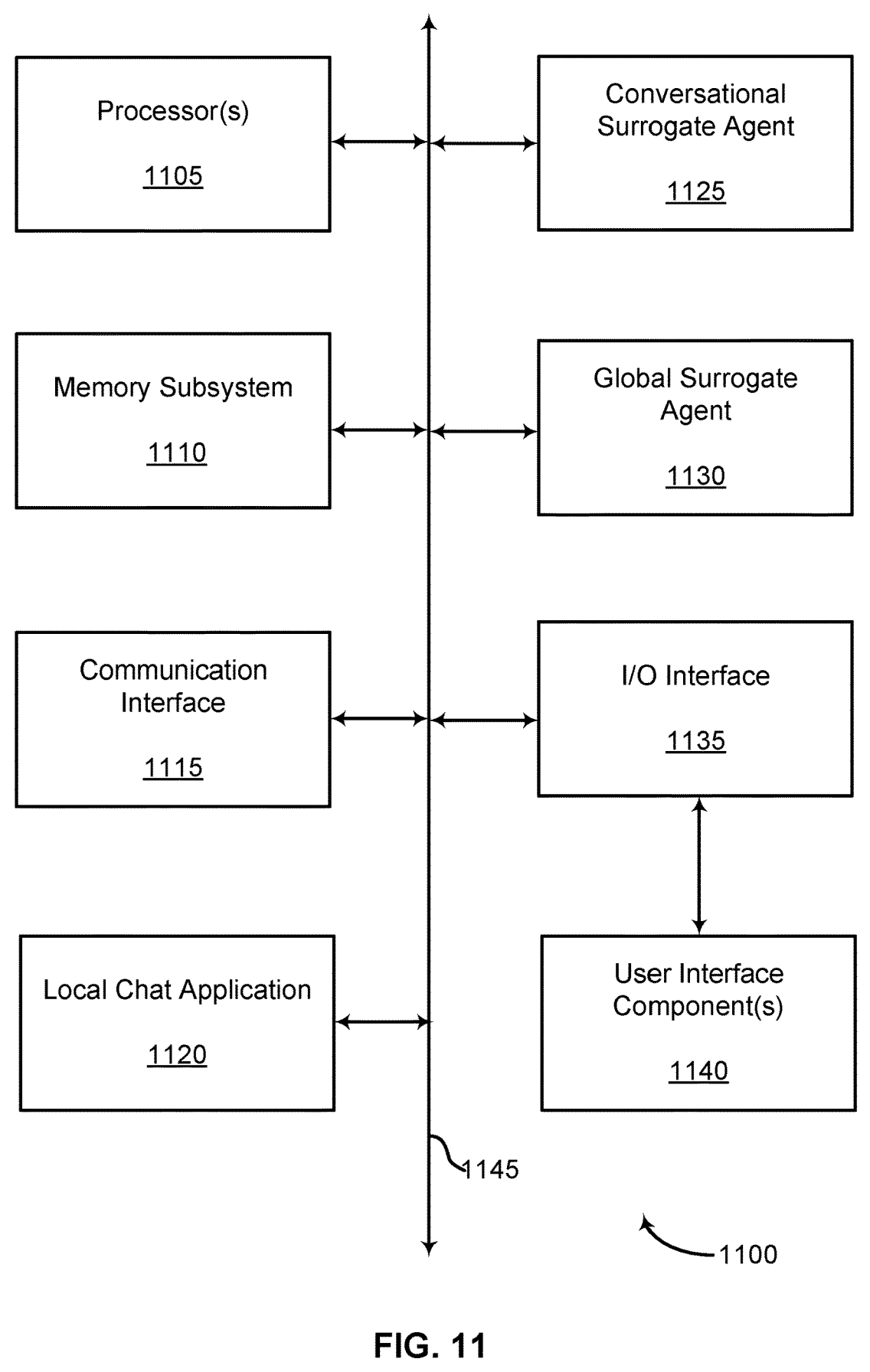

```
┌─────────────────────┐              ┌─────────────────────┐
│                     │              │  Conversational     │
│   Processor(s)      │◄────────────►│  Surrogate Agent    │
│                     │              │                     │
│     1105            │              │     1125            │
└─────────────────────┘              └─────────────────────┘

┌─────────────────────┐              ┌─────────────────────┐
│                     │              │  Global Surrogate   │
│  Memory Subsystem   │◄────────────►│  Agent              │
│                     │              │                     │
│     1110            │              │     1130            │
└─────────────────────┘              └─────────────────────┘

┌─────────────────────┐              ┌─────────────────────┐
│  Communication      │              │  I/O Interface      │
│  Interface          │◄────────────►│                     │
│                     │              │     1135            │
│     1115            │              │                     │
└─────────────────────┘              └─────────────────────┘

┌─────────────────────┐              ┌─────────────────────┐
│  Local Chat         │              │  User Interface     │
│  Application        │◄────────────►│  Component(s)       │
│                     │              │                     │
│     1120            │              │     1140            │
└─────────────────────┘              └─────────────────────┘
```

Figure 12:
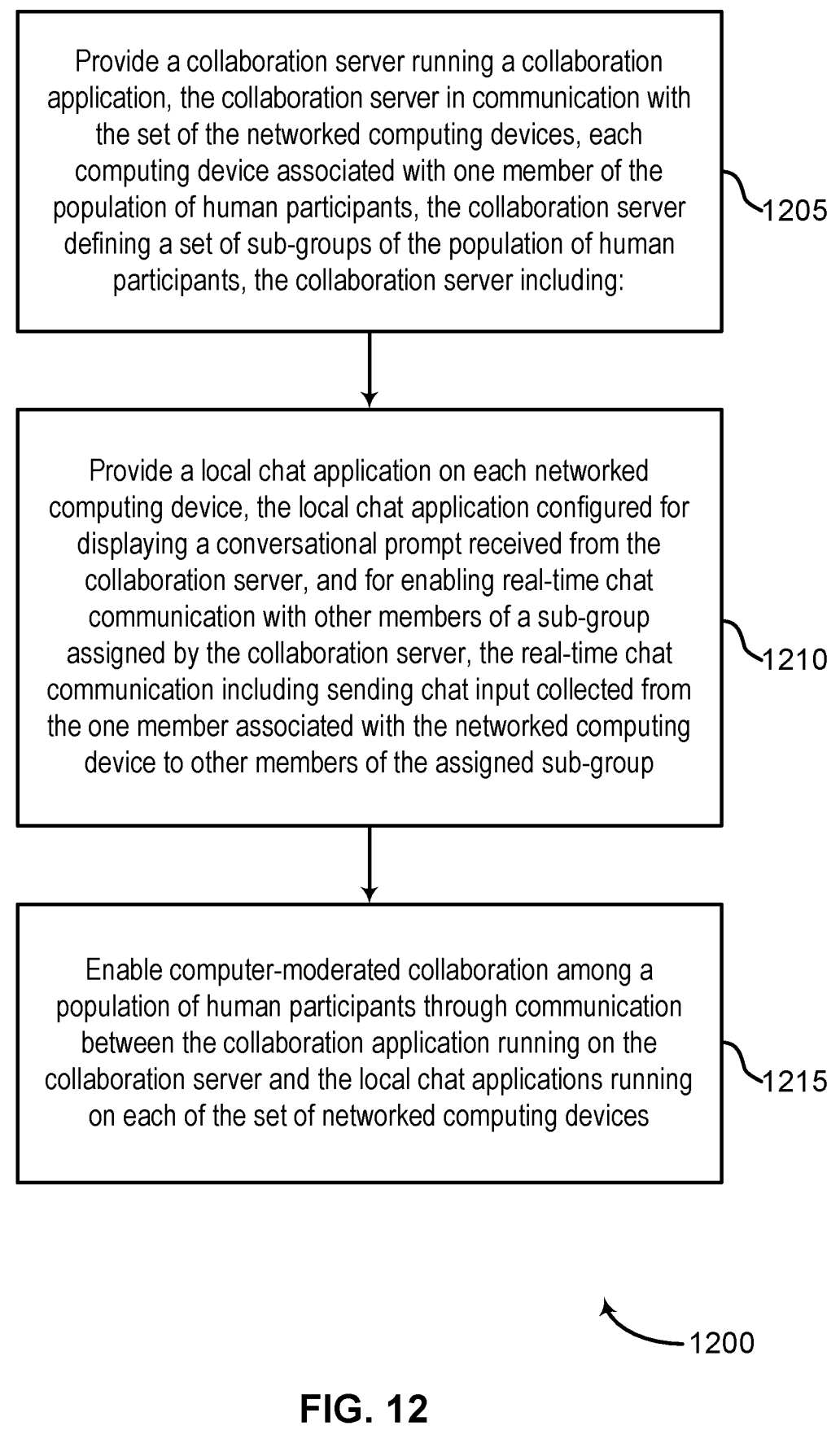

Provide a collaboration server running a collaboration application, the collaboration server in communication with the set of the networked computing devices, each computing device associated with one member of the population of human participants, the collaboration server defining a set of sub-groups of the population of human participants, the collaboration server including:

1205

Provide a local chat application on each networked computing device, the local chat application configured for displaying a conversational prompt received from the collaboration server, and for enabling real-time chat communication with other members of a sub-group assigned by the collaboration server, the real-time chat communication including sending chat input collected from the one member associated with the networked computing device to other members of the assigned sub-group

1210

Enable computer-moderated collaboration among a population of human participants through communication between the collaboration application running on the collaboration server and the local chat applications running on each of the set of networked computing devices

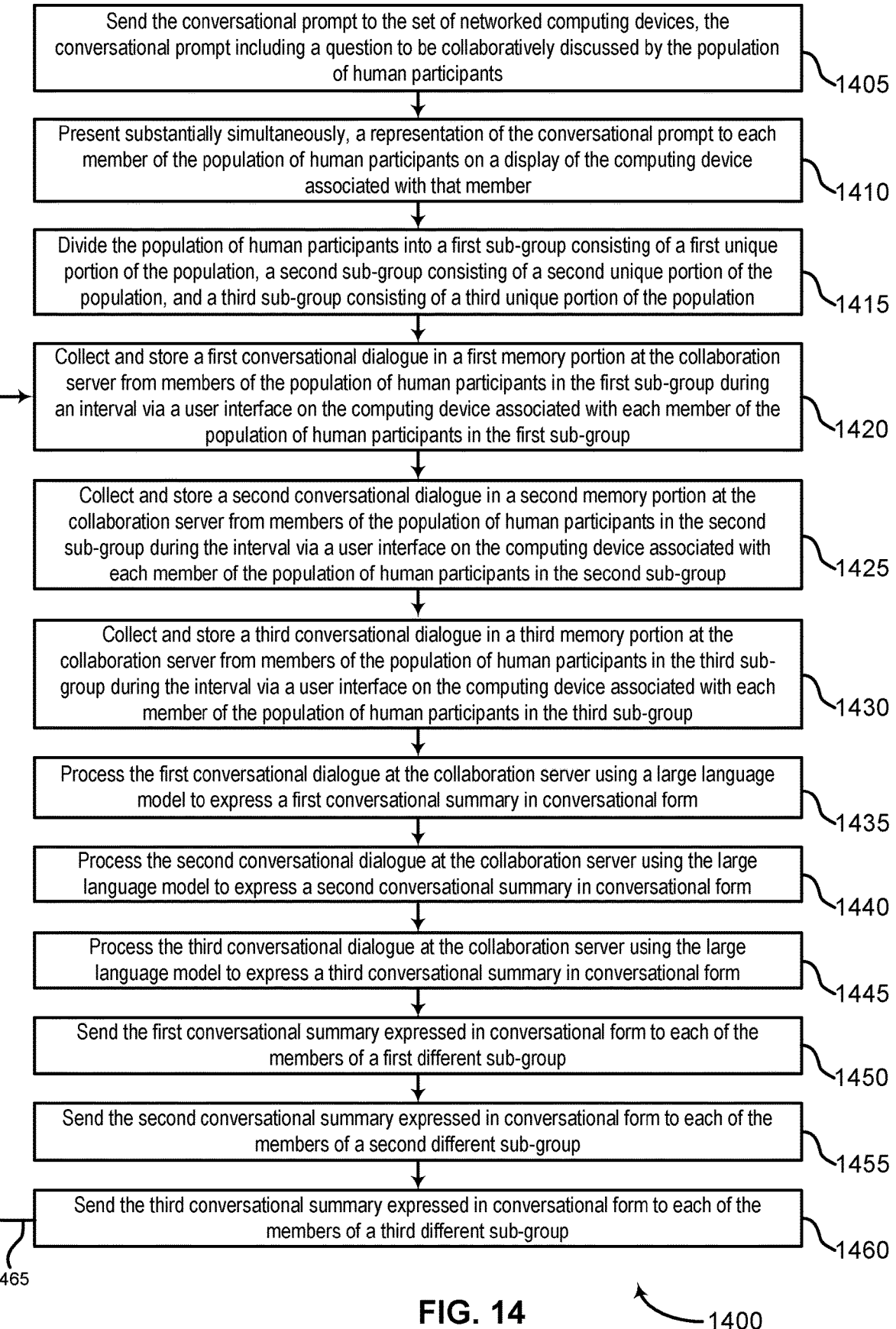

Send the conversational prompt to the set of networked computing devices, the conversational prompt including a question to be collaboratively discussed by the population of human participants — 1405

Present substantially simultaneously, a representation of the conversational prompt to each member of the population of human participants on a display of the computing device associated with that member — 1410

Divide the population of human participants into a first sub-group consisting of a first unique portion of the population, a second sub-group consisting of a second unique portion of the population, and a third sub-group consisting of a third unique portion of the population — 1415

Collect and store a first conversational dialogue in a first memory portion at the collaboration server from members of the population of human participants in the first sub-group during an interval via a user interface on the computing device associated with each member of the population of human participants in the first sub-group — 1420

Collect and store a second conversational dialogue in a second memory portion at the collaboration server from members of the population of human participants in the second sub-group during the interval via a user interface on the computing device associated with each member of the population of human participants in the second sub-group — 1425

Collect and store a third conversational dialogue in a third memory portion at the collaboration server from members of the population of human participants in the third sub-group during the interval via a user interface on the computing device associated with each member of the population of human participants in the third sub-group — 1430

Process the first conversational dialogue at the collaboration server using a large language model to express a first conversational summary in conversational form — 1435

Process the second conversational dialogue at the collaboration server using the large language model to express a second conversational summary in conversational form — 1440

Process the third conversational dialogue at the collaboration server using the large language model to express a third conversational summary in conversational form — 1445

Send the first conversational summary expressed in conversational form to each of the members of a first different sub-group — 1450

Send the second conversational summary expressed in conversational form to each of the members of a second different sub-group — 1455

Send the third conversational summary expressed in conversational form to each of the members of a third different sub-group — 1460

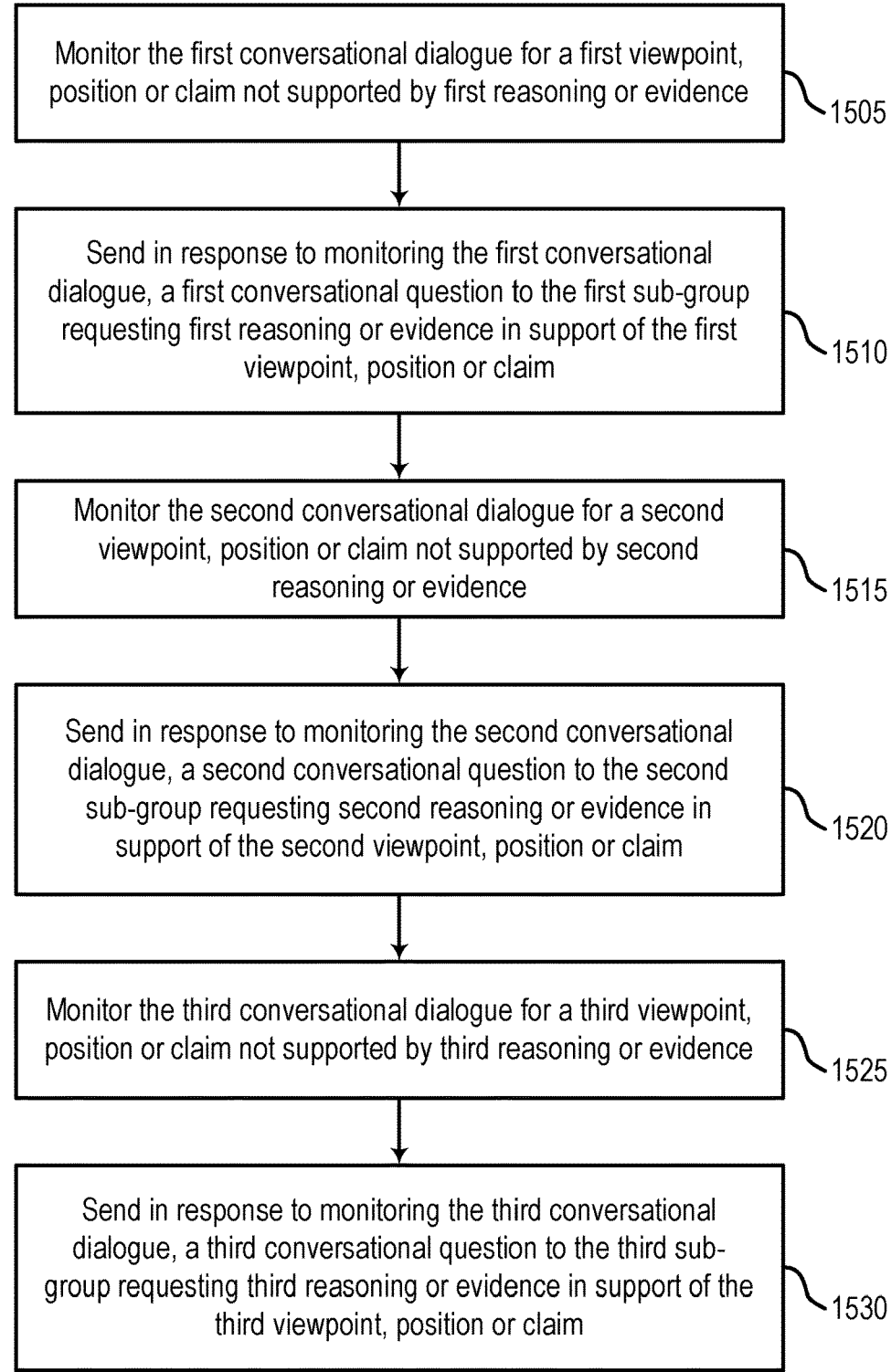

Monitor the first conversational dialogue for a first viewpoint, position or claim not supported by first reasoning or evidence ⟍1505

Send in response to monitoring the first conversational dialogue, a first conversational question to the first sub-group requesting first reasoning or evidence in support of the first viewpoint, position or claim ⟍1510

Monitor the second conversational dialogue for a second viewpoint, position or claim not supported by second reasoning or evidence ⟍1515

Send in response to monitoring the second conversational dialogue, a second conversational question to the second sub-group requesting second reasoning or evidence in support of the second viewpoint, position or claim ⟍1520

Monitor the third conversational dialogue for a third viewpoint, position or claim not supported by third reasoning or evidence ⟍1525

Send in response to monitoring the third conversational dialogue, a third conversational question to the third sub-group requesting third reasoning or evidence in support of the third viewpoint, position or claim ⟍1530

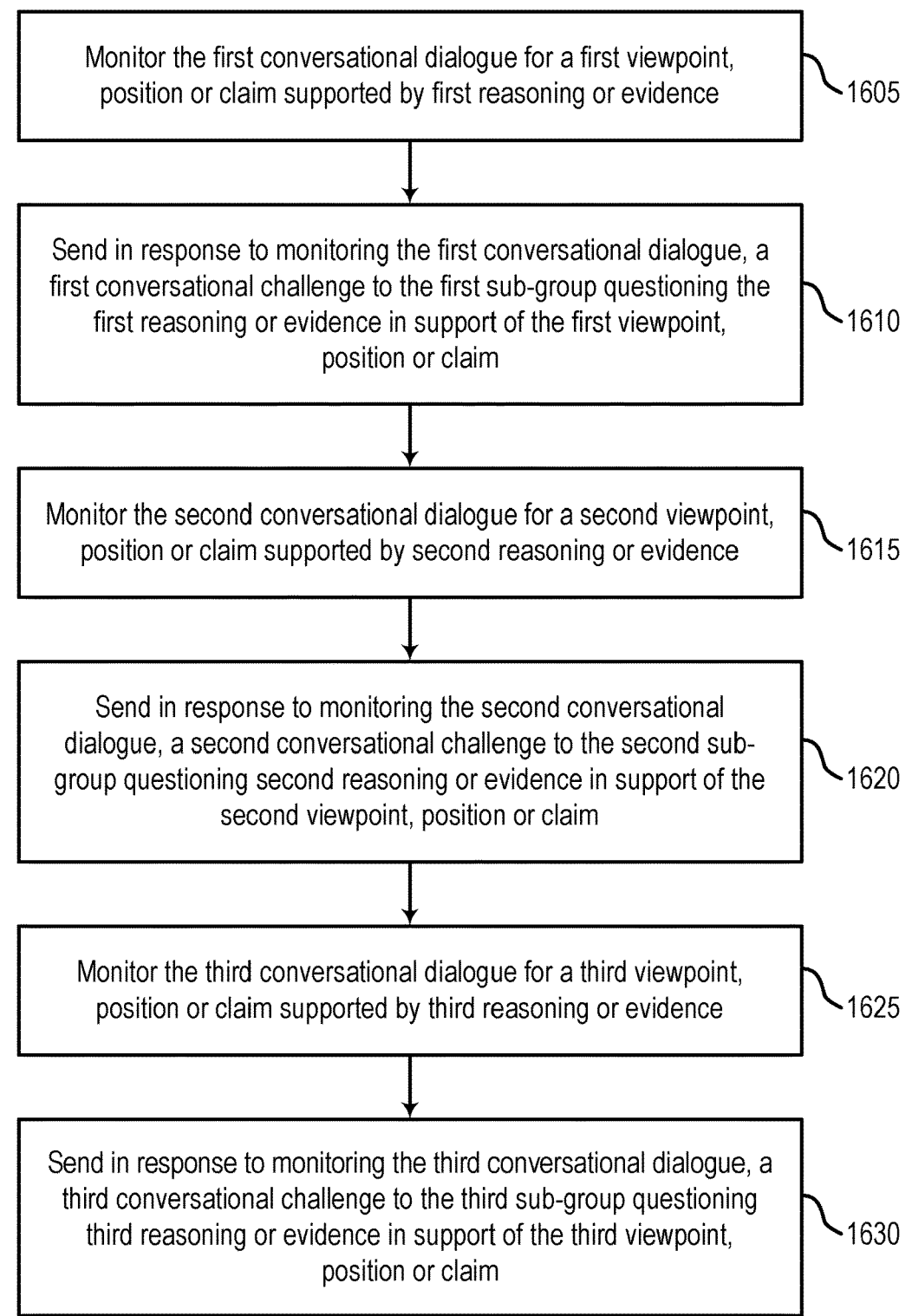

Monitor the first conversational dialogue for a first viewpoint, position or claim supported by first reasoning or evidence ⌇1605

Send in response to monitoring the first conversational dialogue, a first conversational challenge to the first sub-group questioning the first reasoning or evidence in support of the first viewpoint, position or claim ⌇1610

Monitor the second conversational dialogue for a second viewpoint, position or claim supported by second reasoning or evidence ⌇1615

Send in response to monitoring the second conversational dialogue, a second conversational challenge to the second sub-group questioning second reasoning or evidence in support of the second viewpoint, position or claim ⌇1620

Monitor the third conversational dialogue for a third viewpoint, position or claim supported by third reasoning or evidence ⌇1625

Send in response to monitoring the third conversational dialogue, a third conversational challenge to the third sub-group questioning third reasoning or evidence in support of the third viewpoint, position or claim ⌇1630

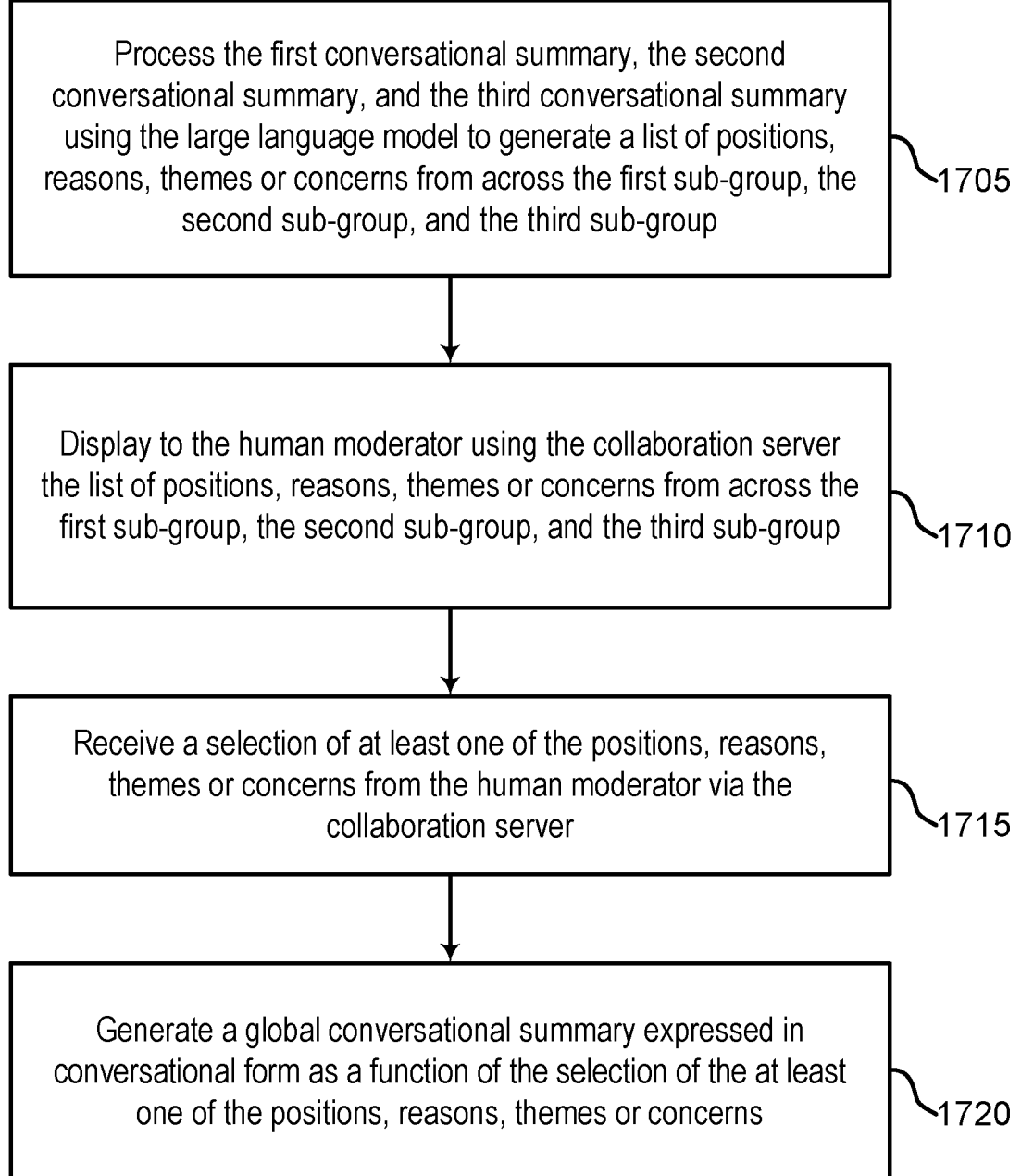

Process the first conversational summary, the second conversational summary, and the third conversational summary using the large language model to generate a list of positions, reasons, themes or concerns from across the first sub-group, the second sub-group, and the third sub-group ⌐1705

Display to the human moderator using the collaboration server the list of positions, reasons, themes or concerns from across the first sub-group, the second sub-group, and the third sub-group ⌐1710

Receive a selection of at least one of the positions, reasons, themes or concerns from the human moderator via the collaboration server ⌐1715

Generate a global conversational summary expressed in conversational form as a function of the selection of the at least one of the positions, reasons, themes or concerns ⌐1720

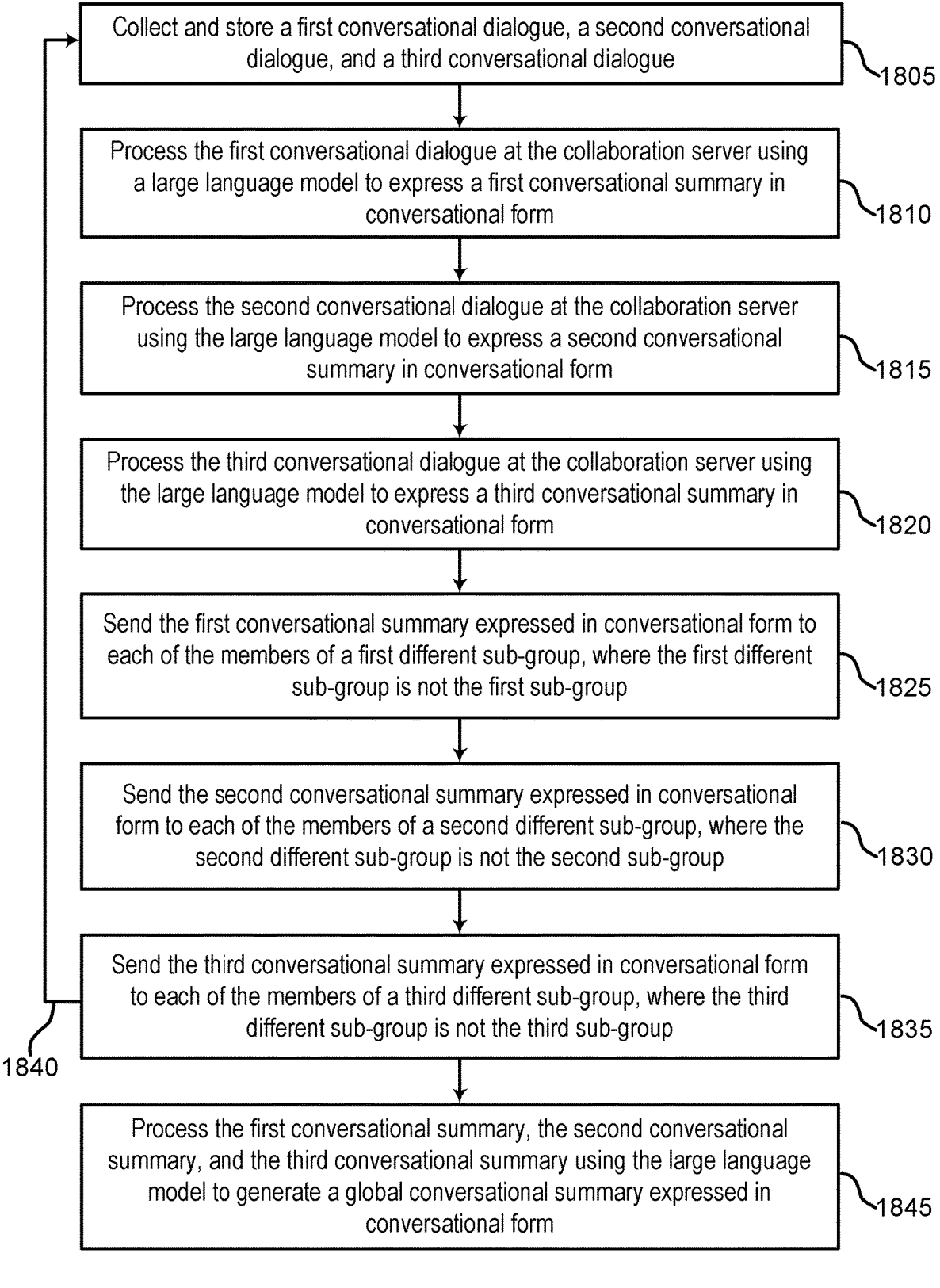

Collect and store a first conversational dialogue, a second conversational dialogue, and a third conversational dialogue ⌐1805

Process the first conversational dialogue at the collaboration server using a large language model to express a first conversational summary in conversational form ⌐1810

Process the second conversational dialogue at the collaboration server using the large language model to express a second conversational summary in conversational form ⌐1815

Process the third conversational dialogue at the collaboration server using the large language model to express a third conversational summary in conversational form ⌐1820

Send the first conversational summary expressed in conversational form to each of the members of a first different sub-group, where the first different sub-group is not the first sub-group ⌐1825

Send the second conversational summary expressed in conversational form to each of the members of a second different sub-group, where the second different sub-group is not the second sub-group ⌐1830

Send the third conversational summary expressed in conversational form to each of the members of a third different sub-group, where the third different sub-group is not the third sub-group ⌐1835

1840

Process the first conversational summary, the second conversational summary, and the third conversational summary using the large language model to generate a global conversational summary expressed in conversational form ⌐1845

Observer Agent 1935

1925

Conversational Surrogate Agent

1930

M

Conversational Surrogate Agent

M

Conversational Surrogate Agent

M

1940

1910

1915

1905

1900

2115

2105

2110

2100

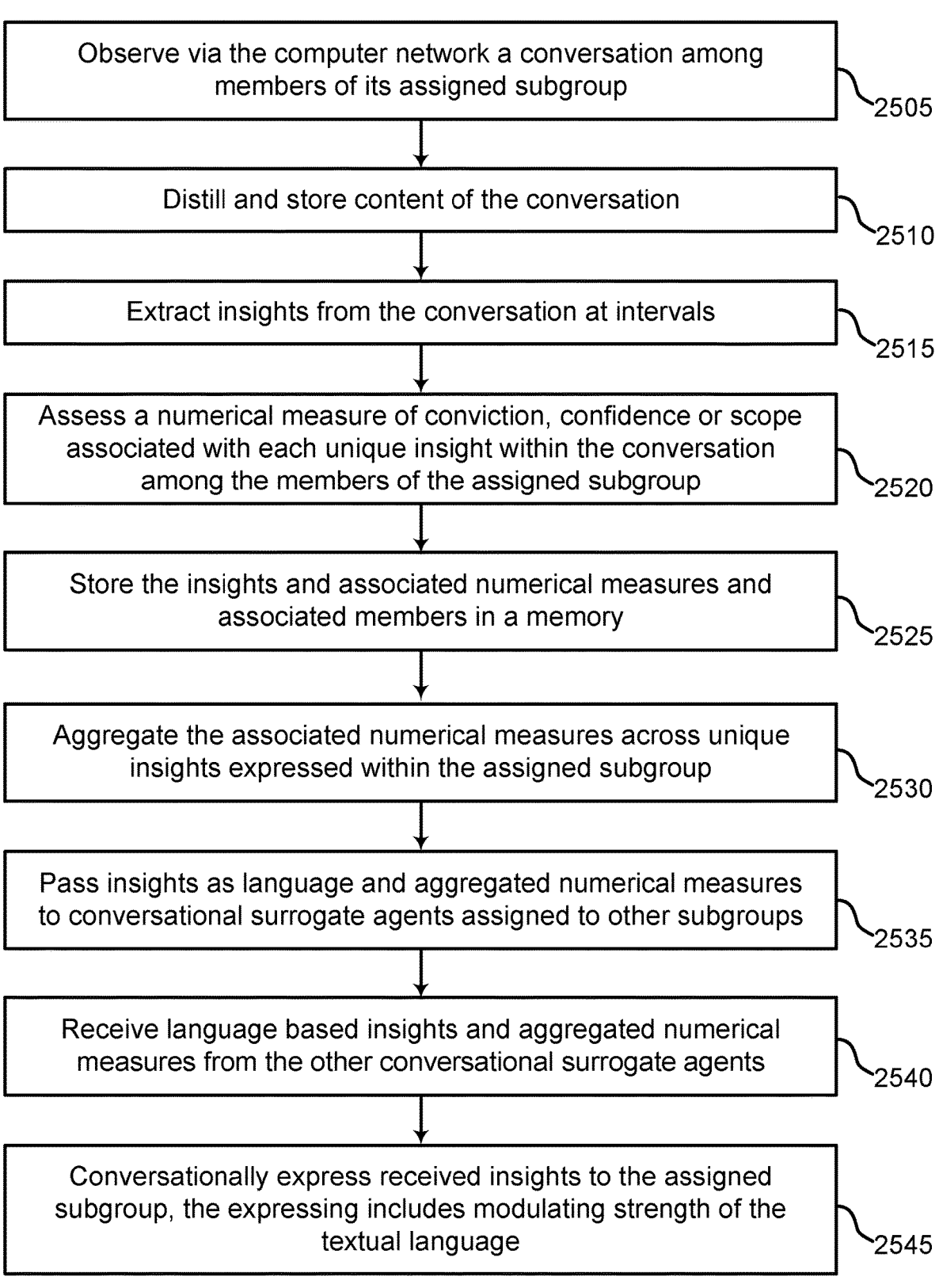

Observe via the computer network a conversation among members of its assigned subgroup ⟋2505

Distill and store content of the conversation ⟋2510

Extract insights from the conversation at intervals ⟋2515

Assess a numerical measure of conviction, confidence or scope associated with each unique insight within the conversation among the members of the assigned subgroup ⟋2520

Store the insights and associated numerical measures and associated members in a memory ⟋2525

Aggregate the associated numerical measures across unique insights expressed within the assigned subgroup ⟋2530

Pass insights as language and aggregated numerical measures to conversational surrogate agents assigned to other subgroups ⟋2535

Receive language based insights and aggregated numerical measures from the other conversational surrogate agents ⟋2540

Conversationally express received insights to the assigned subgroup, the expressing includes modulating strength of the textual language ⟋2545

FIG. 25     —2500

METHOD AND SYSTEM FOR ENABLING REAL-TIME AI-FACILITATED CONVERSATION AMONG LARGE NETWORKED HUMAN GROUPS

CROSS-REFERENCE TO RELATED APPLICATION

This application is a continuation of U.S. patent application Ser. No. 18/657,612, filed May 7, 2024, for METHODS AND SYSTEMS FOR ENABLING COLLECTIVE SUPERINTELLIGENCE, which claims the benefit of U.S. Provisional Application No. 63/547,705, filed Nov. 8, 2023, for METHOD AND SYSTEM FOR ENABLING COLLECTIVE SUPERINTELLIGENGE, as well as U.S. Provisional Application No. 63/548,107, filed Nov. 10, 2023, for METHOD AND SYSTEM FOR ENABLING COLLECTIVE SUPERINTELLIGENGE, which are both incorporated in their entirety herein by reference.

This application is a continuation of U.S. patent application Ser. No. 18/657,612, filed May 7, 2024, for METHODS AND SYSTEMS FOR ENABLING COLLECTIVE SUPERINTELLIGENCE, which is a continuation-in-part of U.S. patent application Ser. No. 18/588,851 filed Feb. 27, 2024, for METHODS AND SYSTEMS FOR ENABLING CONVERSATIONAL DELIBERATION ACROSS LARGE NETWORKED POPULATIONS, which is a continuation of U.S. patent application Ser. No. 18/240,286, filed Aug. 30, 2023, for METHODS AND SYSTEMS FOR HYPERCHAT CONVERSATIONS AMONG LARGE NETWORKED POPULATIONS WITH COLLECTIVE INTELLIGENCE AMPLIFICATION, now U.S. Pat. No. 11,949,638, issued on Apr. 2, 2024, which claims the benefit of U.S. Provisional Application No. 63/449,986, filed Mar. 4, 2023, for METHOD AND SYSTEM FOR "HYPERCHAT" CONVERSATIONS AMONG LARGE NETWORKED POPULATIONS WITH COLLECTIVE INTELLIGENCE AMPLIFICATION, which are incorporated in their entirety herein by reference.

This application is a continuation of U.S. patent application Ser. No. 18/657,612, filed May 7, 2024, for METHODS AND SYSTEMS FOR ENABLING COLLECTIVE SUPERINTELLIGENCE, which is a continuation-in-part of U.S. patent application Ser. No. 18/367,089 filed Sep. 12, 2023, for METHODS AND SYSTEMS FOR HYPERCHAT AND HYPERVIDEO CONVERSATIONS ACROSS NETWORKED HUMAN POPULATIONS WITH COLLECTIVE INTELLIGENCE AMPLIFICATION, which claims the benefit of U.S. Provisional Application No. 63/449,986, filed Mar. 4, 2023, for METHOD AND SYSTEM FOR "HYPERCHAT" CONVERSATIONS AMONG LARGE NETWORKED POPULATIONS WITH COLLECTIVE INTELLIGENCE AMPLIFICATION, U.S. Provisional Application No. 63/451,614, filed Mar. 12, 2023, for METHOD AND SYSTEM FOR HYPERCHAT CONVER-SATIONS ACROSS NETWORKED HUMAN POPULA-TIONS WITH COLLECTIVE INTELLIGENCE AMPLI-FICATION, and U.S. Provisional Application No. 63/456,483, filed Apr. 1, 2023, for METHOD AND SYSTEM FOR HYPERCHAT AND HYPERVIDEO CONVERSATIONS AMONG NETWORKED HUMAN POPULATIONS WITH COLLECTIVE INTELLIGENCE AMPLIFICATION, all of which are incorporated in their entirety herein by reference.

This application is a continuation of U.S. patent application Ser. No. 18/657,612, filed May 7, 2024, for METHODS AND SYSTEMS FOR ENABLING COLLECTIVE SUPERINTELLIGENCE, which is a continuation-in-part of U.S. patent application Ser. No. 18/367,089 filed Sep. 12, 2023, for METHODS AND SYSTEMS FOR HYPERCHAT AND HYPERVIDEO CONVERSATIONS ACROSS NET-WORKED HUMAN POPULATIONS WITH COLLEC-TIVE INTELLIGENCE AMPLIFICATION, which is a con-tinuation-in-part of U.S. patent application Ser. No. 18/240,286, filed Aug. 30, 2023, for METHODS AND SYSTEMS FOR HYPERCHAT CONVERSATIONS AMONG LARGE NETWORKED POPULATIONS WITH COLLECTIVE INTELLIGENCE AMPLIFICATION, now U.S. Pat. No. 11,949, 638, issued on Apr. 2, 2024, which claims the benefit of U.S. Provisional Application No. 63/449,986, filed Mar. 4, 2023, for METHOD AND SYSTEM FOR "HYPER-CHAT" CONVERSATIONS AMONG LARGE NET-WORKED POPULATIONS WITH COLLECTIVE INTEL-LIGENCE AMPLIFICATION, which are incorporated in their entirety herein by reference.

U.S. Pat. No. 10,551,999 filed on Oct. 28, 2015, U.S. Pat. No. 10,817,158 filed on Dec. 21, 2018, U.S. Pat. No. 11,360,656 filed on Sep. 17, 2020, and U.S. application Ser. No. 17/744,464 filed on May 13, 2022, the contents of are incorporated by reference herein in their entirety.

BACKGROUND

1. Technical Field

The present description relates generally to computer mediated collaboration, and more specifically to computer mediated collaboration via real-time distributed conversations over computer networks.

2. Discussion of the Related Art

Whether interactive human dialog is enabled through text, video, or virtual reality (VR), these tools are often used to enable networked teams and other distributed groups to hold real-time interactive coherent conversation, for example, deliberative conversations, debating issues and reaching decisions, setting priorities, or otherwise collaborating in real-time.

Unfortunately, real-time conversations become much less effective as the number of participants increases. Whether conducted through text, voice, video, or VR, it is very difficult to hold a coherent interactive conversation among groups that are larger than 12 to 15 people with some experts suggesting the ideal group size for interactive coherent conversation is 5 to 7 people. This has created a barrier to harnessing the collective intelligence of large groups through real-time interactive coherent conversation.

SUMMARY

The present disclosure describes systems and methods for enabling real-time conversational dialog (i.e., via text, voice, and video chats) among a large population of networked individuals, while facilitating convergence on groupwise decisions, insights and solutions. Embodiments of the disclosure are configured to perform emerging forms of lan-guage-based communication that include dividing a large user population into a plurality of smaller subgroups to enable coherent real-time conversations among all users in parallel with other subgroups. In some cases, an artificial intelligence agent enables exchange of conversational con-tent among subgroups to facilitate the propagation of con-versational content across the population which enables the output of valuable insights generated across the subgroups.

One or more embodiments of the present disclosure include a computational architecture that enables information to propagate efficiently across the large group and enables the subgroups to use the insights from the other subgroups. For example, language-based communication includes human-to-human communication through Brain-Computer-Interfaces (BCI) which could enable conversations by thinking language instead of explicitly typing or uttering language. One or more embodiments include HyperChat and/or Conversational Swarm Intelligence that is configured to support different forms of large-scale language-based communication (i.e., vocalized communication or transmitted via BCI).

An apparatus, system, and method for Enabling Collective Superintelligence are described. One or more aspects of the apparatus, system, and method include a plurality of networked computing devices associated with members of a population of participants, and networked via a computer network and a central server in communication with the plurality of networked computing devices, the central server dividing the population into a plurality of subgroups and enabling a conversational surrogate agent (CSai) associated with each subgroup, each conversational surrogate agent comprising a large language model (LLM)-powered module that is assigned to a unique subgroup of the population of participants and tasked with repeatedly performing the following steps in real-time, comprising: observing via the computer network a conversation among members of its assigned subgroup, distilling and storing content of the conversation, extracting insights from the conversation at intervals, assessing a numerical measure of conviction, confidence or scope associated with each unique insight within the conversation among the members of the assigned subgroup, storing the insights and associated numerical measures and associated members in a memory by passing data to one or more other computational processes accessible to the central server, aggregating the associated numerical measures across unique insights expressed within the assigned subgroup, passing insights to other conversational surrogate agents assigned to other subgroups, the insights being passed as language, each insight being passed along with the associated numerical measures having been aggregated, receiving insights from the other conversational surrogate agents assigned to other subgroups, each including insight textual language representing the insight and aggregated numerical measures associated with the other subgroups, and conversationally expressing received insights to the assigned subgroup, the expressing including modulating a strength of the textual language based at least in part on the received aggregated numerical measures.

BRIEF DESCRIPTION OF THE DRAWINGS

FIG. 1 shows an example of a collaboration system according to aspects of the present disclosure.

FIG. 7 shows an example of a flowchart for computer mediated collaboration according to aspects of the present disclosure.

FIG. 11 shows an example of a computing device according to aspects of the present disclosure.

FIGS. 12 through 18 show examples of methods for computer mediated collaboration according to aspects of the present disclosure.

FIG. 25 shows an example of a method for real-time communication, conversation analysis and insight extraction, according to aspects of the present disclosure.

DETAILED DESCRIPTION

Figure 2:
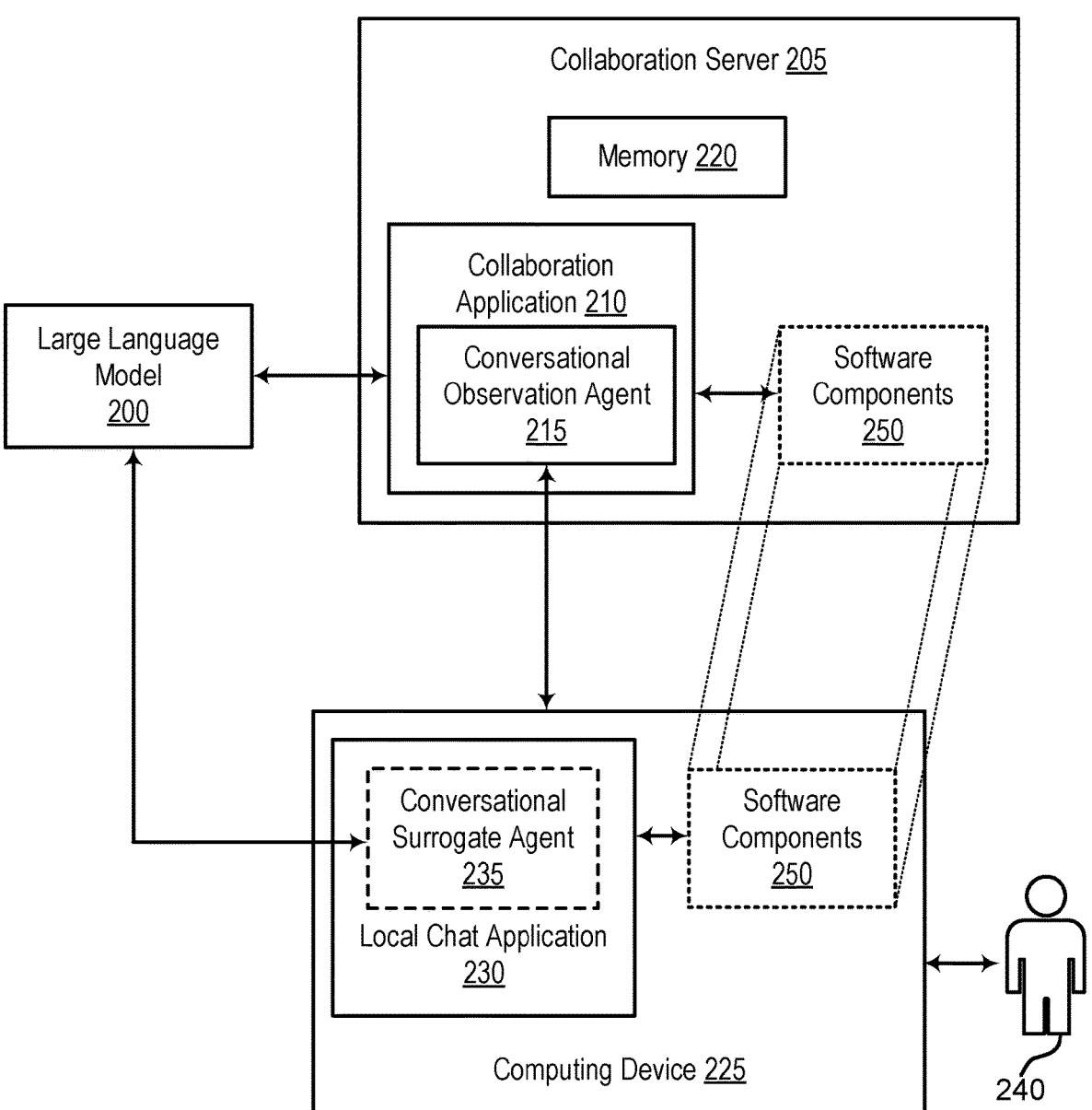
FIG. 2 shows an example of a collaboration process according to aspects of the present disclosure.

Networking technologies enable groups of distributed individuals to hold real-time conversations online through text chat, voice chat, video chat, or virtual reality (VR) chat.

In the field of Collective Intelligence, research has shown that more accurate decisions, priorities, insights, and forecasts can be generated by aggregating the input of very large groups.

However, there is a significant need for inventive interactive solutions that can enable real-time deliberative conversations among large groups of networked users via text, voice, video, or virtual avatars. For example, enabling large groups (e.g., such as groups as large as 50, 500, and 5000 distributed users) to engage in coherent and meaningful real-time deliberative conversations would have significant collaborative benefits for large human teams and organizations, including the ability to amplify their collective intelligence.

The present disclosure describes systems and methods for enabling real-time conversational dialog (i.e., via text, voice, and video chats) among a large population of networked individuals, while facilitating convergence on groupwise decisions, insights, and solutions. Embodiments of the disclosure are configured to perform emerging forms of language-based communication that include dividing a large user population into a plurality of smaller subgroups to enable coherent real-time conversations among each of the plurality of users in parallel with other subgroups. In some cases, an artificial intelligence agent enables exchange of conversational content among different subgroups to facilitate the propagation of conversational content across the population which enables generation of valuable insights across the subgroups.

One or more embodiments of the present disclosure include systems (e.g., computational architectures) that enable information to propagate efficiently across large groups, as well as enable subgroups to use the insights from other subgroups. For example, language-based communication includes human-to-human communication through Brain-Computer-Interfaces (BCI) which could enable conversations by thinking language instead of explicitly typing or uttering language. An embodiment includes HyperChat and/or Conversational Swarm Intelligence that is configured to support different forms of large-scale language-based communication (i.e., vocalized communication or transmitted via BCI).

Conventional computer networking technologies enable groups of distributed individuals to hold conversations online through text chat, voice chat, video chat, or in 3D immersive meeting environments via avatars that convey voice information and provide facial expression information and body gestural information. Accordingly, such environments are increasingly prevalent methods for distributed groups to meet in real-time and hold conversations. This enables teams to debate issues, reach decisions, make plans, or converge on solutions. In some cases, such real-time communication technologies may be used for conversations among small, distributed groups. However, real-time communication becomes increasingly difficult as the number of users/participants increases.

In some cases, holding a real-time conversation (through text, voice, video, or immersive avatar) among groups that are large (e.g., larger than 4 to 7 people) is difficult and the discussion degrades rapidly as the group size increases further (e.g., groups with more than 10 to 12 people). Therefore, there is a need to enable distributed conversations among large groups of networked users via text, voice, video, or immersive avatars. For example, embodiments of the present disclosure enable large groups (i.e., comprising 200, 2000, 20,000 or even 2,000,000 distributed users) to engage in conversational interactions that can lead to a unified and coherent result. Additionally, embodiments describe systems and methods that may be able to engage such large populations to harness and amplify the combined collective intelligence.

In some cases, it may be challenging to extend such systems to voice or video chat among sub-groups with overlapping distributions of people. For instance, according to the present disclosure, in case of voice implementations, handling of timing aspects is possible (and important) as there may be multiple people talking at the same time (e.g., because the people are divided into subgroups and a small number of people share a sub-group). Thus, the present disclosure describes a method using a memory and AI agents that may be employed to avoid overlap in time or to moderate turn-taking as conversational information is exchanged among real-time subgroups in parallel.

Embodiments of the present disclosure can be deployed across a wide range of networked conversational environments (e.g., from text chatrooms (deployed using textual dialog), to video conference rooms (deployed using verbal dialog and live video), to immersive "metaverse" conference rooms (deployed using verbal dialog and simulated avatars), etc.

One or more embodiments of the present invention are configured to accelerate information transfer among subgroups to support faster and more effective convergence on optimized that solutions amplify collective intelligence. In some cases, a method is provided based on which a large population of users can hold a single unified conversation via a communication structure that divides the population into a plurality of small subgroups.

For example, a small subgroup is well suited for coherent deliberative conversation (such as a subgroup with less than 8 people). The subgroups overlap based on assignment of an artificial agent (i.e., an artificial intelligence (AI) agent) to each subgroup that observes the real-time dialog among the users, distils salient insights, and passes insights to one or more other subgroups as natural first-person dialog. The AI agents are Conversational Surrogate Agents (CSai) that are based on a large language model (LLM) assigned to a subgroup of users and configured to repeatedly observe the conservation, extract insights, assess numerical measure(s), store the observed insights and associated numerical measures, aggregate the numerical measures across unique insights, pass insights to other Surrogate Agents of other subgroups, receive insights of other subgroups from other Conversational Surrogates, express insights of other subgroups to its own subgroup, and express insights to its own subgroup received from the Global Agent (in first person language). Additionally, in some cases, the CSai may be configured to pass insights to Global Agent and receive insights from the Global Agent.

According to an embodiment, the CSai passes insights to other Surrogate Agents associated with other subgroups, said insight being passed as language, said insights being passed along with numerical measures of confidence and/or conviction and/or scope. Moreover, the CSai receives insights from other Conversational Surrogate Agents associated with other subgroups, said insights include textual language representing the insights and based on numerical measures of the subgroup's conviction and/or confidence and/or scope in said insights. In some cases, the CSai expresses insights to the associated subgroup received from Conversational Surrogate Agents associated with other subgroups (preferably in first person language). In some cases, the strength of the first person language (i.e. phrasing, emphasis, emotion, etc.) is modulated based at least in part on strength of received numerical measures (in relation to other insights received during the conversation).

According to one or more embodiments, the CSai passes insights to a Global Agent. The said insight are passed as language, said insights are passed along with numerical measures of confidence and/or conviction and/or scope. In some cases, the CSai receives insights from a Global Observer Agent, said insights include textual language representing the insights and numerical measures of the subgroup's conviction and/or confidence and/or scope in said insights. Additionally, the CSai expresses insights to the associated subgroup received from the Global Agent (in first person). The strength of the first-person language (i.e. phrasing, emphasis, or emotion) is modulated (e.g., in part) based on the strength of received numerical measures (in relation to other insights received during the conversation).

The following description is not to be taken in a limiting sense, but is made merely for the purpose of describing the general principles of exemplary embodiments. The scope of the invention should be determined with reference to the claims.

The terms "Surrogates", "Surrogate Agents", and "Conversational Surrogate Agents" refer to the same entity and have been used interchangeably throughout the specification. Additionally, the terms "Subgroup", "Group", and "ChatRoom" refer to the same entity and have been used interchangeably throughout the specification. The terms "Global Observer Agent", "Global Agent", "Global Conversational Agent", "Conversational Observer Agent", and "Observer Agent" refer to the same entity and have been used interchangeably throughout the specification.

Reference throughout this specification to "one embodiment," "an embodiment," or similar language means that a particular feature, structure, or characteristic described in connection with the embodiment is included in at least one embodiment of the present description. Thus, appearances of the phrases "in one embodiment," "in an embodiment," and similar language throughout this specification may, but do not necessarily, all refer to the same embodiment.

Furthermore, the described features, structures, or characteristics of the description may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the description. One skilled in the relevant art will recognize, however, that the teachings of the present description can be practiced without one or more of the specific details, or with other methods, components, materials, and so forth. In other instances, well-known structures, materials, or operations are not shown or described in detail to avoid obscuring aspects of the description.

A Collaboration System

As disclosed herein, the HyperChat system may enable a large population of distributed users to engage in real-time textual, audio, or video conversations. According to some aspects of the present disclosure, individual users may engage with a small number of other participants (e.g., referred to herein as a sub-group), thereby enabling coherent and manageable conversations in online environments. Moreover, aspects of the present disclosure enable exchange of conversational information between subgroups using AI agents (e.g., and thus may propagate conversational information efficiently across the population). Accordingly, members of individual subgroups can benefit from the knowledge, wisdom, insights, and intuitions of other sub-groups and the entire population is enabled to gradually converge on collaborative insights that leverage the collective intelligence of the large population. Additionally, methods and systems are disclosed for discussing the divergent viewpoints that are surfaced globally (i.e., insights of the entire population), thereby presenting the most divisive narratives to subgroups to foster global discussion around key points of disagreement.

FIG. 1 shows an example of a collaboration system according to aspects of the present disclosure. The example shown includes large language model 100, collaboration server 105, network 130, a plurality of computing devices 135, and a plurality of individual users 145.

In an example, a large group of users 145 enter the collaboration system. In the example shown in FIG. 1, nine users may enter the system. However, embodiments are not limited thereto, and large groups of users (e.g., 100 users, 500 users, 5000 users, etc.) may enter the system. In some examples, the collaboration server 105 divides 100 users into sub-groups (e.g., 20 sub-groups of 5 users each for 100 users). User 145 is an example of, or includes aspects of, the corresponding element described with reference to FIGS. 2-6.

In some examples, each user 145 may experience a traditional chat room with four other users 145. The user 145 sees the names of the four other users 145 in the sub-group. The collaboration server 105 mediates a conversation with the five users and ensures that the users see the comments from each other. Thus, each user participates in a real-time conversation with the remaining four users in the chat room (i.e., sub-group). According to the example, the collaboration server 105 performs the process in parallel with the 19 other sub-groups. However, the users 145 are not able to see the conversations happening in the 19 other chat rooms.

According to some aspects, collaboration server 105 performs a collaboration application 110, i.e., the collaboration server 105 uses collaboration application 110 for communication with the set of the networked computing devices 135, and each computing device 135 is associated with one member of the population of human participants (e.g., a user 145). Additionally, the collaboration server 105 defines a set of sub-groups of the population of human participants.

In some cases, the collaboration server 105 keeps track of the chat conversations separately in a memory. The memory in the collaboration server 105 includes a first memory portion 115, a second memory portion 120, and a third memory portion 125. First memory portion 115, second memory portion 120, and third memory portion 125 are examples of, or include aspects of, the corresponding element described with reference to FIG. 10.

Collaboration server 105 keeps track of the chat conversations separately so that the chat conversations can be separated from each other. The collaboration server 105 periodically sends chunks each separate chat of conversation to a Large Language Model 100 (LLM, for example, ChatGPT from OpenAI) via an Application Programming Interface (API) for processing and receives a summary from the LLM 100 that is associated with the particular sub-group. The collaboration server 105 keeps track of each conversation (via the software observer agent) and generates summaries using the LLM (via API calls).

Collaboration server 105 provides one or more functions to users 145 linked by way of one or more of the various networks 130. In some cases, the collaboration server 105 includes a single microprocessor board, which includes a microprocessor responsible for controlling aspects of the collaboration server 105. In some cases, a collaboration server 105 uses a microprocessor and protocols to exchange data with other devices/users 145 on one or more of the networks 130 via hypertext transfer protocol (HTTP), and simple mail transfer protocol (SMTP), although other protocols such as file transfer protocol (FTP), and simple network 130 management protocol (SNMP) may also be used. In some cases, a collaboration server 105 is configured to send and receive hypertext markup language (HTML) formatted files (e.g., for displaying web pages).

In various embodiments, a collaboration server 105 comprises a general purpose computing device 135, a personal computer, a laptop computer, a mainframe computer, a super computer, or any other suitable processing apparatus.

In some examples, collaboration application 110 (e.g., and/or large language model 100) may implement natural language processing (NLP) techniques. NLP refers to techniques for using computers to interpret or generate natural language. In some cases, NLP tasks involve assigning annotation data such as grammatical information to words or phrases within a natural language expression. Different classes of machine-learning algorithms have been applied to NLP tasks. Some algorithms, such as decision trees, utilize hard if-then rules. Other systems use neural networks 130 or statistical models which make soft, probabilistic decisions based on attaching real-valued weights to input features. These models can express the relative probability of multiple answers.

In some examples, large language model 100 (e.g., and/or implementation of large language model 100 via collaboration application 110) may be an example of, or implement aspects of, a neural processing unit (NPU). A NPU is a microprocessor that specializes in the acceleration of machine learning algorithms. For example, an NPU may operate on predictive models such as artificial neural networks 130 (ANNs) or random forests (RFs). In some cases, an NPU is designed in a way that makes it unsuitable for general purpose computing such as that performed by a Central Processing Unit (CPU). Additionally, or alternatively, the software support for an NPU may not be developed for general purpose computing. Large language model 100 is an example of, or includes aspects of, the corresponding element described with reference to FIG. 2.

According to some aspects, large language model 100 processes the first conversational summary, the second conversational summary, and the third conversational summary using the large language model 100 to generate a global conversational summary expressed in conversational form. In some examples, large language model 100 sends the global conversational summary expressed in conversational form to each of the members of the first sub-group, the second sub-group, and the third sub-group. In some examples, large language model 100 may include aspects of an artificial neural network 130 (ANN). Large language model 100 is an example of, or includes aspects of, the corresponding element described with reference to FIG. 2.

An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

In some examples, a computing device 135 is a personal computer, laptop computer, mainframe computer, palmtop computer, personal assistant, mobile device, or any other suitable processing apparatus. Computing device 135 is an example of, or includes aspects of, the corresponding element described with reference to FIGS. 2, 5, and 11. In certain aspects, computing device 135 includes local chat application 140. According to some aspects, a local chat application 140 is provided on each networked computing device 135.

The local chat application 140 may be configured for displaying a conversational prompt received from the collaboration server 105 (via network 130 and computing device 135), and for enabling real-time chat communication of a user with other users in a sub-group assigned by the collaboration server 105, the real-time chat communication including sending chat input collected from the one user associated with the networked computing device 135 and other users of the assigned sub-group. Local chat application 140 is an example of, or includes aspects of, the corresponding element described with reference to FIGS. 2 and 11.

Network 130 facilitates the transfer of information between computing device 135 and collaboration server 105. Network 130 may be referred to as a "cloud". Network 130 (e.g., cloud) is a computer network configured to provide on-demand availability of computer system resources, such as data storage and computing power. In some examples, the network 130 provides resources without active management by the user 145. The term network 130

(e.g., or cloud) is sometimes used to describe data centers available to many users 145 over the Internet. Some large networks 130 have functions distributed over multiple locations from central servers. A server is designated an edge server if it has a direct or close connection to a user 145. In some cases, a network 130 (e.g., or cloud) is limited to a single organization. In other examples, the network 130 (e.g., or cloud) is available to many organizations. In one example, a network 130 includes a multi-layer communications network 130 comprising multiple edge routers and core routers. In another example, a network 130 is based on a local collection of switches in a single physical location.

In some aspects, one or more components of FIG. 1 (e.g., collaboration server 105, network 130, computing device 135, etc.) may implement or include a database to perform one or more of the operations and functions described herein. A database is an organized collection of data. For example, a database stores data in a specified format known as a schema. A database may be structured as a single database, a distributed database, multiple distributed databases, or an emergency backup database. In some cases, a database controller may manage data storage and processing in a database. In some cases, a user 145 interacts with database controller. In other cases, database controller may operate automatically without user 145 interaction.

FIG. 2 shows an example of a collaboration process according to aspects of the present disclosure. The example shown includes large language model 200, collaboration server 205, computing device 225, user 240, and software components 250.

In some cases, large language models (LLMs) are artificial intelligence systems trained on vast amounts of text data to understand and generate human-like text. The models utilize deep learning techniques to analyze and generate coherent and contextually relevant responses to text inputs. Large language models have a wide range of applications, including natural language understanding, text generation, translation, summarization, etc.

In some examples, large language model (LLM) 200 is able to identify unique chat messages within complex blocks of dialog while assessing or identifying responses that refer to a particular point. In some cases, LLM 200 can capture the flow of the conversation (e.g., the speakers, content of the conversation, other speakers who disagreed, agreed, or argued, etc.) from the block dialog. In some cases, LLM 200 can provide the conversational context, e.g., blocks of dialog that capture the order and timing in which the chat responses flow. Large language model 200 is an example of, or includes aspects of, the corresponding element described with reference to FIG. 1.

According to some aspects, collaboration server 205 runs a collaboration application 210, and the collaboration server 205 is in communication with the set of the networked computing devices 225 (e.g., where each computing device 225 is associated with one member of the population of human participants, the collaboration server 205 defining a set of sub-groups of the population of human participants). Collaboration server 205 is an example of, or includes aspects of, the corresponding element described with reference to FIGS. 1 and 10. In certain aspects, collaboration server 205 includes collaboration application 210 and memory 220.

In certain aspects, collaboration application 210 includes conversational observation agent 215. In certain aspects, collaboration application 210 includes (e.g., or implements) software components 250. In some cases, conversational observation agent 215 is an AI-based model that observes the real-time conversational content within one or more of the sub-groups and passes a representation of the information between the sub-groups to not lose the benefit of the broad knowledge and insight across the full population. In some cases, conversational observation agent 215 keeps track of each conversation separately and sends chat conversation chunks (via an API) to LLM 200 for processing (e.g., summarization). Collaboration application 210 is an example of, or includes aspects of, the corresponding element described with reference to FIGS. 1 and 10. Conversational observation agent 215 is an example of, or includes aspects of, the corresponding element described with reference to FIGS. 3, 4, 6, 9, and 10.

Examples of memory 220 (e.g., first memory portion, second memory portion, third memory portion as described in FIG. 1) may include random access memory 220 (RAM), read-only memory 220 (ROM), or a hard disk. Examples of memory 220 devices include solid state memory and a hard disk drive. In some examples, memory 220 (e.g., first memory portion, second memory portion, third memory portion) is used to store computer-readable, computer-executable software including instructions that, when executed, cause a processor to perform various functions described herein. In some cases, the memory 220 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory 220 store information in the form of a logical state.

Computing device 225 is a networked computing device that facilitates the transfer of information between local chat application 230 and collaboration 205.

Computing device 225 is an example of, or includes aspects of, the corresponding element described with reference to FIGS. 1, 5, and 11. In certain aspects, computing device 225 includes local chat application 230.

According to some aspects, local chat application 230 is provided on each networked computing device 225, the local chat application 230 may be configured for displaying a conversational prompt received from the collaboration server 205, and for enabling real-time chat communication with other members of a sub-group assigned by the collaboration server 205, the real-time chat communication including sending chat input collected from the one member associated with the networked computing device 225 to other members of the assigned sub-group. Local chat application 230 is an example of, or includes aspects of, the corresponding element described with reference to FIGS. 1 and 11. In certain aspects, local chat application 230 includes conversational surrogate agent 235. In certain aspects, local chat application 230 includes (e.g., or implements) software components 250.

In some aspects, conversational surrogate agent 235 is a simulated (i.e., fake) user in each sub-group that conversationally expresses a representation of the information contained in the summary from a different sub-group. Conversational surrogate agent 235 is an example of, or includes aspects of, the corresponding element described with reference to FIGS. 6, 8, 9, and 11.

In certain aspects, local chat application 230 includes a conversational instigator agent and a global surrogate agent. In some aspects, conversational instigator agent is a fake user in each sub-group that is designed to stoke conversation within subgroups in which members are not being sufficiently detailed in their rationale for the supported positions. In some aspects, a global surrogate agent is a fake user in each sub-group that selectively represents the views, arguments, and narratives that have been observed across the full population during a recent time period (e.g., custom tailor representation for the subgroup based on the subgroup's interactive dialog among members). Conversational instigator agent and Global surrogate agent are examples of, or include aspects of, the corresponding element described with reference to FIG. 4.

As described herein, software components 250 may be executed by the collaboration server 205 and the local chat application 230 for enabling operations and functions described herein, through communication between the collaboration application 210 (running on the collaboration server 205) and the local chat applications 230 running on each of the plurality of networked computing devices 225. For instance, collaboration server 205 and computing device 225 may include software components 225 that perform one or more of the operations and functions described herein. Generally, software components may include software executed via collaboration server 205, software components may include software executed via computing device 225, and/or software executed via both collaboration server 205 and computing device 225. In some aspects, collaboration application 210 and local chat application 230 may each be examples of software components 250. Generally, software components 250 may be executed to enable methods 1200-1800 described in more detail herein.

For instance, software components 250 enable, through communication between the collaboration application 210 running on the collaboration server 205 and the local chat applications 230 running on each of the set of networked computing devices 225, the following steps: (a) sending the conversational prompt to the set of networked computing devices 225, the conversational prompt including a question to be collaboratively discussed by the population of human participants, (b) presenting, substantially simultaneously, a representation of the conversational prompt to each member of the population of human participants on a display of the computing device 225 associated with that member, (c) dividing the population of human participants into a first sub-group consisting of a first unique portion of the population, a second sub-group consisting of a second unique portion of the population, and a third sub-group consisting of a third unique portion of the population, where the first unique portion consists of a first set of members of the population of human participants, the second unique portion consists of a second set of members of the population of human participants and the third unique portion consists of a third set of members of the population of human participants, (d) collecting and storing a first conversational dialogue in a first memory portion at the collaboration server 205 from members of the population of human participants in the first sub-group during an interval via a user 240 interface on the computing device 225 associated with each member of the population of human participants in the first sub-group, (e) collecting and storing a second conversational dialogue in a second memory portion at the collaboration server 205 from members of the population of human participants in the second sub-group during the interval via a user 240 interface on the computing device 225 associated with each member of the population of human participants in the second sub-group, (f) collecting and storing a third conversational dialogue in a third memory portion at the collaboration server 205 from members of the population of human participants in the third sub-group during the interval via a user 240 interface on the computing device 225 associated with each member of the population of human participants in the third sub-group, (g) processing the first conversational dialogue at the collaboration server 205 using a large language model 200 to identify and express a first conversational argument in conversational form, where the identifying of the first conversational argument includes identifying at least one viewpoint, position or claim in the first conversational dialogue supported by evidence or reasoning, (h) processing the second conversational dialogue at the collaboration server 205 using the large language model 200 to identify and express a second conversational argument in conversational form, where the identifying of the second conversational argument includes identifying at least one viewpoint, position or claim in the second conversational dialogue supported by evidence or reasoning, (i) processing the third conversational dialogue at the collaboration server 205 using the large language model 200 to identify and express a third conversational argument in conversational form, where the identifying of the third conversational argument includes identifying at least one viewpoint, position or claim in the third conversational dialogue supported by evidence or reasoning, (j) sending the first conversational argument expressed in conversational form to each of the members of a first different sub-group, where the first different sub-group is not the first sub-group, (k) sending the second conversational argument expressed in conversational form to each of the members of a second different sub-group, where the second different sub-group is not the second sub-group, (l) sending the third conversational argument expressed in conversational form to each of the members of a third different sub-group, where the third different sub-group is not the third sub-group, and (m) repeating steps (d) through (l) at least one time. Note—in many preferred embodiments, step (c), which involves dividing the population into a plurality of subgroups can be performed before steps (a) and (b).

In some examples, software components 250 send, in step (j), the first conversational argument expressed in conversational form to each of the members of a first different sub-group expressed in first person as if the first conversational argument were coming from a member of the first different sub-group of the population of human participants. In some examples, software components 250 send, in step (k), the second conversational argument expressed in conversational form to each of the members of a second different sub-group expressed in first person as if the second conversational argument were coming from a member of the second different sub-group of the population of human participants. In examples, software some components 250 send, in step (l), the third conversational argument expressed in conversational form to each of the members of a third different sub-group expressed in first person as if the third conversational argument were coming from a member of the third different sub-group of the population of human participants. In some such embodiment, the additional simulated member is assigned a unique username that appears similarly in the Local Chat Application as the usernames of the human members of the sub-group. In this way, the users within a sub-group are made to feel like they are holding a natural real-time conversation among participants in their sub-group, that subset including a simulated member that express in the first person, unique points that represents conversational information captured from another sub-group. With every sub-group having such a simulated member, information propagates smoothly across the population, linking all the subgroups into a single unified conversation.

In some examples, software components 250 process, in step (n), the first conversational argument, the second conversational argument, and the third conversational argument using the large language model 200 to generate a global conversational argument expressed in conversational form. In some examples, software components 250 sends, in step (0), the global conversational argument expressed in conversational form to each of the members of the first sub-group, the second sub-group, and the third sub-group. In some aspects, a final global conversational argument is generated by weighting more recent ones of the global conversational arguments more heavily than less recent ones of the global conversational arguments. In some aspects, the first conversational dialogue, the second conversational dialogue and third conversational dialogue each include a set of ordered chat messages including text. In some aspects, the first conversational dialogue, the second conversational dialogue and the third conversational dialogue each further include a respective member identifier for the member of the population of human participants who entered each chat message. In some aspects, the first conversational dialogue, the second conversational dialogue and the third conversational dialogue each further includes a respective timestamp identifier for a time of day when each chat message is entered. I aspects, the processing the first conversational dialogue in step (g) further includes determining a respective response target indicator for each chat message entered by the first sub-group, where the respective response target indicator provides an indication of a prior chat message to which each chat message is responding; the processing the second conversational dialogue in step (h) further includes determining a respective response target indicator for each chat message entered by the second sub-group, where the respective response target indicator provides an indication of a prior chat message to which each chat message is responding; and the processing the third conversational dialogue in step (i) further includes determining a respective response target indicator for each chat message entered by the third sub-group, where the respective response target indicator provides an indication of a prior chat message to which each chat message is responding. In some aspects, the processing the first conversational dialogue in step (g) further includes determining a respective sentiment indicator for each chat message entered by the first sub-group, where the respective sentiment indicator provides an indication of whether each chat message is in agreement or disagreement with prior chat messages; the processing the second conversational dialogue in step (h) further includes determining a respective sentiment indicator for each chat message entered by the second sub-group, where the respective sentiment indicator provides an indication of whether each chat message is in agreement or disagreement with prior chat messages; and the processing the third conversational dialogue in step (i) further includes determining a respective sentiment indicator for each chat message entered by the third sub-group, where the respective sentiment indicator provides an indication of whether each chat message is in agreement or disagreement with prior chat messages. In some aspects, the processing the first conversational dialogue in step (g) further includes determining a respective conviction indicator for each chat message entered by the first sub-group, where the respective conviction indicator provides an indication of conviction for each chat message; the processing the second conversational dialogue in step (h) further includes determining a respective conviction indicator for each chat message entered by the second sub-group, where the respective conviction indicator provides an indication of conviction for each chat message; and the processing the third conversational dialogue in step (i) further includes determining a respective conviction indicator for each chat message entered by the third sub-group, where the respective conviction indicator provides an indication of conviction each chat message is in the expressions of the chat message. In some aspects, the first unique portion of the population (i.e., a first sub-group) consists of no more than ten members of the population of human participants, the second unique portion consists of no more than ten members of the population of human participants, and the third unique portion consists of no more than ten members of the population of human participants. In some aspects, the first conversational dialogue includes chat messages including voice. In some aspects, the voice includes words spoken, and at least one spoken language component selected from the group of spoken language components consisting of tone, pitch, rhythm, volume and pauses. Such spoken language components are common ways in which emotional value can be assessed or indicated in vocal inflection. In some aspects, the first conversational dialogue includes chat messages including video. In some aspects, the video includes words spoken, and at least one language component selected from the group of language components consisting of tone, pitch, rhythm, volume, pauses, facial expressions, gestures, and body language. In some aspects, each of the repeating steps occurs after expiration of an interval. In some aspects, the interval is a time interval. In some aspects, the interval is a number of conversational interactions. In some aspects, the first different sub-group is the second sub-group, and the second different sub-group is the third sub-group. In some aspects, the first different sub-group is a first randomly selected sub-group, the second different sub-group is a second randomly selected sub-group, and the third different sub-group is a third randomly selected sub-group, where the first randomly selected sub-group, the second randomly selected sub-group and the third randomly selected sub—are not the same sub-group. In some examples, software components 250 process, in step (g), the first conversational dialogue at the collaboration server 205 using the large language model 200 to identify and express the first conversational argument in conversational form, where the identifying of the first conversational argument includes identifying at least one viewpoint, position or claim in the first conversational dialogue supported by evidence or reasoning, where the first conversational argument is not identified in the first different sub-group. In some examples, software components 250 process, in step (h), the second conversational dialogue at the collaboration server 205 using the large language model 200 to identify and express the second conversational argument in conversational form, where the identifying of the second conversational argument includes identifying at least one viewpoint, position or claim in the second conversational dialogue supported by evidence or reasoning, where the second conversational argument is not identified in the second different sub-group. In some examples, software components 250 process, in step (i), the third conversational dialogue at the collaboration server 205 using the large language model 200 to identify and express the third conversational argument in conversational form, where the identifying of the third conversational argument includes identifying at least one viewpoint, position or claim in the third conversational dialogue supported by evidence or reasoning, where the third conversational argument is not identified in the third different sub-group.

According to some aspects, software components 250 send, in step (a), the conversational prompt to the set of networked computing devices 225, the conversational prompt including a question to be collaboratively discussed by the population of human participants. In some examples, software components 250 present, in step (b), substantially simultaneously, a representation of the conversational prompt to each member of the population of human participants on a display of the computing device 225 associated with that member. In some examples, software components 250 divide, in step (c), the population of human participants into a first sub-group consisting of a first unique portion of the population, a second sub-group consisting of a second unique portion of the population, and a third sub-group consisting of a third unique portion of the population, where the first unique portion consists of a first set of members of the population of human participants, the second unique portion consists of a second set of members of the population of human participants and the third unique portion consists of a third set of members of the population of human participants, including dividing the population of human participants as a function of user 240 initial responses to the conversational prompt. In some examples, software components 250 collects and stores, in step (d), a first conversational dialogue in a first memory portion at the collaboration server 205 from members of the population of human participants in the first sub-group during an interval via a user 240 interface on the computing device 225 associated with each member of the population of human participants in the first sub-group. In some examples, software components 250 collect and store, in step (e), a second conversational dialogue in a second memory portion at the collaboration server 205 from members of the population of human participants in the second sub-group during the interval via a user 240 interface on the computing device 225 associated with each member of the population of human participants in the second sub-group. In some examples, software components 250 collect and store, in step (f), a third conversational dialogue in a third memory portion at the collaboration server 205 from members of the population of human participants in the third sub-group during the interval via a user 240 interface on the computing device 225 associated with each member of the population of human participants in the third sub-group. In some examples, software components 250 process, in step (g), the first conversational dialogue at the collaboration server 205 using a large language model 200 to express a first conversational summary in conversational form. In some examples, software components 250 process, in step (h), the second conversational dialogue at the collaboration server 205 using the large language model 200 to express a second conversational summary in conversational form. In some examples, software components 250 process, in step (i), the third conversational dialogue at the collaboration server 205 using the large language model 200 to express a third conversational summary in conversational form. In some examples, software components 250 send, in step (j), the first conversational summary expressed in conversational form to each of the members of a first different sub-group, where the first different sub-group is not the first sub-group. In some examples, software components 250 send, in step (k), the second conversational summary expressed in conversational form to each of the members of a second different sub-group, where the second different sub-group is not the second sub-group. In some examples, software components 250 send, in step (l), the third conversational summary expressed in conversational form to each of the members of a third different sub-group, where the third different sub-group is not the third sub-group. In some examples, software components 250 repeat, in step (m), steps (d) through (l) at least one time. In some examples, software components 250 send, in step (j), the first conversational summary expressed in conversational form to each of the members of a first different sub-group expressed in first person as if the first conversational summary were coming from an additional member (simulated) of the first different sub-group of the population of human participants. In some examples, software components 250 send, in step (k), the second conversational summary expressed in conversational form to each of the members of a second different sub-group expressed in first person as if the as if the second conversational summary were coming from an additional member (simulated) of the second different sub-group of the population of human participants. In some examples, software components 250 send, in step (l), the third conversational summary expressed in conversational form to each of the members of a third different sub-group expressed in first person as if the third conversational summary were coming from an additional member (simulated) of the third different sub-group of the population of human participants. In some examples, software components 250 process, in step (n), the first conversational summary, the second conversational summary, and the third conversational summary using the large language model 200 to generate a global conversational summary expressed in conversational form. In some examples, software components 250 send, in step (o), the global conversational summary expressed in conversational form to each of the members of the first sub-group, the second sub-group, and the third sub-group. In some aspects, a final global conversational summary is generated by weighting more recent ones of the global conversational summaries more heavily than less recent ones of the global conversational summaries. In some aspects, the dividing the population of human participants, in step (c), includes: assessing the initial responses to determine the most popular user 240 perspectives and dividing the population to distribute the most popular user 240 perspectives amongst the first sub-group, the second sub-group and the third sub-group. In some examples, software components 250 presents, substantially simultaneously, in step (b), a representation of the conversational prompt to each member of the population of human participants on a display of the computing device 225 associated with that member, where the presenting further includes providing a set of alternatives, options or controls for initially responding to the conversational prompt. In some aspects, the dividing the population of human participants, in step (c), includes: assessing the initial responses to determine the most popular user 240 perspectives and dividing the population to group users 240 having the first most popular user 240 perspective together in the first sub-group, users 240 having the second most popular user 240 perspective together in the second sub-group, and users 240 having the third most popular user 240 perspective together in the third sub-group.

According to some aspects, software components 250 monitor, in step (n), the first conversational dialogue for a first viewpoint, position or claim not supported by first examples, software reasoning or evidence. In some components 250 send, in step (o), in response to monitoring the first conversational dialogue, a first conversational question to the first sub-group requesting first reasoning or evidence in support of the first viewpoint, position or claim. In some examples, software components 250 monitor, in step (p), the second conversational dialogue for a second viewpoint, position or claim not supported by second reasoning or evidence. In some examples, software components 250 send, in step (q), in response to monitoring the second conversational dialogue, a second conversational question to the second sub-group requesting second reasoning or evidence in support of the second viewpoint, position or claim. In some examples, software components 250 monitor, in step (r), the third conversational dialogue for a third viewpoint, position or claim not supported by third reasoning or evidence. In some examples, software components 250 send, in step(s), in response to monitoring the third conversational dialogue, a third conversational question to the third sub-group requesting third reasoning or evidence in support of the third viewpoint, position or claim.

According to some aspects, software components 250 monitor, in step (n), the first conversational dialogue for a first viewpoint, position or claim supported by first reasoning or evidence. In some examples, software components 250 send, in step (o), in response to monitoring the first conversational dialogue, a first conversational challenge to the first sub-group questioning the first reasoning or evidence in support of the first viewpoint, position or claim. In some examples, software components 250 monitor, in step (p), the second conversational dialogue for a second viewpoint, position or claim supported by second reasoning or evidence. In some examples, software components 250 send, in step (q), in response to monitoring the second conversational dialogue, a second conversational challenge to the second sub-group questioning second reasoning or evidence in support of the second viewpoint, position or claim. In some examples, software components 250 monitor, in step (r), the third conversational dialogue for a third viewpoint, position or claim supported by third reasoning or evidence. In some examples, software components 250 send, in step(s), in response to monitoring the third conversational dialogue, a third conversational challenge to the third sub-group questioning third reasoning or evidence in support of the third viewpoint, position or claim. In some examples, software components 250 send, in step (o), the first conversational challenge to the first sub-group questioning the first reasoning or evidence in support of the first viewpoint, position, or claim, where the questioning the first reasoning or evidence includes a viewpoint, position, or claim collected from the second different sub-group or the third different sub-group.

According to some aspects, software components 250 process, in step (n), the first conversational summary, the second conversational summary, and the third conversational summary using the large language model 200 to generate a list of positions, reasons, themes or concerns from across the first sub-group, the second sub-group, and the third sub-group. In some examples, software components 250 display, in step (o), to the human moderator using the collaboration server 205 the list of positions, reasons, themes or concerns from across the first sub-group, the second sub-group, and the third sub-group. In some examples, software components 250 receive, in step (p), a selection of at least one of the positions, reasons, themes or concerns from the human moderator via the collaboration server 205. In some examples, software components 250 generate, in step (q), a global conversational summary expressed in conversational form as a function of the selection of the at least one of the positions, reasons, themes or concerns. In some aspects, the providing the local moderation application on at least one networked computing device 225, the local moderation application configured to allow the human moderator to observe the first conversational dialogue, the second conversational dialogue, and the third conversational dialogue. In some aspects, the providing the local moderation application on at least one networked computing device 225, the local moderation application configured to allow the human moderator to selectively and collectively send communications to members of the first sub-group, send communications to members of the second sub-group, and send communications to members of the third sub-group. In some examples, software components 250 sends, in step (r), the global conversational summary expressed in conversational form to each of the members of the first sub-group, the second sub-group, and the third sub-group.

According to some aspects, software components 250 process, in step (g), the first conversational dialogue at the collaboration server 205 using a large language model 200 to express a first conversational summary in conversational form. In some examples, software components 250 process, in step (h), the second conversational dialogue at the collaboration server 205 using the large language model 200 to express a second conversational summary in conversational form. In some examples, software components 250 in process, step (i), the third conversational dialogue at the collaboration server 205 using the large language model 200 to express a third conversational summary in conversational form. In some examples, software components 250 send, in step (j), the first conversational summary expressed in conversational form to each of the members of a first different sub-group, where the first different sub-group is not the first sub-group. In some examples, software components 250 send, in step (k), the second conversational summary expressed in conversational form to each of the members of a second different sub-group, where the second different sub-group is not the second sub-group. In some examples, software components 250 send, in step (l), the third conversational summary expressed in conversational form to each of the members of a third different sub-group, where the third different sub-group is not the third sub-group. In some examples, software components 250 repeat, in step (m), steps (d) through (l) at least one time. In some examples, software components 250 process, in step (n), the first conversational summary, the second conversational summary, and the third conversational summary using the large language model 200 to generate a global conversational summary expressed in conversational form. In some examples, software components 250 process, in step (n), the first conversational summary, the second conversational summary, third conversational summary using the large and the language model 200 to generate a first global conversational summary expressed in conversational form, where the first global conversational summary is tailored to the first sub-group, generate a second global conversational summary, where the second global conversational summary is tailored to the second sub-group, and generate a third global conversational summary, where the third global conversational summary is tailored to the third sub-group. In some examples, software components 250 send, in step (o), the first global conversational summary expressed in conversational form to each of the members of the first sub-group, send the second global conversational summary expressed in conversational form to the each of the members of the second sub-group, and send the third global conversational summary expressed in conversational form to each of the members of the third sub-group. In some examples, software components 250 process, in step (n), the first conversational summary, the second conversational summary, and the third conversational summary using the large language model 200 to generate a first global conversational summary expressed in conversational form, where the first global conversational summary is tailored to the first sub-group by including a viewpoint, position, or claim not expressed in the first sub-group, generate a second global conversational summary, where the second global conversational summary is tailored to the second sub-group by including a viewpoint, position, or claim not expressed in the second sub-group, and generate a third global conversational summary, where the third global conversational summary is tailored to the third sub-group by including a viewpoint, position, or claim not expressed in the third sub-group. In some examples, software components 250 process, in step (n), the first conversational summary, the second conversational summary, and the third conversational summary using the large language model 200 to generate a first global conversational summary expressed in conversational form, where the first global conversational summary is tailored to the first sub-group by including a viewpoint, position, or claim not expressed in the first sub-group, where the viewpoint, position, or claim not expressed in the first sub-group is collected from the first different subgroup, where the second global conversational summary is tailored to the second sub-group by including a viewpoint, position, or claim not expressed in the second sub-group, where the viewpoint, position, or claim not expressed in the second sub-group is collected from the second different subgroup, where the third global conversational summary is tailored to the third sub-group by including a viewpoint, position, or claim not expressed in the third sub-group, where the viewpoint, position, or claim not expressed in the third sub-group is collected from the third different subgroup.

According to some aspects, software components 250 send, in step (a), the conversational prompt to the set of networked computing devices 225, the conversational prompt including a question to be collaboratively discussed by the population of human participants. In some examples, software components 250 present, in step (b), substantially simultaneously, a representation of the conversational prompt to each member of the population of human participants on a display of the computing device 225 associated with that member. In some examples, software components 250 divide, in step (c), the population of human participants into a first sub-group consisting of a first unique portion of the population, a second sub-group consisting of a second unique portion of the population, and a third sub-group consisting of a third unique portion of the population, where the first unique portion consists of a first set of members of the population of human participants, the second unique portion consists of a second set of members of the population of human participants and the third unique portion consists of a third set of members of the population of human participants. In some examples, software components 250 collect and store, in step (d), a first conversational dialogue in a first memory 220 portion at the collaboration server 205 from members of the population of human participants in the first sub-group during an interval via a user 240 interface on the computing device 225 associated with each member of the population of human participants in the first sub-group, where the first conversational dialogue includes chat messages including a first segment of video including at least one member of the first sub-group. In some examples, software components 250 collect and store, in step (e), a second conversational dialogue in a second memory 220 portion at the collaboration server 205 from members of the population of human participants in the second sub-group during the interval via a user 240 interface on the computing device 225 associated with each member of the population of human participants in the second sub-group, where the first conversational dialogue includes chat messages including a second segment of video including at least one member of the second sub-group. In some examples, software components 250 collect and store, in step (f), a third conversational dialogue in a third memory 220 portion at the collaboration server 205 from members of the population of human participants in the third sub-group during the interval via a user 240 interface on the computing device 225 associated with each member of the population of human participants in the third sub-group, where the first conversational dialogue includes chat messages including a second segment of video including at least one member of the third sub-group. In some examples, software components 250 process, in step (g), the first conversational dialogue at the collaboration server 205 using a large language model 200 to express a first conversational summary in conversational form. In some examples, software components 250 process, in step (h), the second conversational dialogue at the collaboration server 205 using the large language model 200 to express a second conversational summary in conversational form. In some examples, software components 250 process, in step (i), the third conversational dialogue at the collaboration server 205 using the large language model 200 to express a third conversational summary in conversational form. In some examples, software components 250 send, in step (j), the first conversational summary expressed in conversational form to each of the members of a first different sub-group, where the first different sub-group is not the first sub-group. In some examples, software components 250 send, in step (k), the second conversational summary expressed in conversational form to each of the members of a second different sub-group, where the second different sub-group is not the second sub-group. In some examples, software components 250 send, in step (l), the third conversational summary expressed in conversational form to each of the members of a third different sub-group, where the third different sub-group is not the third sub-group. In some examples, software components 250 repeat, in step (m), steps (d) through (l) at least one time. In some examples, software components 250 sends, in step (j), the first conversational summary expressed in conversational form to each of the members of a first different sub-group expressed in first person as if the first conversational summary were coming from an additional member (simulated) of the first different sub-group of the population of human participants. In some examples, software components 250 send, in step (k), the second conversational summary expressed in conversational form to each of the members of a second different sub-group expressed in first person as if the as if the second conversational summary were coming from an additional member (simulated) of the second different sub-group of the population of human participants. In some examples, software components 250 send, in step (l), the third conversational summary expressed in conversational form to each of the members of a third different sub-group expressed in first person as if the third conversational summary were coming from an additional member (simulated) of the third different sub-group of the population of human participants. In some examples, software components 250 send, in step (j), the first conversational summary expressed in conversational form to each of the members of a first different sub-group expressed in first person as if the first conversational summary were coming from an additional member (simulated) of the first different sub-group of the population of human participants, including sending the first conversational summary in a first video segment including a graphical character representation expressing the first conversational summary through movement and voice. In some examples, software components 250 send, in step (k), the second conversational summary expressed in conversational form to each of the members of a second different sub-group expressed in first person as if the as if the second conversational summary were coming from an additional member (simulated) of the second different sub-group of the population of human participants, including sending the second conversational summary in a second video segment including a graphical character representation expressing the second conversational summary through movement and voice. In some examples, software components 250 send, in step (l), the third conversational summary expressed in conversational form to each of the members of a third different sub-group expressed in first person as if the third conversational summary were coming from an additional member (simulated) of the third different sub-group of the population of human participants, including sending the second conversational summary in a second video segment including a graphical character representation expressing the second conversational summary through movement and voice. In some examples, software components 250 send, in step (j), the first conversational summary expressed in conversational form to each of the members of a first additional different sub-group. In some examples, software components 250 send, in step (k), the second conversational summary expressed in conversational form to each of the members of a second additional different sub-group. In some examples, software components 250 send, in step (l), the third conversational summary expressed in conversational form to each of the members of a third additional different sub-group. In some examples, software components 250 process, in step (g), the first conversational dialogue at the collaboration server 205 using a large language model 200 to express a first conversational summary in conversational form, where the first conversational summary includes a first graphical representation of a first artificial agent. In some examples, software components 250 process, in step (h), the second conversational dialogue at the collaboration server 205 using the large language model 200 to express a second conversational summary in conversational form, where the second conversational summary includes a second graphical representation of a second artificial agent. In some examples, software components 250 process, in step (i), the third conversational dialogue at the collaboration server 205 using the large language model 200 to express a third conversational summary in conversational form, where the third conversational summary includes a third graphical representation of a third artificial agent.

A HyperChat Process

Embodiments of the present disclosure include a collaboration server that can divide a large group of people into small sub-groups. In some examples, the server can divide a large population (72 people) into 12 sub-groups of 6 people each, thereby enabling each sub-group's users to chat among themselves. The server can inject conversational prompts into the sub-groups in parallel such that the members are talking about the same issue, topic or question. At various intervals, the server captures blocks of dialog from each sub-group, sends it to a Large Language Model (LLM) via an API that summarizes and analyzes the blocks (using an Observer Agent for each sub-group), and then sends a representation of the summaries into other sub-groups. In some cases, the server expresses the summary blocks as first person dialogue that is part of the naturally flowing conversation (e.g., using a surrogate agent for each sub-group). Accordingly, the server enables 72 people to hold a real-time conversation on the same topic while providing for each person to be part of a small sub-group that can communicate conveniently and simultaneously has conversational information passed between sub-groups in the form of the summarized blocks of dialogue. Hence, conversational content propagates across the large population (i.e., each of the sub-groups) that provides for the large population to converge on conversational conclusions.

A conversational global summary is optionally generated after the sub-groups hold parallel conversations for some time with informational summaries passed between sub-groups. A representation of the global conversational summary is optionally injected into the sub-groups via the surrogate AI agent associated with that sub-group. As a consequence of the propagation of local conversational content across sub-groups and the optional injection of global conversational content into all sub-groups, the large population is enabled to hold a single unified deliberative conversation and converge over time towards unified conclusions or sentiments. With respect to global conversational summaries, when the server detects convergence in conclusions or sentiments (using, for example, the LLM via an API), the server can send the dialogue blocks that are stored for each of the parallel rooms to the Large Language Model and, using API calls, ask the LLM for processing. The processing includes generating a conversational summary across sub-groups, including an indication of the central points made among sub-groups, especially points that have strong support across sub-groups and arguments raised. In some cases, the processing assesses the strength of the sentiments associated with the points made and arguments raised. The global conversational summary is generated as a block of conversation expressed from the perspective of an observer who is watching each of the sub-groups. The global conversational summary can be expressed from the perspective of a global surrogate that expresses the summary inside each sub-group to inform the users of the outcome of the parallel conversations in other sub-groups, i.e., the conclusions of the large population (or a sub-population divided into sub-groups).

In some embodiments, the system provides a global summary to a human moderator that the moderator sees at any time during the process. Accordingly, the moderator is provided with an overall view of the discussions in the sub-groups during the process.

In some embodiments, the system summarizes the discussion of the entire population and injects the representation into different subgroups as an interactive first-person dialog. The first-person dialog may be crafted to provide a summary of a central theme observed across groups and instigate discussion and elaboration, thereby encouraging the subgroup to discuss the issue among themselves and build a consensus. The consensus is built across the entire population by guiding subgroups towards central themes and providing for the opportunity to explore, elaborate, or reject the globally observed premise.

In other embodiments, the globally injected summary and query for elaboration could be based not on a common theme observed globally but based on an uncommon theme observed globally (i.e., a divergent viewpoint). By directing one or more subgroups to brainstorm and/or debate divergent viewpoints that are surfaced globally (i.e., but not in high frequency among subgroups), the method effectively ensures that many subgroups consider the divergent viewpoint and potentially reject, accept, modify, or qualify the divergent viewpoint.

Figure 3:
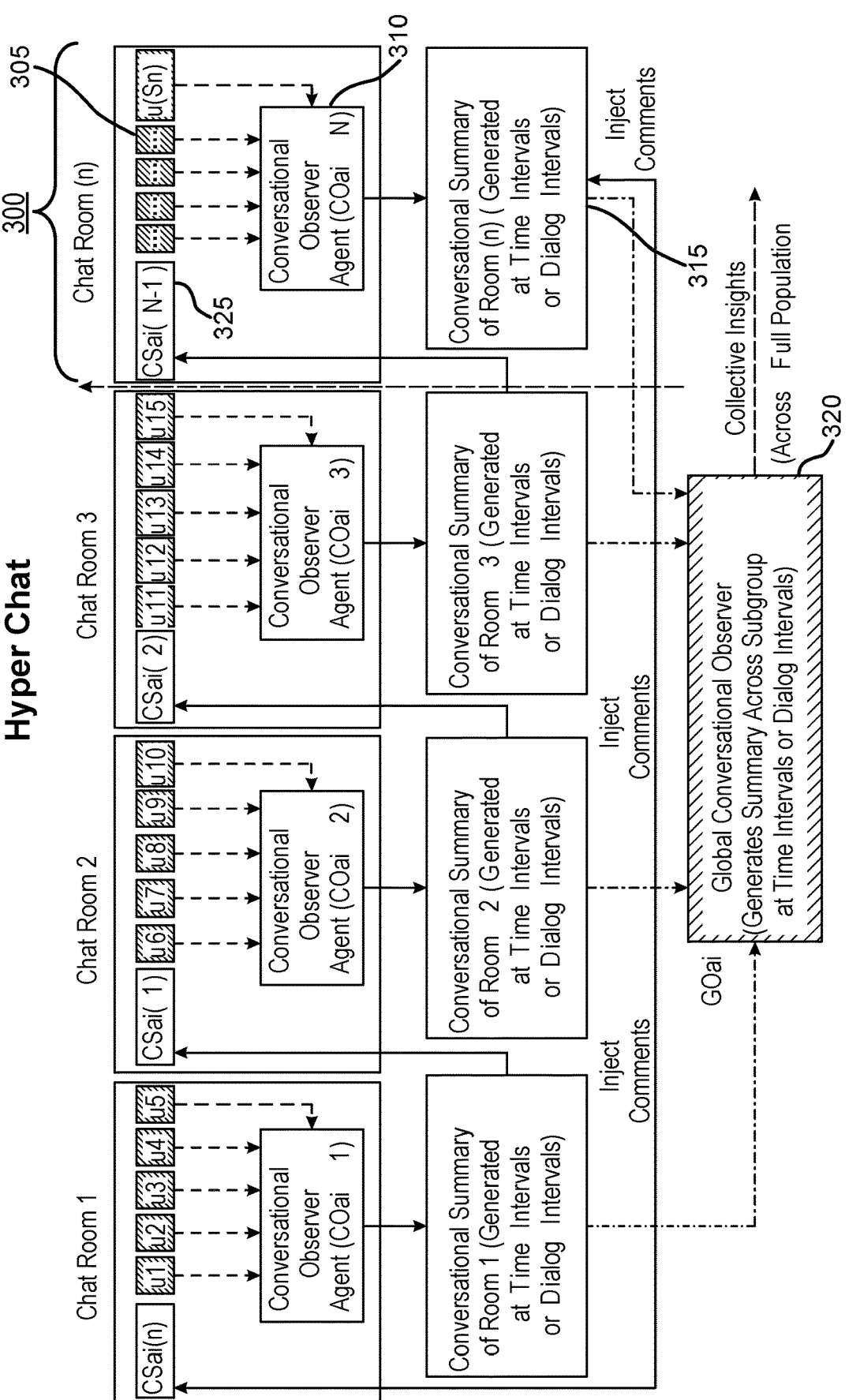
FIGS. 3 through 4 show examples of a HyperChat process according to aspects of the present disclosure.

FIG. 3 shows an example of a HyperChat process according to aspects of the present disclosure. The example shown includes chat room 300, conversational dialogue 315, and global conversation observer 320.

According to the exemplary HyperChat process shown in FIG. 3, a plurality of chat rooms 300 (n) include 5 users each. The number of users is used for instructional purposes. However, most implementations of HyperChat can employ different populations of users in each chat room.

In preferred embodiments, the full population (p) is divided into a sufficient number of chat rooms (n) such that the number of users in each room is appropriately sized for coherent deliberative real-time conversations. According to some experts, the ideal size for human groups to hold deliberative conversations ranges from 4 to 7 users, with significant degradation occurring in group sizes over 10 users. Thus, the collaboration server of the present embodiment can be configured in software to automatically divide a full population (p) of users into a sufficient number of sub-groups and associated chat rooms (n) so as to ensure the deliberating sup-groups fall within a target size range such as 4 to 7 users or to ensure the sub-group size does not go above a defined threshold size such as 10 users.

The users in the full population (p) are each using a computer (desktop, laptop, tablet, phone, etc. . . . ) running a HyperChat application to interact with the HyperChat server over a communication network in a client-server architecture. In the case of HyperChat, the client application enables users to interact with other users through real-time dialog via text chat and/or voice chat and/or video chat and/or avatar-based VR chat.

As shown in FIG. 3, the HyperChat system divides the population of users into smaller subgroups referred to herein as chat room 300 which can be text-based, voice-based, video-based and/or avatar-based. The term "room" is a structural matter and does not imply the sub-groups need to be in an environment that looks, feels, or is called a room. In some cases, the rooms are defined by the fact that a member of a given room can communicate conversationally in real-time with other members of the room by exchanging real-time text and/or by exchanging real-time voice and/or by exchanging real-time video and/or by exchanging real-time information that represents avatars associated with the respective users. Chat room 300 is an example of, or includes aspects of, the corresponding element described with reference to FIGS. 4-6, 8, and 9.

In certain aspects, chat room 300 includes user 305, conversational observation agent 310, and conversational surrogate agent 325. As an example shown in FIG. 3, there are 'n' sub-groups labeled Chat Room 1, Chat Room 2, Chat Room 3, and up to Chat Room (n) respectively. The (n) sub-groups or chat rooms each have five users assigned to them (for illustration purposes, as the number of users in each sub-group may vary). According to the example, Sub-Group 1 has users (u1) to (u5), Sub-Group 2 has users (u6) to (u10), Sub-Group 3 has users (u11) to (u15), which would continue in this pattern up to Sub-Group (n) which has users up to (u (p)). User 305 is an example of, or includes aspects of, the corresponding element described with reference to FIGS. 1, 2, 4-6, 8, and 9.

Additionally, each sub-group is assigned an AI Agent (i.e., conversational observer agent 310) that monitors that real-time dialog among the users of that subgroup. The real-time AI monitor can be implemented using an API to interface with a Foundational Model such as GPT-3 or ChatGPT from OpenAI or LaMDA from Google or from another provider of a Large Language Model system. Conversational observer agent 310 monitors the conversational interactions among the of sub-group and generates users that informational summaries 315 that assess, compress, and represent the informational content expressed by one or more users of the group (and optionally the conviction levels associated with different elements of informational content expressed by one or more users of the group). The informational summaries 315 are generated at various intervals, which can be based on elapsed time (e.g., at three minute intervals) or can be based on conversational interactions (for example, after a certain number of individuals speak via text or voice in that room).

In case of both, a time-based interval or a conversational-content-based interval, conversational observer agent 310 extracts a set of key points expressed by members of the group, summarizing the points in a compressed manner (using LLM), optionally assigning a conviction level to each of the points made based on the level of agreement (or disagreement) among participants and/or the level of conviction expressed in the language used by participants and/or the level of conviction inferred from facial expressions, vocal inflections, body posture and/or body gestures of participants (in embodiments that use microphones, cameras or other sensors to capture that information). The conversational observer agent 310 then transfers the summary to other modules in the system (e.g., global conversational observer 320 and conversational surrogate agent 325). Conversational observation agent 310 is an example of, or includes aspects of, the corresponding element described with reference to FIGS. 2, 4, 6, 9, and 10. Global conversational observer 320 is an example of, or includes aspects of, the corresponding element described with reference to FIGS. 4-6, and 9.

Conversational surrogate agent 325 in each of the chat rooms receives informational summaries or conversational dialog 315 from one or more conversational observer agents 310 and expresses the conversational dialog in first person to users 305 of each subgroup during real-time conversations. According to the example shown in FIG. 3, CSai (N-1) 325 is a conversational surrogate agent that receives conversational dialog from Subgroup (n-1) (i.e., based on the real-time conversations among humans in Chat Room (n-1)) and expresses a representation of the conversational dialog in natural language form (text and/or voice and/or expressive avatar) to users of another subgroup. For example, CSai (N-1) 325 is assigned to sub-group (n) (i.e., Chat room (n)) which indicates that it receives conversational dialog 315 from sub-group (n-1) and express a representation of the conversational dialog (in natural language) to the users of subgroup (n).

Conversational dialogue 315 is an example of, or includes aspects of, the corresponding element described with reference to FIG. 4. Hereinafter, conversational dialog may be referred to as informational summary and the two terms may be used interchangeably.

Additionally, FIG. 3 indicates that conversational surrogate agent (CSai-2) receives an informational summary from sub-group 2 and expresses a representation of the summary (as natural language) to the users of sub-group 3. Likewise, conversational surrogate agent CSai (1) receives informational summaries from sub-group 1 and expresses a representation of those summaries (as natural language) to the users of sub-group 2. In this way, subgroups shown in FIG. 3 may receive informational summaries from at least one other sub-group. This ensures informational propagation across the population (e.g., the full population) (p) of users and individual participants may communicate directly (i.e., hold direct conversations) with few (e.g., 4) other individuals.

Here, 'n' can be extended to any number of users, for example 1000 users could be broken into 200 subgroups, each with 5 users, enabling coherent and meaningful conversations within subgroups with a manageable number of participants while also enabling natural and efficient propagation of conversational information between subgroups, thereby providing for knowledge, wisdom, insights, and intuition to propagate from subgroup to subgroup and ultimately across the full population.

Accordingly, a large population (for example 1000 networked users) can engage in a single conversation such that each participant feels like they are communicating with a small subgroup of other users, and yet informational content is shared between subgroups.

The content that is shared between subgroups is injected by the conversational surrogate agent 325 as conversational content presented as text chat from a surrogate member of the group or voice chat from a surrogate member of the group or video chat from a simulated video of a human expressing verbal content or VR-based Avatar Chat from a 3D simulated avatar of a human expressing verbal content.

Conversational surrogate agent 325 can be identified as an AI agent that expresses a summary of the views, opinions, perspectives, and insights from another subgroup. For example, the CSai agent in a given room, can express verbally—"I am here to represent another group of participants. Over the last three minutes, they expressed the following points for consideration." In some cases, the CSai expresses the summarized points generated by conversational observer agent 310.

Additionally, conversational observer agent 310 may generate summarized points at regular time intervals or intervals related to dialogue flow. For example, if a three-minute interval is used, the conversational observer agent generates a conversational dialogue 315 of the key points expressed in a given room over the previous three minutes. It would then pass the conversational dialogue 315 to a conversational surrogate agent 325 associated with a different subgroup. The surrogate agent may be designed to wait for a pause in the conversation in the subgroup (i.e., buffer the content for a short period of time) and then inject the conversational dialogue 315. The summary, for example, can be textually or verbally conveyed as—"Over the last three minutes, the participants in Subgroup 22 expressed that Global Warming is likely to create generational resentment as younger generations blame older generations for not having taken action sooner. A counterpoint was raised that younger generations have not shown sufficient urgency themselves."

In a more natural implementation, the conversational surrogate agent may be designed to speak in the first person, representing the views of a subgroup the way an individual human might. In this case, the same informational summary quoted in the paragraph above could be verbalized by the conversational surrogate agent as follows—"Having listened to some other users, I would argue Global Warming is likely to create generational resentment as younger generations blame older generations for not acting sooner. On the other hand, we must also consider that younger generations have not shown sufficient urgency themselves."

"First person" in English refers to the use of pronouns such as "I," "me," "we," and "us," which allows the speaker or writer, e.g., the conversational surrogate, to express thoughts, feelings, experiences, and opinions directly. When a sentence or a piece of writing is in the first person, it is written from the perspective of the person speaking or writing. An example of a sentence written in the first person is "I believe that the outcome of the Super Bowl is significantly dependent upon the Chief's quarterback Mahomes, who has been inconsistent in recent weeks."

In an even more natural implementation, the conversational surrogate agent might not identify that it is summarizing the views of another subgroup, but simply offer opinions as if it was a human member of the subgroup—"It's also important to consider that Global Warming is likely to create generational resentment as younger generations blame older generations for not acting sooner. On the other hand, we must also consider that younger generations have not shown sufficient urgency themselves."

In the three examples, a block of informational content is generated by one subgroup, summarized to extract the key points, and then expressed into another subgroup. This provides for information propagation such that the receiving subgroup can consider the points in an ongoing conversation. The points may be discounted, adopted, or modified by the receiving subgroup. Since such information transfer is happening in each subgroup parallelly, a substantial amount of information transfer occurs.

As shown in FIG. 3, the amplification of collective intelligence (across the full population) can be overseen by a third artificial agent, i.e., global conversational observer agent (GOai) 320. Global conversational observer 320 takes informational summaries as input from each of the conversational observer agents 310 (which include an extraction of key points and optionally include confidence and conviction assessments associated with each of the key points) across a plurality of the subgroups and produces a global informational summary at various intervals, i.e., based on elapsed time (e.g., based on five minute elapsed time and/or five minute intervals) or can be based on conversational interactions (for example, after a certain amount of dialogue has been generated across groups).

In case of each, a time-based interval or a conversational content-based interval, global conversational observer 320 extracts a set of key points expressed across subgroups, summarizes the points in a compressed manner, optionally assigning a conviction level to each of the points made based on the conviction identified within particular subgroups and/or based on the level of agreement across subgroups. Global conversational observer 320 documents and stores informational summaries 315 at regular intervals, thereby documenting a record of the changing sentiments of the full population over time and is also designed to output a final summary at the end of the conversation based on some or all of the stored global records. In some embodiments, when generating an updated or a Final Conversation Summary, the global conversational observer 320 weights the informational summaries 315 generated towards the end of the conversation substantially higher than those generated at the beginning of the conversation, as is generally assumed each group (and the networked of groups) gradually converges on the collective insights over time. Global conversational observer 320 is an example of, or includes aspects of, the corresponding element described with reference to FIGS. 4 and 5.

According to an exemplary embodiment, the collaborative system may be implemented among 800 people ((p)=800) to forecast the team that will win the Super Bowl next week. The conversational prompt in the example can be as follows—"The Kansas City Chiefs are scheduled to play the Philadelphia Eagles in the Super Bowl this Sunday. Who is going to win the game and why? Please discuss."

The prompt is entered by a moderator and i distributed by the HyperChat server (e.g., collaboration server as described with reference to FIGS. 1-2) to each of the HyperChat clients over communication networks (e.g., 800 users on the networked computing device described in FIGS. 1-2). The local HyperChat client application (e.g., local chat application described in FIGS. 1-2) that is running on the computer associated with each user displays the conversational prompt to the user. Thus, the prompt is sent from the collaboration server to 800 computing devices (e.g., desktops, laptops, phones, tablets, or other suitable devices with processing, input, and display capabilities). The prompt is shown to 800 users by the computing device associated with each user. The prompt can be displayed as text or as verbal content using a simulated voice. In some cases, the prompt can be provided by a visual representation of a human moderator (i.e., either a simulated flat video image or a 3D avatar). Thus, the 800 users who participate in the collaborative discussion and forecasting effort each receive the prompt: "The Kansas City Chiefs are scheduled to play the Philadelphia Eagles in the Super Bowl this Sunday. Who is going to win the game and why? Please discuss." In preferred embodiments, this happens at substantially the same time coordinated by the server, thus ensuring that all participants (across the plurality of sub-groups) kick off the discussion together.

The HyperChat server (i.e., collaboration server as described in FIGS. 1-2) performs a computational task that divides the 800 users into 80 subgroups (i.e., n=80) of 10 users each. The 80 subgroups can be considered as "Chat Room 1", "Chat Room 2", to "Chat Room 80". Thus, each of the 800 users are uniquely assigned to one of the 80 chat rooms. In some cases, the chat rooms can appear to the user as traditional text chat rooms in which each user is represented by a unique username in text with 10 such unique usernames in each room. In some cases, the chat rooms can appear to the user as a video conference call (e.g., Zoom) in which each user is represented by a webcam video feed with 10 video feeds in each room. The chat rooms can appear to the user as a 3D virtual conference room (e.g., Horizon Workroom) in which each of the 10 users appear as 3D avatars sitting around a virtual conference table to hold a conversation.

Accordingly, the HyperChat server creates 80 unique conversational spaces and assigns 10 unique users to each of the spaces and enables the 10 users in each space to hold a real-time conversation with the other users in the space. Each of the users are aware that the topic to be discussed, as injected into the rooms by the HyperChat Server, is "The Kansas City Chiefs are scheduled to play the Philadelphia Eagles in the Super Bowl this Sunday. Who is going to win the game and why? Please discuss."

According to some embodiments, a timer appears in each room, giving each subgroup six minutes to discuss the issue, surfacing the perspectives and opinions of various members of each group. As the users engage in real-time dialog (by text, voice, video, and/or 3D avatar), the conversational observer agent associated with each room monitors the dialogue. At one-minute intervals during the six minute discussion, the conversational observer agent associated with each room may be configured to automatically generate an informational summary for that room for that one-minute interval. In some embodiments, the informational summary can refer to storing the one-minute interval of dialogue (e.g., either captured as text directly or converted to text through known speech to text methods) and then sending the one minute of text to a foundational AI model (e.g., ChatGPT)

via an API with a request that the Large Language Model summarize the one minute of text, extracting the most important points and ordering the points from most important to least important based on the conviction of the subgroup with regard to each point. Conviction may be assessed based on the strength of the sentiment assessing each point by individual members and/or based on the level of agreement among members on each point. The ChatGPT engine produces an informational summary for each conversational observer agent (i.e., an informational summary for each group. Note—in this example, this process of generating the conversational summary of the one-minute interval of conversation would happen multiple times during the full six-minute discussion.)

Each time a conversational summary is generated for a sub-group by an observer agent, a representation of the informational content is then sent to a conversational surrogate agent in another room. As shown in FIG. 3, each room is associated with another room in a ring structure where the conversational observer agent of the last room in the list is associated with a conversational surrogate agent associated with the first room. While a ring structure is a viable way to have information propagate across all rooms, other network structures are possible for connecting conversational observer agent from one room to conversational surrogate agent in other rooms. In some examples, the network structures can include a ring structure with jumper cables across the ring to drive faster propagation of information. The network structure can also include randomized connections and/or small world connections.

Assuming the ring network structure shown in FIG. 3, at the end of each one-minute interval, an informational summary about the prior one minute of conversation held in Chat Room 1 will be injected into Chat Room 2 (via a conversational surrogate agent). At substantially the same time, an informational summary about the prior one-minute conversation held in Chat Room 2 will be injected into Chat Room 3 (via a conversational surrogate agent). The same thing happens between Chat Rooms 3 and 4, to the remaining pairs of rooms until an informational summary about the conversation held in Chat Room 80 will be injected into Chat Room 1 (via a conversational surrogate agent). Accordingly, each chat room is exposed to a conversational summary from another chat room. And this repeats over time, for multiple intervals, thereby enabling conversations in parallel chat rooms to remain independent but coordinated over time by the novel use of information propagation.

For example, a conversational surrogate agent in Chat Room 22 may express the informational summary received from Chat Room 21 as follows—"Having listened to another group of users, I would argue that the Kansas City Chiefs are more likely to win the Super Bowl because they have a more reliable quarterback, a superior defense, and have better special teams. On the other hand, recent injuries to the Chiefs could mean they don't play up to their full capacity while the Eagles are healthier all around. Still, considering all the issues the Chiefs are more likely to win."

The human participants in Chat Room 22 are thus exposed to the above information, either via text (in case of a text-based implementation) or by live voice (in case of a voice video chat, video chat, or avatar-based implementation). A similar process is performed in each room, i.e., with different information summaries.

In parallel to each of the informational summaries being injected into an associated subgroups for consideration by the user of the subgroup, the informational summaries for the 80 subgroups are routed to the global conversational observer agent which summarizes the key points across the 80 subgroups and assesses conviction and/or confidence based on the level of agreement among subgroups. For example, if 65 of the 80 subgroups were leaning towards the Chiefs as the likely Super Bowl winner, a higher conviction score would be assigned to that sentiment as compared to a situation where, for example, as few as 45 of the 80 subgroups were leaning towards the Chiefs as the likely Superbowl Winner.

Additionally, when the users receive the informational summary from another room into their room, an optional updated prompt may be sent to each room and displayed, asking the members of each group to have an additional conversational period in light of the updated prompt, thus continuing the discussion in consideration of their prior discussion and the information received from another subgroup and the updated prompt. Int this example, the second conversational period can be another six-minute period. However, in practice the system may be configured to provide a slightly shorter time period. For example, a four-minute timer is generated in each subgroup.

In some cases, the users engage in real-time dialogue (by text, voice, video, and/or 3D avatar) for the allocated time period (e.g., four minutes). At the end of four minutes, the conversational observer agent associated with each room is tasked with generating a new informational summary for the room for the prior four minutes using similar techniques. In some embodiments, the summary includes the prior six-minute time period, but is weighted less in importance. In some cases, conviction may be assessed based on the strength of the sentiment assessing each point by individual members and/or based on the level of agreement among members on each point. Additionally, agreement of sentiments in the second time period with the first time period may also be used as an indication of higher conviction.

The informational summary from each conversational observer agent is then sent to a conversational surrogate agent in another room. Assuming the ring network structure shown in FIG. 3, an informational summary about the prior four-minute conversation held in Chat Room 1 is injected into Chat Room 2 (via a conversational surrogate agent). At substantially the same time, an informational summary about the prior four-minute conversation held in Chat Room 2 is injected into Chat Room 3 (via a conversational surrogate agent). The same process is performed between Chat Rooms 3 and 4, till the 79 pairs of rooms, etc. until an informational summary about the conversation held in Chat Room 80 is injected into Chat Room 1 (via a conversational surrogate agent). Accordingly, each chat room is exposed to a second conversational summary from another chat room.

Regardless of the specific time periods used as the interval for conversational summaries, each room is generally exposed to multiple conversational summaries over the duration of a conversation. In the simplest case of a first time period and a second time period, it is important to clarify that in the second time period, each room is exposed to a second conversational summary from the second time period reflecting the sentiments of the same subgroup it received a summary from in the first time period. In other embodiments, the order of the ring structure can be randomized between time periods, such that in the second time period, each of the 80 different subgroups is associated with a different subgroup than it was associated with in the first time period. In some cases, such randomization increases the informational propagation across the population.

In case of a same network structure or an updated network structure used between time periods, the users consider the informational summary in the room and then continue the conversation about who will win the super bowl for the allocated four-minute period. At the end of the four-minute period, the process may repeat with another round (e.g., for another time period, for example of two minutes, with another optionally updated prompt). In some cases, the process can conclude if the group has sufficiently converged on a collective intelligence prediction, solution, or insight.

At the end of various conversational intervals (by elapsed time or by elapsed content), the Collaboration Server can be configured to optionally route the informational summaries for that interval to the global conversational observer agent which summarizes the key points across the (n) subgroups and assesses conviction and/or confidence based on the level of agreement among subgroups to assess if the group has sufficiently converged. For example, the Collaboration Server can be configured to assess if the level of agreement across subgroups is above a threshold metric. If so, the process is considered to reach a conversational consensus. Conversely, if the level of agreement across subgroups has not reached a threshold metric, the process may demand (e.g., and include) further deliberation. In this way, the Collaboration Server can intelligently guide the population to continue deliberation until a threshold level of agreement is reached, at which point the Collaboration Server ends the deliberation.

In case of further deliberation, an additional time period is automatically provided and the subgroups are tasked with considering the latest informational summary from another group along with their own conversations and discuss the issues further. In the case of the threshold being met, the Conversation Server can optionally send a Final Global Conversational Summary to all the sub-groups, informing all participants of the final consensus reached.

Accordingly, embodiments of the present disclosure include a HyperChat process with multiple rounds. Before the rounds start, the population is split into a set of (n) subgroups, each with (u) users. In some cases, before the rounds start, a network structure is established that identifies the method of feeding information between subgroups. As shown in FIG. 3, a ring structure is used such that each subgroup is numbered from 1 to N and wherein an informational summary from each subgroup X is generated by a Conversational Observer Agent (e.g., using a Foundational AI model such as ChatGPT) and is fed into subgroup X+1 and expressed conversationally within that subgroup by a Conversational Surrogate Agent (e.g., using a Foundational AI model such as ChatGPT). The Informational Summary of Subgroup N is fed back to the beginning of the list, injected into Subgroup 1 because this is a ring structure. In addition, at the end of each round the Global Conversational Observer Agent generates an Informational Summary across subgroups N. Rounds repeat one after another, stopping when the Informational Summary across subgroups N has reached a sufficient threshold of agreement and/or conviction in an outcome. In some embodiments, a threshold number (e.g., a maximum number) of rounds is defined, and if the group reaches the threshold number of rounds (e.g., the maximum number of rounds) without reaching sufficient threshold of agreement and/or conviction, an output is delivered along with an indication that the group could not find sufficient consensus.

In some embodiments, the informational summary fed into each subgroup is based on a progressively larger number of subgroups. For example, in the first round, each subgroup gets an informational summary based on the dialog in one other subgroup. In the second round, each subgroup gets an informational summary based on the dialog within two subgroups. In the third round, each subgroup gets an informational summary based on the dialog within four subgroups. In this way, the system helps drive the population towards increasing consensus.

In some embodiments, there are no discrete rounds but instead a continuously flowing process in which subgroups continuously receive Informational Summaries from other subgroups, e.g., based on new points being made within the other subgroup (i.e., not based on time periods).

According to some embodiments, the Conversational Surrogate agents selectively insert arguments into the subgroup based on arguments provided in other subgroups (based on the information received using the Conversational Observer agents). For example, the arguments may be counterpoints to the subgroup's arguments based on counterpoints identified by other Conversational Observers, or the arguments may be new arguments that were not considered in the subgroup that were identified by other Conversational Observers watching other subgroups.

In some cases, a functionality is defined to enable selective argument insertion by a Conversational Surrogate agent that receives conversational summary information from a subgroup X and inserts selective arguments into its associated subgroup Y. For example, a specialized Conversational Surrogate associated with subgroup performs additional functions. In some examples, the functions may include monitoring the conversation within subgroup Y and identifying the distinct arguments made by users during deliberation, maintaining a listing of the distinct arguments made in subgroup y, optionally ordered by assessed importance of the arguments to the conversing group, and when receiving a conversational summary from a Conversational Observer agent of subgroup X, comparing the arguments made in the conversational summary from subgroup X with the arguments that have already been made by participants in subgroup Y, identifying any arguments made in the conversational summary from subgroup x that were not already made by participants in the dialog within subgroup Y. Additionally, the functions may include expressing to the participants of subgroup Y as dialog via text or voice, one or more arguments extracted from the conversational summary from subgroup x that was identified as having not already been raised within subgroup x.

The present disclosure describes systems and methods that can enable large, networked groups to engage in real-time conversations with informational flow throughout the population without the drawbacks of individuals needing to communicate directly within unmanageable group sizes. Accordingly, multiple individuals (thousands or even millions) can engage in a unified conversation that aims to converge upon a singular prediction, decision, evaluation, forecast, assessment, diagnosis, or recommendation while leveraging the full population and the associated inherent collective intelligence.

Figure 4:
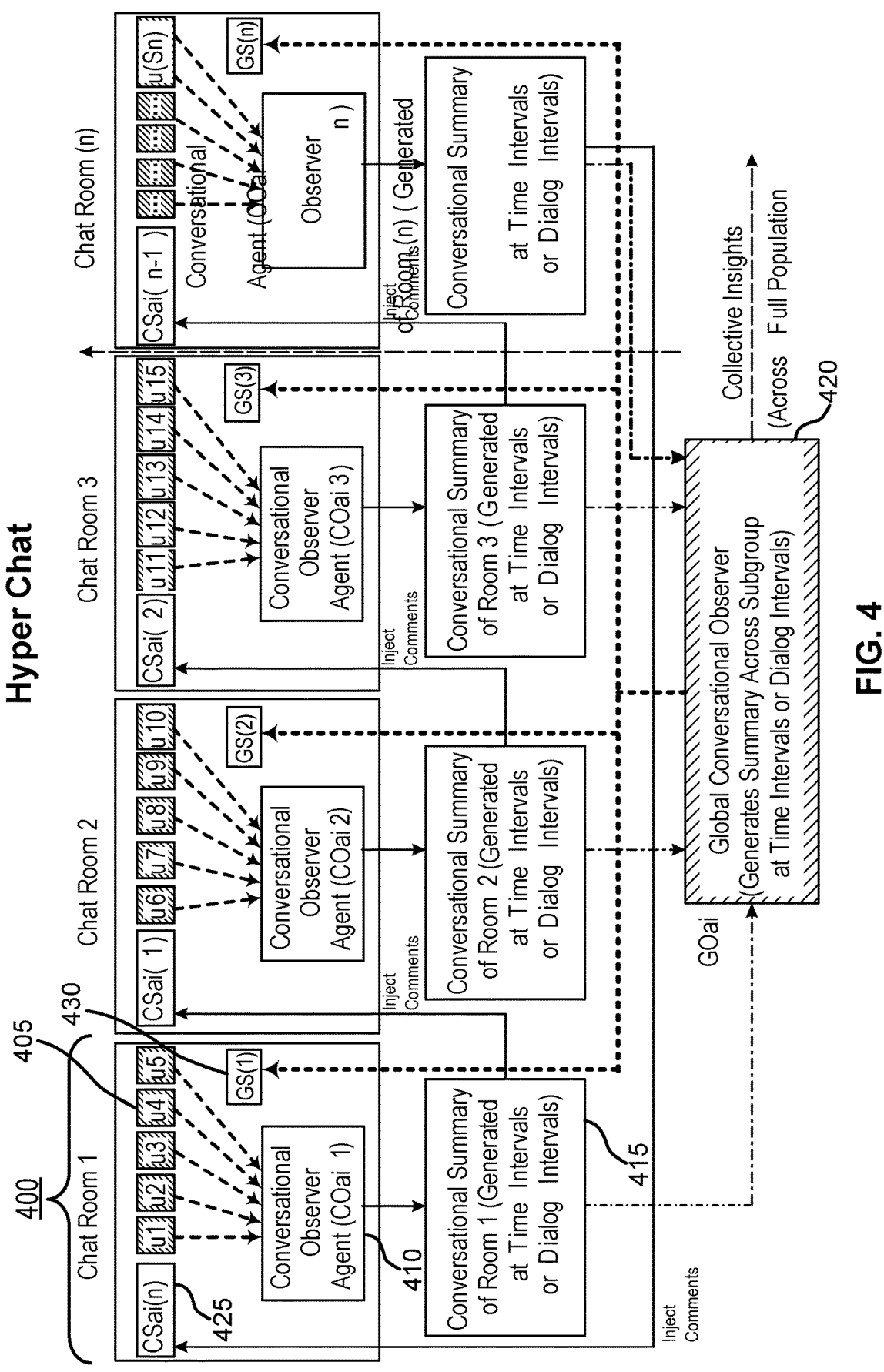

FIG. 4 shows an example of a HyperChat process according to aspects of the present disclosure. The example shown includes chat room 400, conversational dialogue 415, and global conversation observer 420. The HyperChat process of FIG. 4 is substantially the same as described with reference to FIG. 3 and hence repeated descriptions are omitted for brevity.

Chat room 400 is an example of, or includes aspects of, the corresponding element described with reference to FIGS. 3, 5, 6, 8, and 9. In certain aspects, chat room 400 includes user 405, conversational observation agent 410, conversational surrogate agent 425, and global surrogate agent 430.

As shown with reference to FIG. 4, a Global Surrogate Agent (GS) 430 can be added to each subgroup to selectively represent the views, arguments, and narratives that have been observed across the full population during a recent time period. For example, GS (n) in FIG. 4 represents the Global Surrogate agent present in chat room n. The Global Surrogate agent 430 in each room (n) is configured to impart conversational content (as text, voice, video, and/or 3D avatar) into a single subgroup (chat room) based on the Global Conversational Summary generated by the Global Conversational Observer 420 (as described with reference to FIG. 3). The views represented by each GS (n) agent 430 into each subgroup (n) may be identical. Global surrogate agent 430 is an example of, or includes aspects of, the corresponding element described with reference to FIG. 11.

Global conversation observer 420 is an example of, or includes aspects of, the corresponding element described with reference to FIGS. 3, 5, 6, and 9.

In some embodiments, the views represented by each GS (n) agent 430 into each subgroup (n) can be custom tailored for the subgroup based on the subgroup's interactive dialog (among users 405), as analyzed by the subgroup's Conversational Observer (i.e., conversational observation agent 410) and/or can be based on the analysis of pre-session data that is optionally collected from participants and used in the formation of subgroups. User 405 is an example of, or includes aspects of, the corresponding element described with reference to FIGS. 1-3, 5, 6, 8, and 9. Conversational observation agent 410 is an example of, or includes aspects of, the corresponding element described with reference to FIGS. 2, 3, 6, 9, and 10.

For example, a GS agent 430 may summarize the population's discussion and inject a representation of the summary as interactive dialog into subgroups. For example, considering the Super Bowl prediction, the GS agent may be configured to inject a summary into subgroups and ask for elaboration based on a central theme that was observed. For example, the analysis across subgroups (by the Global Conversational Observer Agent) may indicate that most groups agree the outcome of the Super Bowl depends on whether the Chief's quarterback Mahomes, who has been playing hot and cold, plays well on Super Bowl day. Based on the observed theme, the injected dialog by the GS agent may be—"I've been watching the conversation across the many subgroups and a common theme has appeared. It seems many groups believe that the outcome of the Super Bowl is significantly dependent upon the Chief's quarterback Mahomes, who has been inconsistent in recent weeks. What could affect Mahomes' performance this Sunday and do we think Mahomes is likely to have a good day?". Such a first-person dialog may be crafted (e.g., via ChatGPT API) to provide a summary of a central theme observed across groups and then ask for discussion and elaboration, thereby encouraging the subgroup to discuss the issue. Accordingly, a consensus is built across the entire population by guiding subgroups towards central themes and providing for the opportunity to explore, elaborate, or reject the globally observed premise.

In some embodiments, the phrasing of the dialog from the GS agent may be crafted from the perspective of an ordinary member of the subgroup, not highlighting the fact that the agent is an artificial observer. For example, the dialog above could be phrased as "I was thinking, the outcome of the Super Bowl is significantly dependent upon the Chief's quarterback Mahomes, who has been inconsistent in recent weeks. What could affect Mahomes' performance this Sunday and do we think Mahomes is likely to have a good day?" This phrasing expresses the same content, but optionally presents it in a more natural conversational manner.

In some embodiments, the globally injected summary and query for elaboration could be based not on a common theme observed globally but based on an uncommon theme observed globally (i.e., a divergent viewpoint). By directing one or more subgroups to brainstorm and/or debate divergent viewpoints that are surfaced globally (i.e., but not in high frequency among subgroups), this software mediated method can be configured to ensures that many subgroups consider the divergent viewpoint and potentially reject, accept, modify, or qualify the divergent viewpoint. This has the potential to amplify the collective intelligence of the group, by propagating infrequent viewpoints and conversationally evoking levels of conviction in favor of, or against, those viewpoints for use in analysis. In an embodiment, the Global Surrogate Agents present the most divisive narratives to subgroups to foster global discussion around key points of disagreement.

One or more embodiments of the present disclosure further include a method for challenging the views and/or biases of individual subgroups based on the creation of a Conversational Instigator Agent that is designed to intelligently stoke conversation within subgroups in which members are not being sufficiently detailed in expressing the rationale for the supported positions or rejected positions. In such cases, a Conversational Instigator Agent can be configured to monitor and process the conversational dialog within a subgroup and identify when positions are expressed (for example, the Chiefs will win the Super Bowl) without expressing detailed reasons for supporting that position. In some cases, when the Conversational Instigator Agent identifies a position that is not associated with one or more reasons for the position, it can inject a question aimed at the human member who expressed the unsupported position. For example, "But why do you think the Chiefs will win?" In other cases, it can inject a question aimed at the subgroup as a whole. For example, "But why do we think the Chiefs will win?"

In addition, the Conversational Instigator Agent can be configured to challenge the expressed reasons that support a particular position or reject a particular position. For example, a human member may express that the Chiefs will win the Super Bowl "because they have a better offense." The Conversational Instigator Agent can be configured to identify the expressed position (i.e., the Chiefs will win) and identify the supporting reason (i.e., they have a better offense) and can be further configured to challenge the reason by injecting a follow-up question, "But why do you think they have a better offense?". Such a challenge then instigates one or more human members in the subgroup to surface reasons that support the position that the Chiefs have a better offense, which further supports the position that the Chiefs will win the Super Bowl. In some embodiments, the Conversational Instigator Agent is designed to probe for details using specific phraseology, for example, responding to unsupported or weakly supported positions by asking "But why do you support" the position, or asking "Can you elaborate" on the position. Such phraseologies provide an automated method for the AI agents to stoke the conversation and evoke additional detail in a very natural and flowing way. Accordingly, the users do not feel the conversation has been interrupted, stalled, mediated, or manipulated.

According to some embodiments, one or more designated human moderators are enabled to interface with the Global Conversational Agent and directly observe a breakdown of the most common positions, reasons, themes, or concerns raised across subgroups and provide input to the system to help guide the population-wide conversation. In some cases, the Human Moderator can indicate (through a standard user interface) that certain positions, reasons, themes, or concerns be overweighted when shared among or subgroups. This can be achieved, for example, by enabling the Human Moderator to view a displayed listing of expressed reasons and the associated level of support for each, within a subgroup and/or across subgroups clicking on one or more to be overweighted. In other cases, the Human Moderator can indicate that certain positions, reasons, themes, or concerns be underweighted when shared among or across subgroups. For example, Human Moderators are enabled to indicate that certain positions, reasons, themes, concerns be barred from sharing among and across subgroups, for example to mitigate offensive or inappropriate content, inaccurate information, or threads that are deemed off-topic. In this way, the Human Moderator can provide real-time input that influences the automated sharing of content by the Conversational Instigator Agent, either increasing or decreasing the amount of sharing of certain positions, reasons, themes, or concerns among subgroups.

The loudest person in a room can greatly sway the other participants in that room. In some cases, such effects may be attenuated using small rooms, thereby containing the impact of the loudest person to a small subset of the full participants, and only passing information between the rooms that gain support from multiple participants in that room. In some embodiments, for example, each room may include only three users and information only gets propagated if a majority (i.e., two users) express support for that piece of information. In other embodiments, different threshold levels of support may be used other than majority. In this way, the system may attenuate the impact of a single loud user in a given room, requiring a threshold support level to propagate their impact beyond that room.

Figure 5:
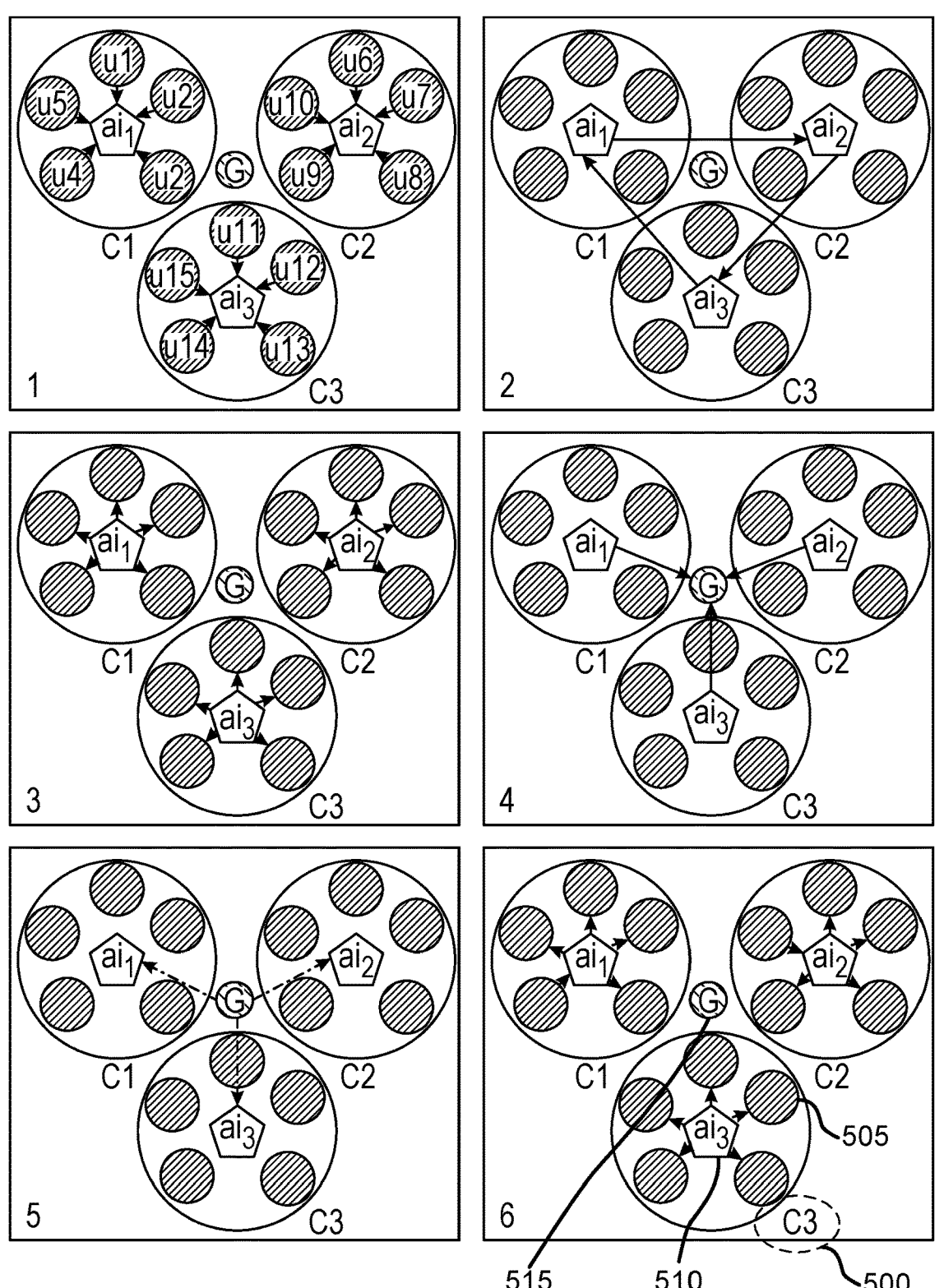
FIGS. 5 through 6 show examples of an interaction process according to aspects of the present disclosure.

FIG. 5 shows an example of an interaction process according to aspects of the present disclosure. The example shown includes chat room 500 and global conversation observer 515.

Chat room 500 is an example of, or includes aspects of, the corresponding element described with reference to FIGS. 3, 4, 6, 8, and 9. In certain aspects, chat room 500 includes user 505 and computing device 510. User 505 is an example of, or includes aspects of, the corresponding element described with reference to FIGS. 1-4, 6, 8, and 9.

In certain aspects, computing device 510 may include a conversational observer agent and a conversational surrogate agent. Computing device 510 is an example of, or includes aspects of, the corresponding element described with reference to FIGS. 1, 2, and 11. Conversational observer agent and conversational surrogate agent are examples of, or includes aspects of, the corresponding elements described with reference to FIGS. 1, 2, 3, 6, and 11. Global conversation observer 515 is an example of, or includes aspects of, the corresponding element described with reference to FIGS. 3, 4, 6, and 9.

As an example shown in FIG. 5, the interactive process for a collaboration system is shown as a 6 step process (indicated by numbers 1-6). For example, in a first step (indicated in 1), users u1 to u15 in chat rooms C1, C2, and C3 perform parallel chat conversations that are captured by AI-based computing device 510 represented as ai1, ai2, and ai3 in chat rooms C1, C2, and C3 respectively. Details regarding the functions of the computing device are provided in FIGS. 1-4.

Each computing device 510 uses a LLM to generate an informational summary of the conversation of the chat rooms C1, C2, and C3. A representation of the informational summary thus generated is sent to the conversational agent of the next chat room in a ring structure as the second step (indicated in 2). For example, the computing device ai1 of chat room C1 sends the summary of chat room C1 to the computing device a2 of chat room C2. Similarly, the computing device ai2 of chat room C2 sends the summary of chat room C2 to the computing device ai3 of chat room C3 and the computing device ai3 of chat room C3 sends the summary of chat room C3 to the computing device ai1 of chat room C1. Further details regarding transferring the summary to other chat rooms is provided with reference to FIG. 3.

Each computing device 510 of a chat room shares the informational summary received from the other chat room to the users of the respective chat room (as a third step indicated by 3). As an example shown in FIG. 5, the computing device ai1 of chat room C1 shares the summary of chat room C3 with the users of chat room C1. Similarly, the computing device ai2 of chat room C2 shares the summary of chat room C1 with the users of chat room C2 and the computing device ai3 of chat room C3 shares the summary of chat room C2 with the users of chat room C3. Further description regarding this step is provided with reference to FIG. 3.

Steps 1, 2 and 3 may optionally repeat a number of times, enabling users to hold deliberative conversations in the three parallel chat rooms for multiple intervals after which conversational information propagates across rooms as shown.

In step four, the Computing device 510 corresponding to each chat room sends the informational summary to global conversation observer (G) 515 (fourth step indicated by 4). The global conversation observer 515 generates a global conversation summary after the each of the chat rooms hold parallel conversations for some time while incorporating content from the informational summaries passed between chat rooms. For example, the global conversation summary is generated based on the informational summaries from each chat room over one or more conversational intervals.

In the fifth and sixth steps (indicated in 5 and 6), the global conversation summary is provided to computing device 510 of each chat room C1, C2, and C3, which in turn share the global conversation summary with the users in the chat room. Details regarding this step are provided with reference to FIG. 3.

Figure 6:
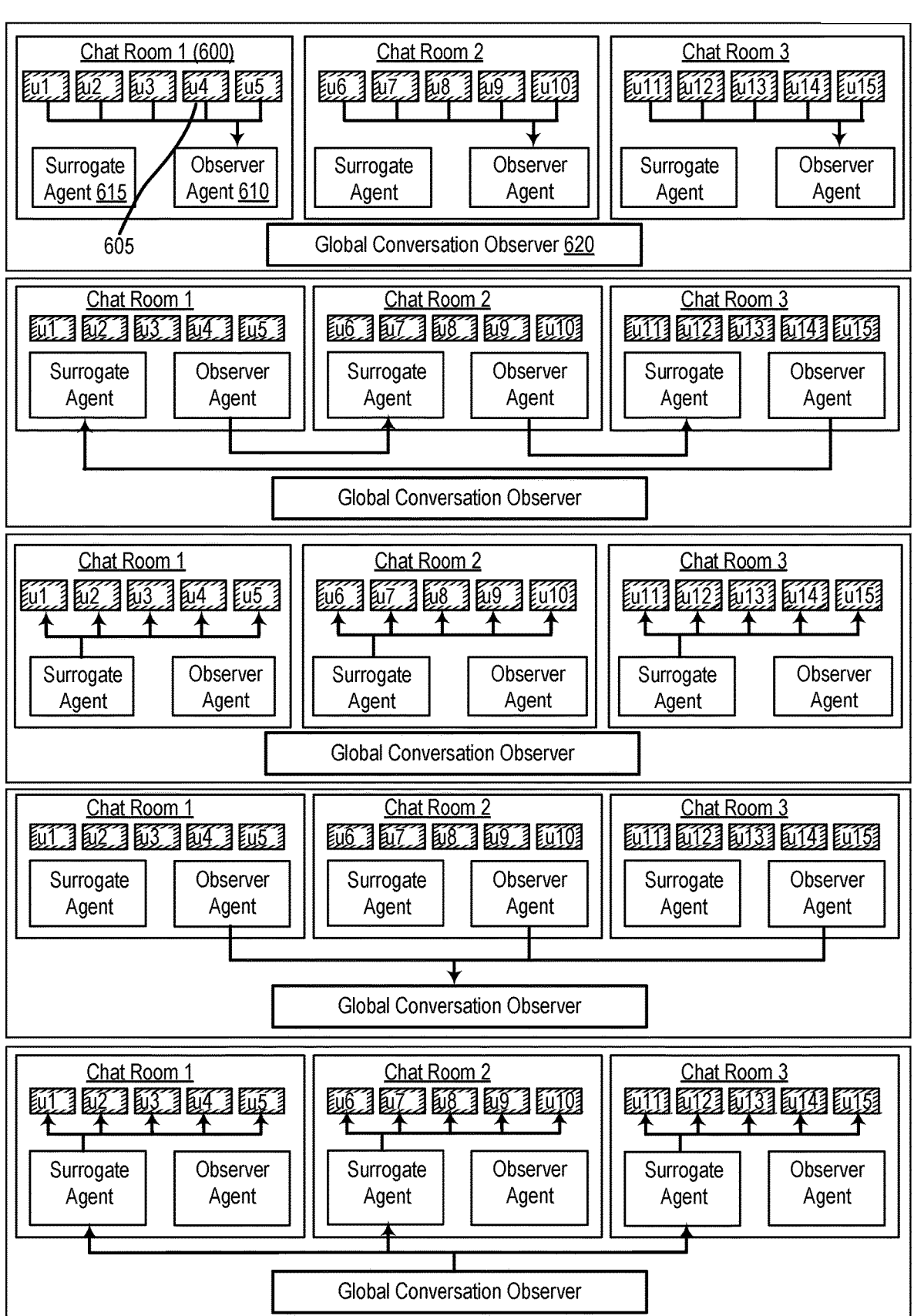

FIG. 6 shows an example of an interaction process according to aspects of the present disclosure. The example shown includes chat room 600 and global conversation observer 620.

Chat room 600 is an example of, or includes aspects of, the corresponding element described with reference to FIGS. 3-5, 8, and 9. In certain aspects, chat room 600 includes user 605, conversational observer agent 610, and conversational surrogate agent 615. User 605 is an example of, or includes aspects of, the corresponding element described with reference to FIGS. 1-5, 8, and 9.

Conversational observer agent 610 is an example of, or includes aspects of, the corresponding element described with reference to FIGS. 2-4, 9, and 10. Conversational surrogate agent 615 is an example of, or includes aspects of, the corresponding element described with reference to FIGS. 2-4, 8, 9, and 11. Global conversation observer 620 is an example of, or includes aspects of, the corresponding element described with reference to FIGS. 3-5, and 9.

FIG. 6 shows an interaction process for collaborative conversations as a 5-step process. In the first step, a large population engages in a single conversation such that each participant is associated with one of a plurality of small subgroups of users and is enabled to directly communicate with the other users in that unique subgroup of users. Conversational observer agent 610 (e.g., conversational observer agent as described with reference to FIGS. 1-3) keeps track of the conversation among each subgroup and generates summaries using the LLM (as described with reference to FIGS. 1-3).

In the second step, the collaboration server (described with reference to FIGS. 1-2) uses the conversational observer agent to coordinate information exchange between the separate chat rooms (i.e., between the separate conversations happening in parallel among separate subgroups). The information exchange is performed when the conversational observer agent generates a conversational representation of the summary (e.g., using LLM) for a given chat room of a given sub-group and sends the summary representation to conversational surrogate agent 615 of another chat room for another sub-group.

In some cases, conversational observer agent 610 may generate summarized points to be sent at regular time intervals or intervals related to dialogue flow. The content that is shared between subgroups is injected by the conversational surrogate agent 615 (in the third step) as conversational content and presented as text chat or voice chat or video chat from a simulated video to the users of the respective sub-group by a surrogate member (i.e., conversational surrogate agent 615) of the group. Accordingly, a block of informational content is generated by one subgroup, summarized to extract the key points, and then expressed into another subgroup.

In a third step, the plurality of subgroups continue their parallel deliberative conversations, now with the benefits of the informational content received in the second step. In this way, the participants in each subgroup can consider, accept, reject or otherwise discuss ideas and information from another subgroup, thereby enabling conversational content to gradually propagate across the full population in a thoughtful and proactive manner.

In preferred embodiments, the second and third steps are repeated multiple times (at intervals) enabling information to continually propagate across subgroups during the real-time conversation. By enabling local real-time conversations in small deliberative subgroups, while simultaneously enabling real-time conversational content to propagate across the subgroups, the collective intelligence is amplified as the full population is enabled to converge on unified solutions.

According to some embodiments, in a fourth step, a global conversation observer 620 takes as input, the informational summaries that were generated by each of the conversational observer agents 610, and processes that information which includes an extraction of key points across a plurality of the subgroups and produces a global informational summary.

Global conversational observer 620 documents and stores informational summaries at regular intervals, thereby documenting a record of the changing sentiments of the full population and outputs a final summary at the end of the conversation based on the stored global records. Global conversational observer 620, in a fifth step, provides the final summary to each surrogate agent 615, which in turn provides the final summary to each user in the collaborative system. In this way, all participants are made aware of the solution or consensus reached across the full population of participants.

In some embodiments, a global surrogate agent is provided in each subgroup to selectively represent the views, arguments, and narratives that have been observed across the entire population. In some embodiments, the views represented by each global surrogate agent into each subgroup (n) can be custom tailored for the subgroup based on the subgroup's interaction. For example, a global surrogate agent may summarize the population's discussion and inject a representation of the summary as interactive dialog into subgroups.

Dynamic Grouping

One or more embodiments of the present disclosure include a method for engineering subgroups to have deliberate bias. Accordingly, in some embodiments of the present invention, the discussion prompt is sent (by the central server) to the population of users before the initial subgroups are defined. The users provide a response to the initial prompt via text, voice, video, and/or avatar interface that is sent to the central server. In some embodiments, the user can provide an initial response in a graphical user interface that provides a set of alternatives, options, or other graphically accessed controls (including a graphic swarm interface or graphical slider interface as disclosed in the aforementioned patent applications incorporated by reference herein). The responses from the population are then routed to a Global Pre-Conversation Observer Agent that performs a rapid assessment. In some embodiments, the assessment is a classification process performed by an LLM on the set of initial responses, determining a set of Most Popular User Perspectives based on the frequency of expressed answers from within the population.

Using the classifications, a Subgroup Formation Agent is defined to subdivide the population into a set of small subgroups, i.e., to evenly distribute the frequency of Most Popular User Perspectives (as expressed by users) across the subgroups.

For example, a group of 1000 users may be engaged in a HyperChat session. An initial prompt is sent to the full population of users by the centralized server. In some examples, the initial conversational prompt may be—"What team is going to win the Super Bowl next year and why?"

Each user u(n) of the 1000 users provides a textual or verbal response to the local computer, the responses routed to the central server as described with reference to FIGS. 3-4. The Global Pre-Conversation Observer Agent then performs a Classification Process, identifying a set of most popular answers to the prompt. In some examples, the most popular answers are a set of teams that the 1000 users most commonly believe will win the Super Bowl Next year. The most popular set may be the following seven teams—"Chiefs, 49ers, Cowboys, Eagles, Patriots, Rams, Packers,"

The Subgroup Formation Agent then divides the population into subgroups, working to create the distribution (e.g., the maximum distribution) of user perspectives across subgroups, such that each subgroup comprises a diverse set of perspectives (i.e., avoid having some groups overweighted by users who prefer the chiefs while other groups are overweighted by users who prefer the Eagles). Accordingly, subgroups being formed are not biased towards a particular team, and may have a healthy debate for and against the various teams.

In some embodiments, a distribution of bias is deliberately engineered across subgroups by algorithms running on the central server to have a statistical sampling of groups that lean towards certain beliefs, outcomes, or demographics. Accordingly, the system can collect and evaluate the different views that emerge from demographically biased groups and assess the reaction of the biased groups when Conversational Surrogate Agents that represent groups with alternative biases inject comments into that group.

An embodiment includes collection of preliminary data from each individual entering the HyperChat system (prior to assignment to subgroups) to create "bias engineered subgroups" on the central server. The data may be collected with a pre-session inquiry via survey, poll, questionnaire, text interview, verbal interview, a swarm interface, or another known tool. Using the collected pre-session data, users are allocated into groups based on demographic characteristics and/or expressed leanings. In some embodiments, users with similar characteristics in the pre-session data are grouped together to create a set of similar groups (e.g., maximally similar groups). In some embodiments, a blend of biased groups is created with some groups containing more diverse perspectives than others.

The HyperChat system begins collecting the discussion from each subgroup once the biased subgroups are created. After the first round (before Conversational Surrogate agents inject sentiments into groups), the Global Observer agent can be configured to assess what narratives (i.e., reasons, counterarguments, prevailing methods of thought) are most common in each subgroup that is biased in specific ways and the degree to which the biases and demographics impact the narratives that emerge. For example, subgroups that are composed of more Kansas City Chiefs fans might express different rationale for Super Bowl outcomes than subgroups that are composed of fewer Chiefs fans or may be less likely to highlight the recent performance of the Chiefs quarterback to justify the likelihood of the Chiefs winning the Super Bowl next year. The Global Observer agent quantifies and collates the differences to generate a single report describing the differences at a high level.

Then, the Conversation Surrogate agents can be configured to inject views from groups with specific biases into groups with alternate biases, provide for the group to deliberate when confronted with alternate viewpoints, and measure the degree to which the alternate views influence the discussion in each subgroup. Accordingly, the HyperChat system can be algorithmically designed to increase (e.g., and/or maximize) the sharing of opposing views across subgroups that lean in different directions.

In an alternate embodiment, the Ring Structure that defines information flow between subgroups is changed between rounds, such that most subgroups receive informational summaries from different subgroups in each round. Accordingly, information flow is increased. In some embodiments, the Ring Structure can be replaced by a randomized network structure or a small world network structure. In some embodiments, users are shuffled between rounds with some users being moved to other subgroups by the HyperSwarm server.

HyperChat for Rounded and Roundless Structures

One or more embodiments of the present disclosure are structured in formalized "rounds" that are defined by the passage of a certain amount of time or other quantifiable metrics. Thus, rounds can be synchronous across subgroups (i.e., rounds start and end at substantially the same time across subgroups), rounds can be asynchronous across subgroups (i.e., rounds start and end independently of the round timing in other subgroups), and rounds can be invisible to users within each subgroup (i.e., rounds may be tracked by the central server to mediate when a block of conversational information is injected into a given subgroup, but the participants in that subgroup may perceive the event as nothing more than an artificial agent injecting a natural comment into the conversation in the subgroup).

For example, a system can be structured with 200 subgroups (n=1 to n=200) of 10 participants each for a total population of 2000 individuals (u=1 to u=1000). A particular first subgroup (n=78) may be observed by a Conversational Observer Agent (COai 78) process and linked to a second subgroup (n=89) for passage of conversational information via Conversational Summary Agent (CSai 89). When a certain threshold of back-and-forth dialog exceeds in the first subgroup, as determined by process (COai 78), a summary is generated and passed to process (CSai 89) which then expresses the summary, as a first person interjection (as text, voice, video, and or avatar) to the members of the second subgroup (in a ring structure of 200 subgroups). The members of Subgroup 89 that hear and/or see the expression of the summary from Subgroup 78 may perceive the summary as an organic injection into the conversation (i.e., not necessarily as part of a formalized round structured by the central server).

In some examples, a first group of participants may be asked to discuss a number of issues related to NBA basketball in a text-based chat environment. After a certain amount of time, the chat dialog is sent (for example, API-based by an automated process) to a LLM model that summarizes the dialog that had elapsed during the time period, extracting the important points while avoiding unnecessary information. The summary is then passed to the LLM (for example, by API-based automated process) to convert it into a first person expression and to inject the expression into another chat group. A dialog produced by the LLM model (e.g., ChatGPT) may be:

"I observed a group of sports fans discussing the Lakers vs. Grizzlies game, where the absence of Ja Morant was a common reason why they picked the Lakers to win. They also discussed the Eastern conference finals contenders, with the Milwaukee Bucks being the most popular choice due to their consistency and balanced team. Some expressed confidence in the Bucks, while others had conflicting views due to recent losses and player absences. The Boston Celtics and Philadelphia 76ers were also mentioned as potential contenders, but doubts were raised over their consistency and playoff performance."

Accordingly, members of the second group can read a summary of conversational information, including central arguments, from a first subgroup. In some cases, the expression is in the first person and thus feels like a natural part of the conversation in the second subgroup.

A Collaboration Process

FIG. 7 shows an example of a flowchart for computer mediated collaboration according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects s of the present disclosure. In some cases, the operations described herein are composed of various substeps, or are performed in conjunction with other operations.

At operation 705, the system users initiate HyperChat clients (i.e., local chat application) on local computing devices. In some cases, the operations of this step refer to, or may be performed by, the user as described with reference to FIGS. 1-5.

At operation 710, the system breaks user population into smaller subgroups. In some cases, the operations of this step refer to, or may be performed by, the HyperChat server. According to some embodiments, the HyperChat server may be a collaboration server (described with reference to FIGS. 1-3).

At operation 715, the system assigns a conversational observer agent and a conversational surrogate agent to each subgroup. In some cases, the operations of this step refer to, or may be performed by, the HyperChat server or collaboration server as described with reference to FIGS. 1-3. In some cases, the observer agent and the surrogate agent are performed by the same software process and may be considered a single dual-purpose AI agent.

At operation 720, the system conveys conversational prompt to HyperChat clients. In some cases, the operations of this step refer to, or may be performed by, the HyperChat server or collaboration server as described with reference to FIGS. 1-3.

At operation 725, the system conveys conversational prompt to users within each subgroup. In some cases, the operations of this step refer to, or may be performed by, the HyperChat server or collaboration server as described with reference to FIGS. 1-3. In some embodiments the system expresses the prompt using different wording or style in different subgroups depending on the configuration of the surrogate agent with respect to that subgroup.

At operation 730, the system uses HyperChat client to convey real time communications to and from other users within their subgroup. In many preferred embodiments, this real-time communication is routed through the collaboration server, which mediates message passage among members of each subgroup via the hyperchat client. In some cases, the operations of this step refer to, or may be performed by, the user as described with reference to FIGS. 1-5.

At operation 735, the system monitors interactions among members of each subgroup. In some cases, the operations of this step refer to, or may be performed by, the conversational observer agent as described with reference to FIGS. 1-5.

At operation 740, the system generates informational summaries based on observed user interactions. In some cases, the operations of this step refer to, or may be performed by, the conversational observer agent as described with reference to FIGS. 1-5.

At operation 745, the system transmits informational summaries they generated to conversational surrogate agents of other subgroups. In some cases, the operations of this step refer to, or may be performed by, the conversational observer agent as described with reference to FIGS. 1-5.

At operation 750, the system processes informational summaries they receive into a natural language form. In some cases, the operations of this step refer to, or may be performed by, the conversational surrogate agent as described with reference to FIGS. 1-5.

At operation 755, the system expresses processed informational summaries in natural language form to users in their respective subgroups. In some cases, the operations of this step refer to, or may be performed by, the conversational surrogate agent as described with reference to FIGS. 1-5.

At operation 755, the process optionally repeats by jumping back to operation 730, thus enabling the members within each subgroup to continue their real-time dialog, their deliberations now influenced by the conversational content that was injected into their room. In this way, steps 730 to 755 can be performed at repeated intervals during which subgroups deliberate, their conversations are observed, processed, and summarized, and a representation of the summary is passed into other groups. The number of iterations can be pre-planned in software, or can be based on predefined time limits, or can be dependent on the level of conversational agreement within or across subgroups. In all cases, the system will eventually cease repeating steps 730 to 755.

At operation 760, the system transmits informational summaries to global conversational observer. In some cases, the operations of this step refer to, or may be performed by, the conversational observer agent as described with reference to FIGS. 1-5. According to some embodiments, operation 760 is performed after operations 730 to 755 are performed parallelly for a certain time.

At operation 765, the system generates global informational summary. In some cases, the operations of this step refer to, or may be performed by, the global conversational observer as described with reference to FIGS. 1-5.

At operation 770, the system transmits global informational summary to conversational surrogate agents. In some cases, the operations of this step refer to, or may be performed by, the global conversational observer as described with reference to FIGS. 1-5.

At operation 775, the system expresses global informational summary in natural language form to users in their respective subgroups. In some cases, the operations of this step refer to, or may be performed by, the conversational surrogate agent as described with reference to FIGS. 1-5.

In some embodiments, the process at 775 optionally jumps back to operation 730, thus enabling the members within each subgroup to continue their real-time dialog, their deliberations now influenced by the global information summary that was injected into their room. The number of iterations (jumping back to 730) can be pre-planned in software, or can be based on pre-defined time limits, or can be dependent on the level of conversational agreement within or across subgroups.

In all examples, the system will eventually cease jumping back to operation 730. At that point, the system expresses a final global informational summary in natural language form to the users in their respective subgroups.

Video HyperChat Process

Video conferencing is a special case for the HyperChat technology since it is very challenging for groups of networked users above a certain size (i.e., number of users) to hold a coherent and flowing conversation that converges on meaningful decisions, predictions, insights, prioritization, assessments or other group-wise conversational outcomes. In some examples, when groups are larger than 12 to 15 participants in a video conferencing setting, it is increasingly difficult to hold a true group-wise conversation. In some cases, video conferencing for large groups may be used for one-to-many presentations and Q&A sessions (however, such presentations and sessions are not true conversations).

Current video conferencing systems are not equipped to enable large groups to hold conversations while enabling the amplification of the collective intelligence. Embodiments of the present disclosure describe systems and methods for video conferencing that are equipped to enable large groups to hold conversations while enabling the amplification of collective intelligence and significant new capabilities.

Embodiments of the present disclosure can be deployed across a wide range of networked conversational environment (e.g., text chatrooms (deployed using textual dialog), video conference rooms (deployed using verbal dialog and live video), immersive "metaverse" conference rooms (deployed using verbal dialog and simulated avatars), etc.). One or more embodiments include a video conferencing HyperChat process.

Figure 8:
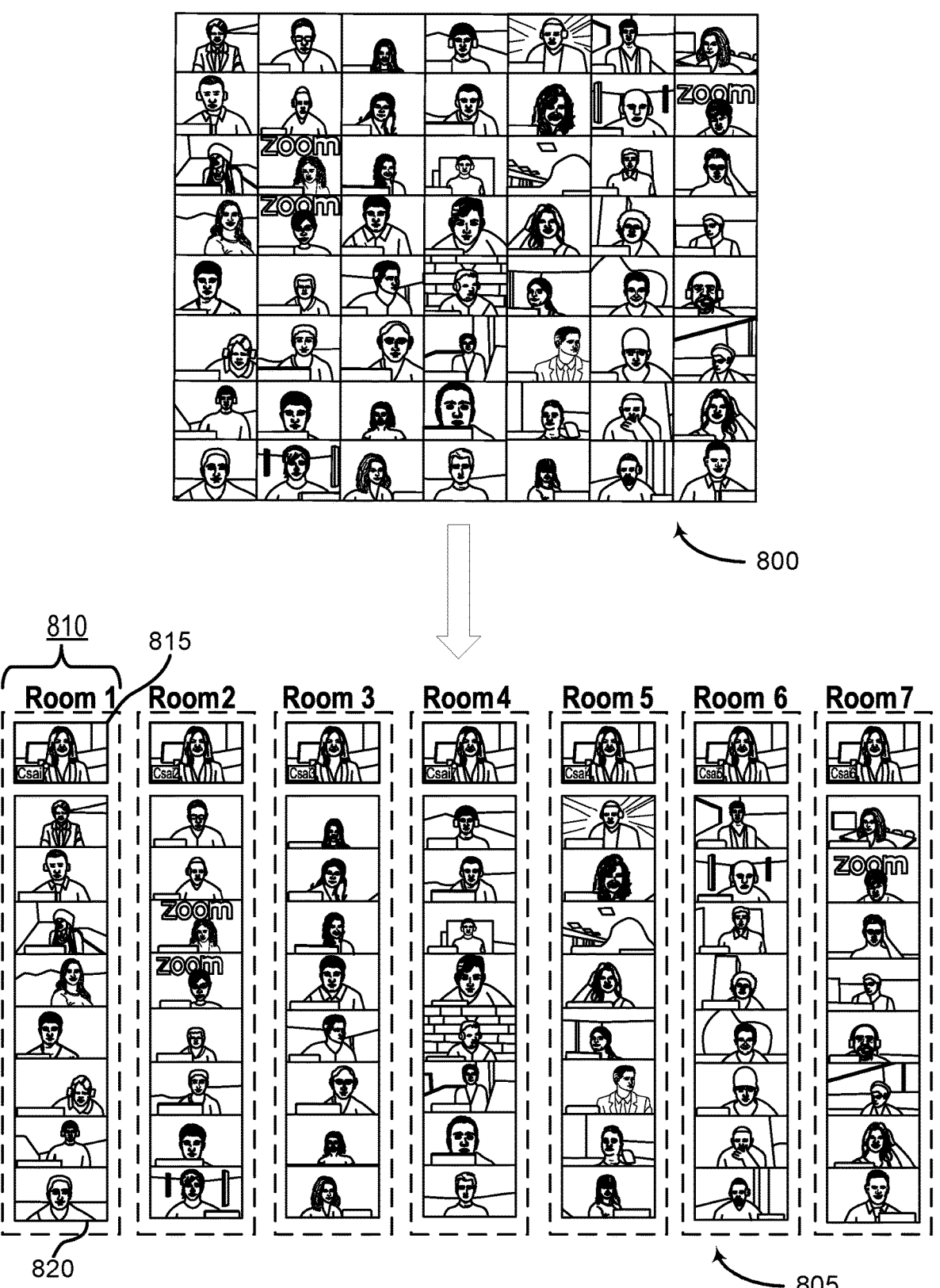
FIGS. 8 through 9 show examples of a video based HyperChat process according to aspects of the present disclosure.

FIG. 8 shows an example of a video based HyperChat process according to aspects of the present disclosure. The example shown includes conventional video conferencing environment 800 with 56 real-time human participants who are communicating through video chat. For convenience we refer to this environment as "chat room" 800 despite the fact that the communication is primarily video based. Similarly, FIG. 8 also includes video based chat room 810.

Chat room 810 is an example of, or includes aspects of, the corresponding element described with reference to FIGS. 3-6, and 9. In certain aspects, chat room 810 includes conversational surrogate 815 and agent user 820.

Conversational surrogate agent 815 is an example of, or includes aspects of, the corresponding element described with reference to FIGS. 2, 6, 9, and 11. User 820 is an example of, or includes aspects of, the corresponding element described with reference to FIGS. 1-6, and 9.

Referring to FIG. 8, a conventional video conferencing application 800 (i.e., Zoom) is being used by 56 networked human members in a single conversational room. As shown, the number of users is high, making it challenging (i.e., nearly impossible) for members to clearly identify users in the room or enable a meaningful groupwise conversation. Due to the high number of human members, it may be very difficult for a single individual to have much of an opportunity to speak. In fact, communication research shows that deliberative conversations degrade substantially with group sizes greater than 5 to 7 members, as turn-taking dynamics collapse and participation per users drop greatly. In case a meeting is scheduled for an hour, on an average, a conversation of 56 members would enable few individuals to speak for more than one minute on average. Such a situation/ setting is not conducive to user contribution and does not provide for a healthy back and forth among participants on issues of consequence. Accordingly, there is no mechanism to leverage the ability of large groups to amplify the collective intelligence of the networked participants through real-time deliberative conversation.

Referring again to FIG. 8, a structure and method for a hyper video chat 805 is shown for the example of 56 networked human users 820, according to embodiments of the present disclosure. As shown, the 56 users are split into 7 separable sub-rooms (i.e., Room 1 to Room 7) each populated by 8 participants. In each sub-room, the participants can see and hear the other 7 participants in the room which is a size that is convenient for meaningful human conversations that can reach groupwise decisions, assessments, prioritizations, evaluations, rating, rankings, and other groupwise outcomes.

The example shows 8 participants per room. However, embodiments are not limited thereto and fewer or greater number of participants within reason can be used. The example shows equal numbers of participants per sub-room. However, embodiments are not limited thereto, and other embodiments can include (e.g., use, implement, etc.) varying numbers of participants per sub-room. As shown in hyper video chat 805 is a Conversational Surrogate Agent (CSai) 815 that is uniquely assigned, maintained, and deployed for use in each of the parallel rooms.

The CSai agent 815 is shown in this example at the top of each column of video feeds and is a real-time graphical representation of an artificial agent that emulates what a human user may look like in the video box of the video conferencing system. In some cases, technologies enable simulated video of artificial human characters that can naturally verbalize dialog and depict natural facial expressions and vocal inflections. For example, the "Digital Human Video Generator" technology from Delaware company D-ID is an example technology module that can be used for creating real-time animated artificial characters. Other technologies are available from other companies.

Using APIs from large language models such as ChatGPT, unique and natural dialog can be generated for the Conversational Surrogate Agent in each sub-room which is conveyed verbally to the other members of the room through simulated video of a human speaker, thereby enabling the injection of content from other sub-rooms in a natural and flowing method that does not significantly disrupt the conversational flow in each sub-room. One or more exemplary embodiments evaluate hyper-chat and indicate that conversational flow is maintained.

Figure 9:
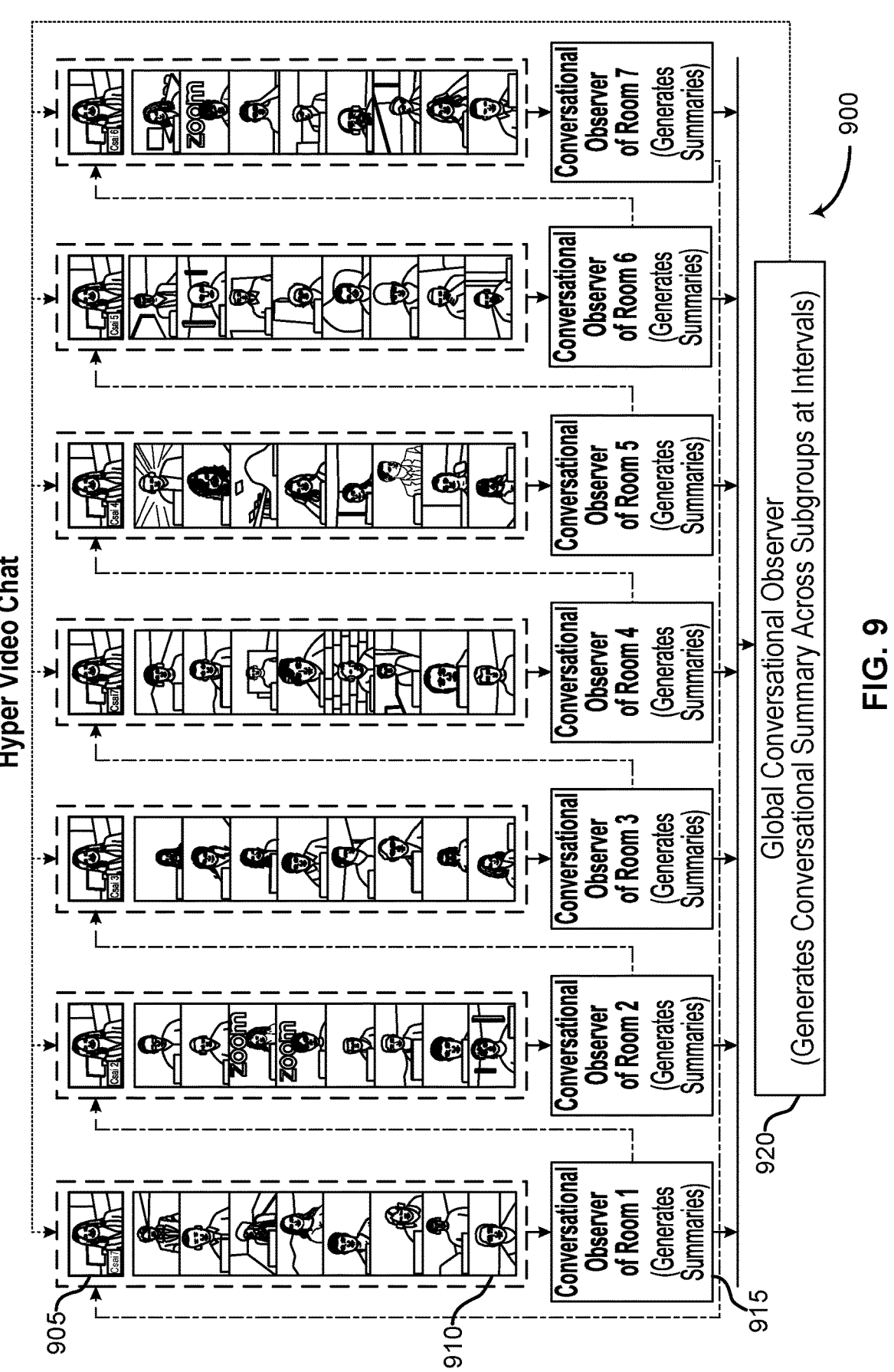

FIG. 9 shows an example of a video based HyperChat process according to aspects of the present disclosure. The example shown includes chat room 900 and global conversation observer 920.

Chat room 900 is an example of, or includes aspects of, the corresponding element described with reference to FIGS. 3-6, and 8. In certain aspects, chat room 900 includes conversational surrogate agent 905, user 910, and conversational observation agent 915. Conversational surrogate agent 905 is an example of, or includes aspects of, the corresponding element described with reference to FIGS. 2, 6, 8, and 11. User 910 is an example of, or includes aspects of, the corresponding element described with reference to FIGS. 1-6, and 8. Conversational observation agent 915 is an example of, or includes aspects of, the corresponding element described with reference to FIGS. 2-4, 6, and 10. Global conversation observer 920 is an example of, or includes aspects of, the corresponding element described with reference to FIGS. 3-6.

FIG. 9 shows mapping of a plurality of information pathways (e.g., pathways shown with reference to FIGS. 3-4). As shown in FIG. 9, there are two critical processes that involve Large Language Models accessed in real-time by API. In some cases, a process (performed by a Conversational Observer Agent 915) monitors the conversation in each sub-room (either by text or voice chat) and generates conversational summaries at various intervals. In some cases, a process injects conversational summaries from one sub-room into one or more other sub-rooms, thereby propagating conversational information across the large population.

As shown in FIG. 9, the human dialog generated within each sub-room is captured in real-time (or near real-time), stored for periods of time, converted to text, and intermittently input to an LLM engine via an API process. The LLM is directed to perform assessments and/or summarizations of the captured dialog as described with reference to FIGS. 3-4. In some cases, the LLM can be directed to summarize the interval of dialog, indicating the most significant points made and the conviction (or lack thereof) expressed by the sub-group in each of the significant points made. In some cases, the Conversational Summary generated in each sub-room is fed to the Conversational Surrogate Agent 905 in an alternate sub-room to enable the Hyper Video process with information propagation. Accordingly, the human participants are enabled to engage in real-time conversation within the respective sub-rooms and to receive (via a simulated human surrogate 905) critical points that were expressed among the participants (users 910) in another sub-room.

The process is conducted among some, many, or each of the subgroups at regular intervals, thereby propagating information in a highly efficient manner. In some examples, sub-rooms are arranged in a ring network structure as shown in FIG. 9. Each sub-room is monitored by a single observer agent 915 which provides informational summaries to a single alternate sub-room at intervals and each sub-room is populated with a single Conversational Surrogate Agent 905 that receives information summaries from a single alternate-subgroup at certain intervals.

One or more exemplary embodiments of the disclosure evaluate the HyperChat text process and enable significant information propagation. According to some embodiments, alternate network structures (i.e., other than a ring structure) can be used. Additionally, embodiments may enable multiple Conversational Surrogate Agents in each sub-room, each of which may optionally represent informational summaries from other alternate sub-rooms. Or, in other embodiments, a single Conversational Surrogate Agent in a given sub-room may optionally represent informational summaries from multiple alternative sub-rooms. The representations can be conveyed as a first-person dialog.

Networking structures other than a ring network become increasingly valuable at larger and larger group sizes. For example, an implementation in which 2000 users engage in a single real-time conversation may involve connecting 400 sub-groups of 5 members each according to the methods of the present invention. In such an embodiment, a small world network or other efficient topology may be more effective at propagating information across the population.

Referring again to FIG. 9, an optional Global Observer Agent 920 is enabled by an LLM engine and is configured to receive conversational summaries (via API calls) from two or more of the Conversational Observer Agents 915. The Global Observer Agent 920 receives conversational summaries from the active sub-rooms (Sub-room 1 to Sub-room 7) and assesses and summarizes the salient points made across sub-groups at various intervals. For example, the Global Observer Agent 920 may assess and summarize the key points made across the seven sub-rooms shown at regular time intervals, estimating the relative conviction expressed across sub-groups on various points made.

As shown in FIG. 9, the Global Observer Agent 920 can inject the assessments and summaries performed at various intervals back into each sub-room (i.e., to each sub-group of participants) via the simulated video Conversation Surrogate Agent 905 in the sub-room. Accordingly, the groups can receive global information (i.e., with key points from each group). According to embodiments described herein, the injection of global summary information into sub-groups occurs less frequently than the injection of local information from other sub-groups and occurs later in the conversational process. That is, the process enabled herein is an interactive system in which the entire population gradually converges on solutions. Thus, in some aspects, more time may elapse for global sentiments to converge than local sentiments within individual sub-rooms (i.e., among sub-groups).

In some embodiments, the subgroups receive the same global summary injected into the sub-room via the Conversational Surrogate Agent 905 within the room. In some embodiments, the Global Observer Agent 920 is configured to inject customized summaries into each of the sub-rooms based on a comparison between the global summary made across groups and the individual summary made for particular groups. In some embodiments, the comparison may be performed to determine if the local sub-group has not sufficiently considered significant points raised across the set of sub-groups. For example, if most subgroups identified an important issue for consideration in a given groupwise conversation but one or more other sub-groups failed to discuss that important issue, the Global Observer Agent 920 can be configured to inject a summary of such an important issue.

As described, the injection of a summary can be presented in the first person. For example, if sub-group number 1 (i.e., the users holding a conversation in sub-room 1) fail to mention a certain issue that may impact the outcome, a decision, or forecast being discussed, but other sub-groups (i.e., sub-rooms 2 through 7) discuss the issue as significant, the Global Observer Agent identifies the fact by comparing the global summary with each local summary, and in response injects a representation of the certain issue into room 1.

In some embodiments, the representation is presented in the first person by the Conversational Surrogate Agent 905 in sub-room 1, for example with dialog such as-"I've been watching the conversation in all of the other rooms, and I noticed that they have raised an issue of importance that has not come up in our room." The Conversational Surrogate Agent 905 will then describe the issue of importance as summarized across rooms. Accordingly, information propagation is enabled across the population while providing for subgroup 1 to continue the naturally flowing conversation. For example, subgroup 1 may consider the provided information but not necessarily agree or accept the issues raised.

In some embodiments, the phrasing of the dialog from the Conversational Surrogate Agent 905 may be crafted from the perspective of an ordinary member of the sub-room, not explicitly highlighting the fact that the agent is an artificial observer. For example, the dialog above could be phrased as "I was thinking, there's an issue of importance that we have not discussed yet in our room. The Conversational Surrogate Agent 905 will then describe the issue of importance as summarized across rooms as if it was their own first-person contribution to the conversation. This can enable a more natural and flowing dialog.

The video conferencing architecture (e.g., as described with reference to FIGS. 8-9) can be deployed using either the round-based methods or roundless methods. The present disclosure describes systems and methods for text-based conversations that can be applied to voice-based conversations deployed using video chat or avatar chat. Accordingly, large populations can be enabled to be split into a network of interconnected real-time subgroups that converge in conversational synchrony on collaborative solutions. In addition, the methods for amplifying collective intelligence are applicable to the video chat examples of FIGS. 8-9.

In some cases, the video-based solutions can be deployed with an additional sentiment analysis layer that assesses the level of conviction of each user's verbal statements based on the inflection in the voice, the facial expressions, and/or the hand and body gestures that correlate with verbal statements during the conversation. The sentiment analysis can be used to supplement the assessment of either confidence and/or conviction in the conversational points expressed by individual members and can be used in the assessment of overall confidence and conviction within subgroups and across subgroups. When sentiment analysis is used, embodiments described herein may employ anonymity filters to protect the privacy of individual participants.

Figure 10:
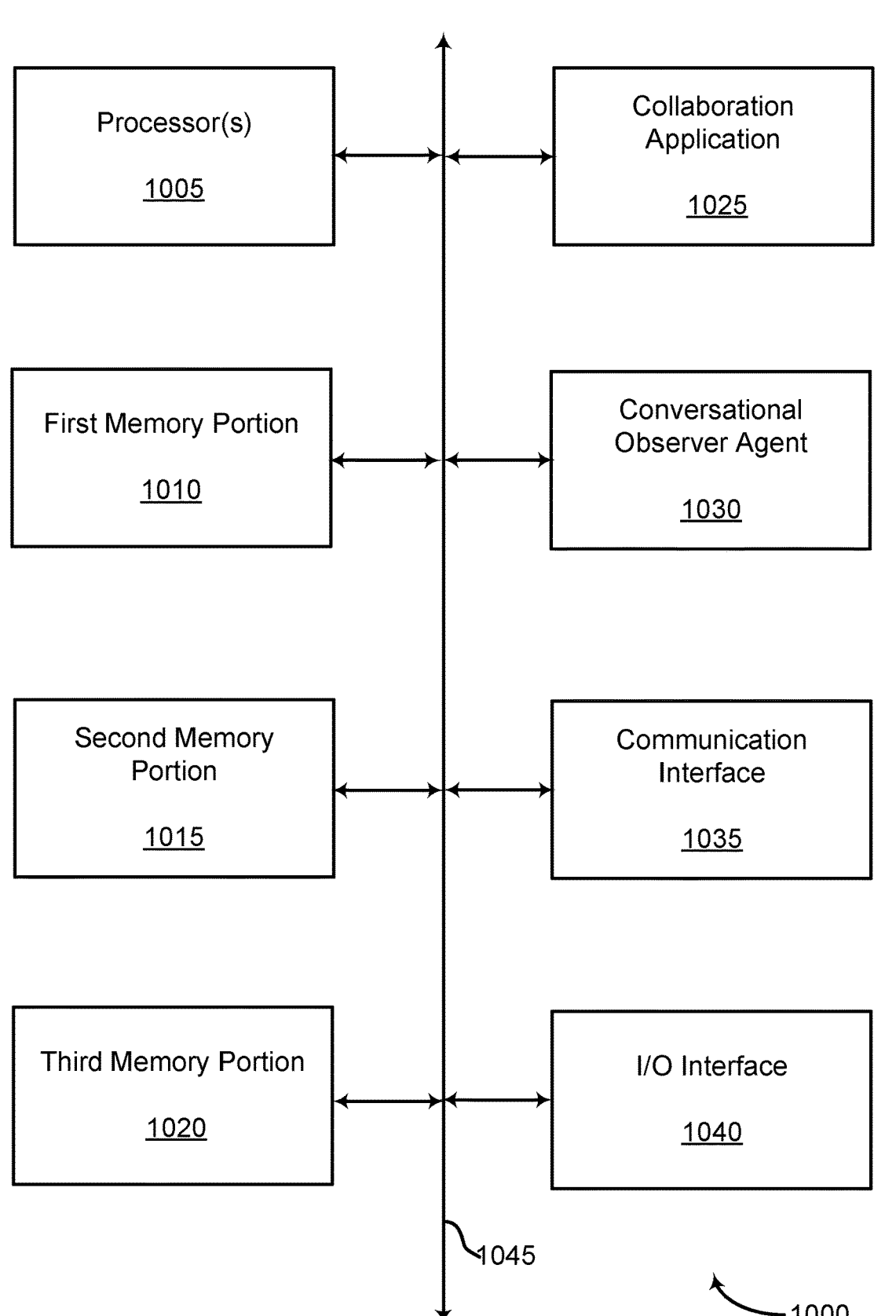
FIG. 10 shows an example of a collaboration server according to aspects of the present disclosure.

FIG. 10 shows an example of a collaboration server 1000 according to aspects of the present disclosure. In certain aspects, collaboration server 1000 includes processor(s) 1005, first memory portion 1010, second memory portion

1015, third memory portion 1020, collaboration application 1025, conversational observer agent 1030, communication interface 1035, I/O interface 1040, and channel 1045.

Collaboration server 1000 is an example of, or includes aspects of, the corresponding element described with reference to FIGS. 1-3. In some embodiments, collaboration server 1000 includes one or more processors 1105 that can execute instructions stored in first memory portion 1010, second memory portion 1015, and third memory portion 1020 to provide a collaboration server running a collaboration application, the collaboration server in communication with the plurality of the networked computing devices, each computing device associated with one member of the population of human participants, the collaboration server defining a plurality of sub-groups of the population of human participants; provide a local chat application on each networked computing device, the local chat application configured for displaying a conversational prompt received from the collaboration server, and for enabling real-time chat communication with other members of a sub-group assigned by the collaboration server, said real-time chat communication including sending chat input collected from the one member associated with the networked computing device to other members of the assigned sub-group; and enable through communication between the collaboration application running on the collaboration server and the local chat applications running on each of the plurality of networked computing devices.

According to some aspects, collaboration server 1000 includes one or more processors 1005. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof.) In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, each of first memory portion 1010, second memory portion 1015, and third memory portion 1020 include one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, collaboration application 1025 enables users to interact with other users through real-time dialog via text chat and/or voice chat and/or video chat and/or avatar-based VR chat. In some cases, collaboration application 1025 running on the device associated with each user displays the conversational prompt to the user. In some cases, collaboration application 1025 is stored in the memory (e.g., one of first memory portion 1010, second memory portion 1015, or third memory portion 1020) and is executed by one or more processors 1005.

According to some aspects, conversational observer agent 1030 is an AI-based agent that extracts conversational content from a sub-group, sends the content to a LLM to generate a summary, and shares the generated summary with each user on the collaboration server 1000. In some cases, conversational observer agent 1030 is stored in the memory (e.g., one of first memory portion 1010, second memory portion 1015, or third memory portion 1020) and is executed by one or more processors 1005.

According to some aspects, communication interface 1035 operates at a boundary between communicating entities (such as collaboration server 1000, one or more user devices, a cloud, and one or more databases) and channel 1045 and can record and process communications. In some cases, communication interface 1035 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1040 is controlled by an I/O controller to manage input and output signals for collaboration server 1000. In some cases, I/O interface 1040 manages peripherals not integrated into collaboration server 1000. In some cases, I/O interface 1040 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1040 or via hardware components controlled by the I/O controller.

FIG. 11 shows an example of a computing device 1100 according to aspects of the present disclosure. In certain aspects, computing device 1100 includes processor(s) 1105, memory subsystem 1110, communication interface 1115, local chat application 1120, conversational surrogate agent 1125, global surrogate agent 1130, I/O interface 1135, user interface component 1140, and channel 1145.

In some aspects, computing device 1100 is an example of, or includes aspects of, the corresponding element described with reference to FIGS. 1, 2, 5, and 6. In some embodiments, computing device 1100 includes one or more processors 1105 that can execute instructions stored in memory subsystem 1110.

According to some aspects, computing device 1100 includes one or more processors 1105. Processor(s) 1105 is an example of, or includes aspects of, the corresponding element described with reference to FIG. 10.

According to some aspects, memory subsystem 1110 includes one or more memory devices. Memory subsystem 1110 is an example of, or includes aspects of, the memory and memory portions described with reference to FIGS. 1-2 and 10.

According to some aspects, communication interface 1115 operates at a boundary between communicating entities (such as computing device 1100, one or more user devices, a cloud, and one or more databases) and channel 1145 and can record and process communications. Communication interface 1115 is an example of, or includes aspects of, the corresponding element described with reference to FIG. 10.

According to some aspects, local chat application 1120 provides for a real-time conversation between the one user of a sub-group and the plurality of other members assigned to the same sub-group. Local chat application 1120 is an example of, or includes aspects of, the corresponding element described with reference to FIGS. 1 and 2. In some cases, local chat application 1120 is stored in the memory subsystem 1110 and is executed by the one or more processors 1105.

According to some aspects, conversational surrogate agent 1125 conversationally expresses a representation of the information contained in the summary from a different room. Conversational surrogate agent 1125 is an example of, or includes aspects of, the corresponding element described with reference to FIGS. 2-4. In some cases, conversational surrogate agent 1125 is stored in the memory subsystem 1110 and is executed by the one or more processors 1105.

According to some aspects, global surrogate agent 1130 selectively represents the views, arguments, and narratives that have been observed across the entire population. Global surrogate agent 1130 is an example of, or includes aspects of, the corresponding element described with reference to FIGS. 2-4. In some cases, global surrogate agent 1130 is stored in the memory subsystem 1110 and is executed by the one or more processors 1105.

According to some aspects, I/O interface 1135 is controlled by an I/O controller to manage input and output signals for computing device 1100. I/O interface 1130 is an example of, or includes aspects of, the corresponding element described with reference to FIG. 10.

According to some aspects, user interface component(s) 1140 enable a user to interact with computing device 1100. In some cases, user interface component(s) 1140 include an audio device, such as an external speaker system, an external display device such as a display screen, an input device (e.g., a remote control device interfaced with a user interface directly or through the I/O controller), or a combination thereof. In some cases, user interface component(s) 1135 include a GUI.

FIG. 12 shows an example of a method 1200 for computer mediated collaboration according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the system provides a collaboration server running a collaboration application, the collaboration server in communication with the set of the networked computing devices, each computing device associated with one member of the population of human participants, the collaboration server defining a set of sub-groups of the population of human participants, the collaboration server including: In some cases, the operations of this step refer to, or may be performed by, a collaboration server as described with reference to FIGS. 1, 2, and 10.

At operation 1210, the system provides a local chat application on each networked computing device, the local chat application configured for displaying a conversational prompt received from the collaboration server, and for enabling real-time chat communication with other members of a sub-group assigned by the collaboration server, the real-time chat communication including sending chat input collected from the one member associated with the networked computing device to other members of the assigned sub-group. In some cases, the operations of this step refer to, or may be performed by, a local chat application as described with reference to FIGS. 1, 2, and 11.

At operation 1215, the system enables computer-moderated collaboration among a population of human participants through communication between the collaboration application running on the collaboration server and the local chat applications running on each of the set of networked computing devices. For instance, at operation 1215 the system enables various steps through communication between the collaboration application running on the collaboration server and the local chat applications running on each of the set of networked computing devices (e.g., the enabled steps including one or more operations described with reference to methods 1300-1800). In some cases, the operations of this step refer to, or may be performed by, software components as described with reference to FIG. 2.

Figure 13:
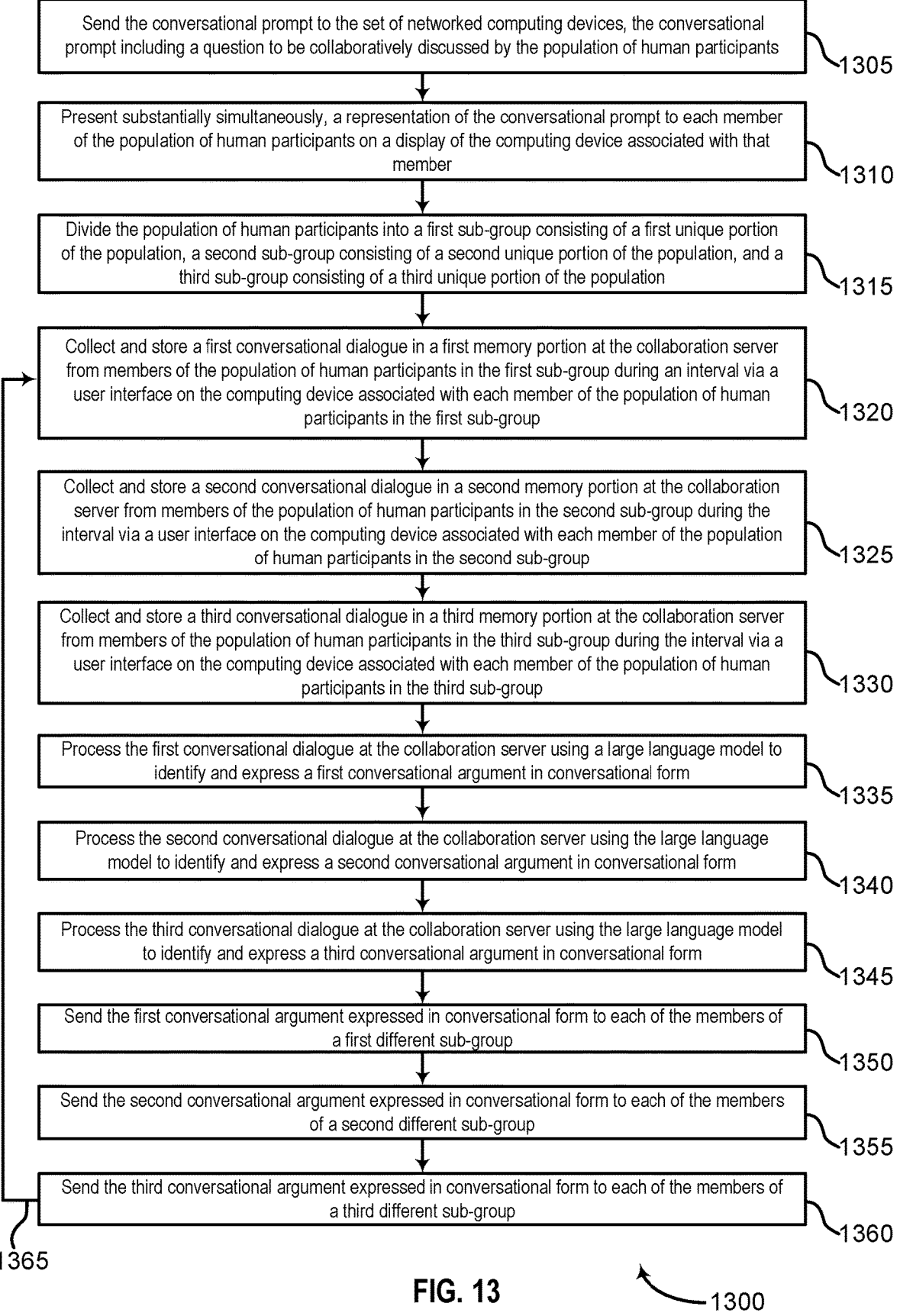

FIG. 13 shows an example of a series of operations for a method 1300 for computer mediated collaboration according to aspects of the present disclosure. Variations of the present example may include performing the series of operations in a different order than the order in which the series of operations is presented here. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1305 (e.g., at step a), the system sends the conversational prompt to the set of networked computing devices, the conversational prompt including a question, issue or topic to be collaboratively discussed by the population of human participants. In some cases, the operations of this step refer to, or may be performed by, software components as described with reference to FIG. 2. In some cases, the conversational prompt could be entered into the system by a designated human moderator in advance or in real-time.

At operation 1310 (e.g., at step b), the system presents, substantially simultaneously, a representation of the conversational prompt to each member of the population of human participants on a display of the computing device associated with that member. In some cases, the operations of this step refer to, or may be performed by, software components as described with reference to FIG. 2. In some embodiments the prompt is displayed textually. In other embodiments, the prompt is expressed verbally by a conversational agent.

At operation 1315 (e.g., at step c), the system divides the population of human participants into a first sub-group consisting of a first unique portion of the population, a second sub-group consisting of a second unique portion of the population, and a third sub-group consisting of a third unique portion of the population, where the first unique portion consists of a first set of members of the population of human participants, the second unique portion consists of a second set of members of the population of human participants and the third unique portion consists of a third set of members of the population of human participants. In some cases, the operations of this step refer to, or may be performed by, software components as described with reference to FIG. 2. Note, operation 1315 can be performed before operations 1305 and 1310. In some embodiments, the sub-groups are formed before some or all of the prior steps. In many embodiments, additional sub-groups (i.e., more than three) are formed following the same method.

At operation 1320 (e.g., at step d), the system collects and stores a first conversational dialogue in a first memory portion at the collaboration server from members of the population of human participants in the first sub-group during an interval via a user interface on the computing device associated with each member of the population of human participants in the first sub-group. In some cases, the operations of this step refer to, or may be performed by, software components as described with reference to FIG. 2.

At operation 1325 (e.g., at step e), the system collects and stores a second conversational dialogue in a second memory portion at the collaboration server from members of the population of human participants in the second sub-group during the interval via a user interface on the computing device associated with each member of the population of human participants in the second sub-group. In some cases, the operations of this step refer to, or may be performed by, software components as described with reference to FIG. 2.

At operation 1330 (e.g., at step f), the system collects and stores a third conversational dialogue in a third memory portion at the collaboration server from members of the population of human participants in the third sub-group during the interval via a user interface on the computing device associated with each member of the population of human participants in the third sub-group. In some cases, the operations of this step refer to, or may be performed by, software components as described with reference to FIG. 2.

For other embodiments, for example those in which more than three sub-groups are created, additional steps similar to 1320, 1325, and 1330 are performed on the conversational dialog associated with each of the additional sub-groups, collecting and storing dialog in additional memories. In some embodiments only two groups may be employed.

At operation 1335 (e.g., at step g), the system processes the first conversational dialogue at the collaboration server using a large language model to identify and express a first conversational argument in conversational form, where the identifying of the first conversational argument includes identifying at least one assertion, viewpoint, position or claim in the first conversational dialogue supported by evidence or reasoning, expressed or implied. In some cases, the operations of this step refer to, or may be performed by, software components as described with reference to FIG. 2.

At operation 1340 (e.g., at step h), the system processes the second conversational dialogue at the collaboration server using the large language model to identify and express a second conversational argument in conversational form, where the identifying of the second conversational argument includes identifying at least one assertion, viewpoint, position or claim in the second conversational dialogue supported by evidence or reasoning, expressed or implied. In some cases, the operations of this step refer to, or may be performed by, software components as described with reference to FIG. 2.

At operation 1345 (e.g., at step i), the system processes the third conversational dialogue at the collaboration server using the large language model to identify and express a third conversational argument in conversational form, where the identifying of the third conversational argument includes identifying at least one assertion, viewpoint, position or claim in the third conversational dialogue supported by evidence or reasoning, expressed or implied. In some cases, the operations of this step refer to, or may be performed by, software components as described with reference to FIG. 2.

For other embodiments, for example those in which more than three sub-groups are created, additional steps similar to 1335, 1340, and 1345 are performed on the conversational dialog associated with each of the additional sub-groups. In some embodiments only two groups may be employed.

At operation 1350 (e.g., at step j), the system sends the first conversational argument to be expressed in conversational form (via text or voice) to each of the members of a first different sub-group, where the first different sub-group is not the first sub-group. In some cases, the operations of this step refer to, or may be performed by, software components as described with reference to FIG. 2.

At operation 1355 (e.g., at step k), the system sends the second conversational argument to be expressed in conversational form (via text or voice) to each of the members of a second different sub-group, where the second different sub-group is not the second sub-group. In some cases, the operations of this step refer to, or may be performed by, software components as described with reference to FIG. 2.

At operation 1360 (e.g., at step 1), the system sends the third conversational argument to be expressed in conversational form (via text or voice) to each of the members of a third different sub-group, where the third different sub-group is not the third sub-group. In some cases, the operations of this step refer to, or may be performed by, software components as described with reference to FIG. 2.

For other embodiments, for example those in which more than three sub-groups are created, additional steps are performed that are similar to 1350, 1355, and 1360 in order to send additional conversational arguments from each of the additional sub-groups to be expressed in conversational form in other different sub-groups. In some embodiments only two groups may be employed.

At operation 1365 (e.g., at step m), the system repeats operations 1320-1360 (e.g., steps (d) through (l)) at least one time. In some cases, the operations of this step refer to, or may be performed by, software components as described with reference to FIG. 2.

FIG. 14 shows an example of a method 1400 for computer mediated collaboration according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1405 (e.g., in step a), the system sends the conversational prompt to the set of networked computing devices, the conversational prompt including a question to be collaboratively discussed by the population of human participants. In some cases, the operations of this step refer to, or may be performed by, software components as described with reference to FIG. 2. In some cases, the conversational prompt could be entered into the system by a designated human moderator in advance or in real-time.

At operation 1410 (e.g., in step b), the system presents, substantially simultaneously, a representation of the conversational prompt to each member of the population of human participants on a display of the computing device associated with that member. In some cases, the operations of this step refer to, or may be performed by, software components as described with reference to FIG. 2. In some embodiments the prompt is displayed textually. In other embodiments, the prompt is expressed verbally by a conversational agent.

At operation 1415 (e.g., in step c), the system divides the population of human participants into a first sub-group consisting of a first unique portion of the population, a second sub-group consisting of a second unique portion of the population, and a third sub-group consisting of a third unique portion of the population, where the first unique portion consists of a first set of members of the population of human participants, the second unique portion consists of a second set of members of the population of human participants and the third unique portion consists of a third set of members of the population of human participants, including dividing the population of human participants as a function of user initial responses to the conversational prompt. In some cases, the operations of this step refer to, or may be performed by, software components as described with reference to FIG. 2. In some embodiments, the sub-groups are formed before some or all of the prior steps. In many embodiments, additional sub-groups (i.e., more than three) are formed following the same method.

At operation 1420 (e.g., in step d), the system collects and stores a first conversational dialogue in a first memory portion at the collaboration server from members of the population of human participants in the first sub-group during an interval via a user interface on the computing device associated with each member of the population of human participants in the first sub-group. In some cases, the operations of this step refer to, or may be performed by, software components as described with reference to FIG. 2.

At operation 1425 (e.g., in step e), the system collects and stores a second conversational dialogue in a second memory portion at the collaboration server from members of the population of human participants in the second sub-group during the interval via a user interface on the computing device associated with each member of the population of human participants in the second sub-group. In some cases, the operations of this step refer to, or may be performed by, software components as described with reference to FIG. 2.

At operation 1430 (e.g., in step f), the system collects and stores a third conversational dialogue in a third memory portion at the collaboration server from members of the population of human participants in the third sub-group during the interval via a user interface on the computing device associated with each member of the population of human participants in the third sub-group. In some cases, the operations of this step refer to, or may be performed by, software components as described with reference to FIG. 2.

For other embodiments, for example, those in which more than three sub-groups are created, additional steps similar to 1420, 1425, and 1430 are performed on the conversational dialog associated with each of the additional sub-groups, collecting and storing dialog in additional memories.

At operation 1435 (e.g., in step g), the system processes the first conversational dialogue at the collaboration server using a large language model to express a first conversational summary in conversational form. In some cases, the operations of this step refer to, or may be performed by, software components as described with reference to FIG. 2.

At operation 1440 (e.g., in step h), the system processes the second conversational dialogue at the collaboration server using the large language model to express a second conversational summary in conversational form. In some cases, the operations of this step refer to, or may be performed by, software components as described with reference to FIG. 2.

At operation 1445 (e.g., in step i), the system processes the third conversational dialogue at the collaboration server using the large language model to express a third conversational summary in conversational form. In some cases, the operations of this step refer to, or may be performed by, software components as described with reference to FIG. 2.

For other embodiments, for example, those in which more than three sub-groups are created, additional steps similar to 1435, 1440, and 1445 are performed on the conversational dialog associated with each of the additional sub-groups.

At operation 1450 (e.g., in step j), the system sends the first conversational summary to be expressed in conversational form (via text or voice) to each of the members of a first different sub-group, where the first different sub-group is not the first sub-group. In some cases, the operations of this step refer to, or may be performed by, software components as described with reference to FIG. 2.

At operation 1455 (e.g., in step k), the system sends the second conversational summary to be expressed in conversational form (via text or voice) to each of the members of a second different sub-group, where the second different sub-group is not the second sub-group. In some cases, the operations of this step refer to, or may be performed by, software components as described with reference to FIG. 2.

At operation 1460 (e.g., in step l), the system sends the third conversational summary to be expressed in conversational form (via text or voice) to each of the members of a third different sub-group, where the third different sub-group is not the third sub-group. In some cases, the operations of this step refer to, or may be performed by, software components as described with reference to FIG. 2.

For other embodiments, for example, those in which more than three sub-groups are created, additional steps are performed that are similar to 1450, 1455, and 1460 in order to send additional conversational summaries from each of the additional sub-groups to be expressed in conversational form in other different sub-groups.

At operation 1465 (e.g., in step m), the system repeats operations 1420-1460 (e.g., steps (d) through (l)) at least one time. In some cases, the operations of this step refer to, or may be performed by, software components as described with reference to FIG. 2.

FIG. 15 shows an example of a method 1500 for computer mediated collaboration according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1505 (e.g., in step n), the system monitors the first conversational dialogue for a first assertion, viewpoint, position or claim not supported by first reasoning or evidence. In some cases, the operations of this step refer to, or may be performed by, software components as described with reference to FIG. 2.

At operation 1510 (e.g., in step o), the system sends, in response to monitoring the first conversational dialogue, a first conversational question to the first sub-group requesting first reasoning or evidence in support of the first assertion, viewpoint, position or claim. In some cases, the operations of this step refer to, or may be performed by, software components as described with reference to FIG. 2.

At operation 1515 (e.g., in step p), the system monitors the second conversational dialogue for a second assertion, viewpoint, position or claim not supported by second reasoning or evidence. In some cases, the operations of this step refer to, or may be performed by, software components as described with reference to FIG. 2.

At operation 1520 (e.g., in step q), the system sends in response to monitoring the second conversational dialogue, a second conversational question to the second sub-group requesting second reasoning or evidence in support of the second assertion, viewpoint, position or claim. In some cases, the operations of this step refer to, or may be performed by, software components as described with reference to FIG. 2.

At operation 1525 (e.g., in step r), the system monitors the third conversational dialogue for a third assertion, viewpoint, position or claim not supported by third reasoning or evidence. In some cases, the operations of this step refer to, or may be performed by, software components as described with reference to FIG. 2.

At operation 1530 (e.g., in step s), the system sends in response to monitoring the third conversational dialogue, a third conversational question to the third sub-group requesting third reasoning or evidence in support of the third assertion, viewpoint, position or claim. In some cases, the operations of this step refer to, or may be performed by, software components as described with reference to FIG. 2.

For other embodiments, for example those in which more than three sub-groups are created, additional steps similar to 1505, 1510, 1515, 1520, 1525 and 1550 are performed on the conversational dialog associated with each of the additional sub-groups. In some embodiments only two groups may be employed.

FIG. 16 shows an example of a method 1600 for computer mediated collaboration according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1605 (e.g., in step n), the system monitors the first conversational dialogue for a first assertion, viewpoint, position or claim supported by first reasoning or evidence. In some cases, the operations of this step refer to, or may be performed by, software components as described with reference to FIG. 2.

At operation 1610 (e.g., in step o), the system sends, in response to monitoring the first conversational dialogue, a first conversational challenge to the first sub-group questioning the first reasoning or evidence in support of the first assertion, viewpoint, position or claim. In some cases, the operations of this step refer to, or may be performed by, software components as described with reference to FIG. 2.

At operation 1615 (e.g., in step p), the system monitors the second conversational dialogue for a second assertion, viewpoint, position or claim supported by second reasoning or evidence. In some cases, the operations of this step refer to, or may be performed by, software components as described with reference to FIG. 2.

At operation 1620 (e.g., in step q), the system sends, in response to monitoring the second conversational dialogue, a second conversational challenge to the second sub-group questioning second reasoning or evidence in support of the second assertion, viewpoint, position or claim. In some cases, the operations of this step refer to, or may be performed by, software components as described with reference to FIG. 2.

At operation 1625 (e.g., in step r), the system monitors the third conversational dialogue for a third assertion, viewpoint, position or claim supported by third reasoning or evidence. In some cases, the operations of this step refer to, or may be performed by, software components as described with reference to FIG. 2.

At operation 1630 (e.g., in step s), the system sends, in response to monitoring the third conversational dialogue, a third conversational challenge to the third sub-group questioning third reasoning or evidence in support of the third assertion, viewpoint, position or claim. In some cases, the operations of this step refer to, or may be performed by, software components as described with reference to FIG. 2.

For other embodiments, for example those in which more than three sub-groups are created, additional steps similar to 1605, 1610, 1615, 1620, 1625 and 1630 are performed on the conversational dialog associated with each of the additional sub-groups. In some embodiments only two groups may be employed.

FIG. 17 shows an example of a method 1700 for computer mediated collaboration according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1705 (e.g., in step n), the system processes the first conversational summary, the second conversational summary, and the third conversational summary using the large language model to generate a list of assertions, positions, reasons, themes or concerns from across the first sub-group, the second sub-group, and the third sub-group. In some cases, the operations of this step refer to, or may be performed by, software components as described with reference to FIG. 2.

At operation 1710 (e.g., in step o), the system displays to the human moderator using the collaboration server the list of assertions, positions, reasons, themes or concerns from across the first sub-group, the second sub-group, and the third sub-group. In some cases, the operations of this step refer to, or may be performed by, software components as described with reference to FIG. 2.

At operation 1715 (e.g., in step p), the system receives a selection of at least one of the assertions, positions, reasons, themes or concerns from the human moderator via the collaboration server. In some cases, the operations of this step refer to, or may be performed by, software components as described with reference to FIG. 2.

At operation 1720 (e.g., in step q), the system generates a global conversational summary expressed in conversational form as a function of the selection of the at least one of the assertions, positions, reasons, themes or concerns. In some cases, the operations of this step refer to, or may be performed by, software components as described with reference to FIG. 2.

In some embodiments the function that the human moderator performs in step 1715 can be replaced by software running on the collaboration server that executes a selection by algorithmic heuristic or by tasking an AI Agent to perform a selection process by following guidelines. Whether using a heuristic or an AI agent in place of the human moderator, the software process on the collaboration server is configured to select the at least one of the positions, reasons, themes or concerns. In some embodiments, the at least one of the positions, reasons, themes, or concerns is selected based at least in part on it being associated with a conviction value, confidence value, sentiment value, and/or scope value that is higher than other items in the list of positions, reasons, themes, or concerns. In other embodiments, the at least one of the positions, reasons, themes, or concerns is selected based at least in part on it being associated with a conviction value, confidence value, sentiment value and/or scope value that is higher than a threshold value.

For other embodiments, for example those in which more than three sub-groups are created, steps similar to 1705 and 1710 are performed on the conversational dialog associated with each of the additional sub-groups. In some embodiments only two groups may be employed.

FIG. 18 shows an example of a method 1800 for computer mediated collaboration according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1805 (e.g., in steps d-f), the system collects and stores a first conversational dialogue from a first sub-group, a second conversational dialogue from a second sub-group, and a third conversational dialogue from a third sub-group, said first, second, and third sub-groups not being the same sub-groups. In some cases, the operations of this step refer to, or may be performed by, software components as described with reference to FIG. 2.

For other embodiments, for example those in which more than three sub-groups are created, a step similar to 1805 is performed on the conversational dialog associated with each of the additional sub-groups. In some embodiments only two groups may be employed.

At operation 1810 (e.g., in step g), the system processes the first conversational dialogue at the collaboration server using a large language model to generate a first conversational summary. In some cases, the operations of this step refer to, or may be performed by, software components as described with reference to FIG. 2.

At operation 1815 (e.g., in step h), the system processes the second conversational dialogue at the collaboration server using the large language model to generate a second conversational summary. In some cases, the operations of this step refer to, or may be performed by, software components as described with reference to FIG. 2.

At operation 1820 (e.g., in step i), the system processes the third conversational dialogue at the collaboration server using the large language model to generate a third conversational summary. In some cases, the operations of this step refer to, or may be performed by, software components as described with reference to FIG. 2.

For other embodiments, for example those in which more than three sub-groups are created, additional steps similar to 1810, 1815 and 1820 are performed on the conversational dialog associated with each of the additional sub-groups. In some embodiments only two groups may be employed. At operation 1825 (e.g., in step j), the system sends the first conversational summary to each of the members of a first different sub-group and expresses it to each member in conversational form via text or voice, where the first different sub-group is not the first sub-group. In some cases, the operations of this step refer to, or may be performed by, software components as described with reference to FIG. 2.

At operation 1830 (e.g., in step k), the system sends the second conversational summary to each of the members of a second different sub-group and expresses it to each member in conversational form via text or voice, where the second different sub-group is not the second sub-group. In some cases, the operations of this step refer to, or may be performed by, software components as described with reference to FIG. 2.

At operation 1835 (e.g., in step l), the system sends the third conversational summary to each of the members of a third different sub-group and expresses it to each member in conversational form via text or voice, where the third different sub-group is not the third sub-group. In some cases, the operations of this step refer to, or may be performed by, software components as described with reference to FIG. 2.

For other embodiments, for example those in which more than three sub-groups are created, additional steps similar to 1825, 1830 and 1835 are performed on the conversational dialog associated with each of the additional sub-groups. In some embodiments only two groups may be employed.

At operation 1840 (e.g., in step m), the system repeats operations 1805-1835 (e.g., steps (d) through (l)) at least one time. In some cases, the operations of this step refer to, or may be performed by, software components as described with reference to FIG. 2.

At operation 1845 (e.g., in step n), the system processes the first conversational summary, the second conversational summary, and the third conversational summary using the large language model to generate a global conversational summary. In many preferred embodiments, the global conversational summary is represented, at least in part, in conversational form. In many embodiments the system sends the global conversational summary to a plurality of members of the full population of members and expresses it to each member in conversational form via text or voice. In some embodiments, the plurality of members is the full population of members. In many embodiments the expression in conversational form is in the first person. In some cases, the operations of this step refer to, or may be performed by, software components as described with reference to FIG. 2.

For other embodiments, for example those in which more than three sub-groups are created, a step similar to 1845 is performed on the conversational dialog associated with each of the additional sub-groups. In some embodiments only two groups may be employed.

It should be noted that in some embodiments of the present invention, some participants may communicate by text chat while other participants communicate by voice chat and other participants communicate by video chat or VR chat. In other words, the methods described herein can enable a combined environment in which participants communicate in real-time conversations through multiple modalities of text, voice, video, or VR. For example, a participant can communicate by text as input while receiving voice, video, or VR messages from other members as output. In addition, a participant can communicate by text as input while receiving conversational summaries from surrogate agents as voice, video, or VR output.

In such embodiments, each networked computing device includes appropriate input and output elements, such as one or more screen displays, haptic devices, cameras, microphones, speakers, LIDAR sensors, and the like, as appropriate to voice, video, and virtual reality (VR) communications.

Accordingly (e.g., based on the techniques described with reference to FIGS. 1-11, the operations described with reference to FIGS. 12-18, etc.), the present disclosure includes the following aspects.

Methods, apparatuses, non-transitory computer readable medium, and systems for computer mediated collaboration for distributed conversations is described. One or more aspects of the methods, apparatuses, non-transitory computer readable medium, and systems include providing a collaboration server running a collaboration application, the collaboration server in communication with the plurality of the networked computing devices, each computing device associated with one member of the population of human participants, the collaboration server defining a plurality of sub-groups of the population of human participants, the collaboration server comprising: providing a local chat application on each networked computing device, the local chat application configured for displaying a conversational prompt received from the collaboration server, and for enabling real-time chat communication with other members of a sub-group assigned by the collaboration server, the real-time chat communication including sending chat input collected from the one member associated with the networked computing device to other members of the assigned sub-group; and enabling steps (e.g., steps or operations for computer mediated collaboration for distributed conversations) through communication between the collaboration application running on the collaboration server and the local chat applications running on each of the plurality of networked computing devices. The steps enabled through communication between the collaboration application and the local chat applications include: (a) sending the conversational prompt to o the plurality of networked computing devices, the conversational prompt comprising a question, issue, or topic to be collaboratively discussed by the population of human participants, (b) presenting, substantially simultaneously, a representation of the conversational prompt to each member of the population of human participants on a display of the computing device associated with that member, (c) dividing the population of human participants into a first sub-group consisting of a first unique portion of the population, a second sub-group consisting of a second unique portion of the population, and a third sub-group consisting of a third unique portion of the population, wherein the first unique portion consists of a first plurality of members of the population of human participants, the second unique portion consists of a second plurality of members of the population of human participants and the third unique portion consists of a third plurality of members of the population of human participants, (d) collecting and storing a first conversational dialogue in a first memory portion at the collaboration server from members of the population of human participants in the first sub-group during an interval via a user interface on the computing device associated with each member of the population of human participants in the first sub-group, (e) collecting and storing a second conversational dialogue in a second memory portion at the collaboration server from members of the population of human participants in the second sub-group during the interval via a user interface on the computing device associated with each member of the population of human participants in the second sub-group, (f) collecting and storing a third conversational dialogue in a third memory portion at the collaboration server from members of the population of human participants in the third sub-group during the interval via a user interface on the computing device associated with each member of the population of human participants in the third sub-group, (g) processing the first conversational dialogue at the collaboration server using a large language model to identify and express a first conversational argument in conversational form, wherein the identifying of the first conversational argument comprises identifying at least one viewpoint, position or claim in the first conversational dialogue supported by evidence or reasoning, (h) processing the second conversational dialogue at the collaboration server using the large language model to identify and express a second conversational argument in conversational form, wherein the identifying of the second conversational argument comprises identifying at least one viewpoint, position or claim in the second conversational dialogue supported by evidence or reasoning, (i) processing the third conversational dialogue at the collaboration server using the large language model to identify and express a third conversational argument in conversational form, wherein identifying of the third conversational argument comprises identifying at least one viewpoint, position or claim in the third conversational dialogue supported by evidence or reasoning, (j) sending the first conversational argument expressed in conversational form to each of the members of a first different sub-group, wherein the first different sub-group is not the first sub-group, (k) sending the second conversational argument expressed in conversational form to each of the members of a second different sub-group, wherein the second different sub-group is not the second sub-group, (l) sending the third conversational argument expressed in conversational form to each of the members of a third different sub-group, wherein the third different sub-group is not the third sub-group, and (m) repeating steps (d) through (l) at least one time.

In some embodiments more than three subgroups are employed in which case additional steps are added in accordance with the example steps performed for the first, second, and third sub-groups. In other embodiments, only two subgroups are employed, in which. case the steps described with respect to sub-group three are not performed. In addition, it is important to note that step (c) which divides the population into sub-groups may be performed before step (a) or step (b). In addition, step (c) can be performed multiple times to reshuffle the members assigned to sub-groups and/or to alter the number of sub-groups that the population is divided into. In some emompides, the natural place to adjust the number or membership of the sub-groups is before performing step (m) in which the prior steps (d) through (l) are repeated at least one time.

Some examples of the methods, apparatuses, non-transitory computer readable medium, and systems described herein further include sending, in step (j), the first conversational argument expressed in conversational form to each of the members of a first different sub-group expressed in first person as if the first conversational argument were coming from a member of the first different sub-group of the population of human participants. Some examples further include sending, in step (k), the second conversational argument expressed in conversational form to each of the members of a second different sub-group expressed in first person as if the second conversational argument were coming from a member of the second different sub-group of the population of human participants. Some examples further include sending, in step (l), the third conversational argument expressed in conversational form to each of the members of a third different sub-group expressed in first person as if the third conversational argument were coming from a member of the third different sub-group of the population of human participants.

Some examples of the methods, apparatuses, non-transitory computer readable medium, and systems described herein further include processing, in step (n), the first conversational argument, the second conversational argument, and the third conversational argument using the large language model to generate a global conversational argument expressed in conversational form.

Some examples of the methods, apparatuses, non-transitory computer readable medium, and systems described herein further include sending, in step (o), the global conversational argument expressed in conversational form to each of the members of the first sub-group, the second sub-group, and the third sub-group.

In some aspects, a final global conversational argument is generated by weighting more recent ones of the global conversational arguments more heavily than less recent ones of the global conversational arguments.

In some aspects, the first conversational dialogue, the second conversational dialogue and the third conversational dialogue each comprise a set of ordered chat messages comprising text.

In some aspects, the first conversational dialogue, the second conversational dialogue and the third conversational dialogue each further comprise a respective member identifier for the member of the population of human participants who entered each chat message.

In some aspects, the first conversational dialogue, the second conversational dialogue and the third conversational dialogue each further comprises a respective timestamp identifier for a time of day when each chat message is entered.

In aspects, some the processing the first conversational dialogue in step (g) further comprises determining a respective response target indicator for each chat message entered by the first sub-group, wherein the respective response target indicator provides an indication of a prior chat message to which each chat message is responding; the processing the second conversational dialogue in step (h) further comprises determining a respective response target indicator for each chat message entered by the second sub-group, wherein the respective response target indicator provides an indication of a prior chat message to which each chat message is responding; and the processing the third conversational dialogue in step (i) further comprises determining a respective response target indicator for each chat message entered by the third sub-group, wherein the respective response target indicator provides an indication of a prior chat message to which each chat message is responding.

In some aspects, the processing the first conversational dialogue in step (g) further comprises determining a respective sentiment indicator for each chat message entered by the first sub-group, wherein the respective sentiment indicator provides an indication of whether each chat message is in agreement or disagreement with prior chat messages; the processing the second conversational dialogue in step (h) further comprises determining a respective sentiment indicator for each chat message entered by the second sub-group, wherein the respective sentiment indicator provides an indication of whether each chat message is in agreement or disagreement with prior chat messages; and the processing the third conversational dialogue in step (i) further comprises determining a respective sentiment indicator for each chat message entered by the third sub-group, wherein the respective sentiment indicator provides an indication of whether each chat message is in agreement or disagreement with prior chat messages.

In some aspects, the processing the first conversational dialogue in step (g) further comprises determining a respective conviction indicator for each chat message entered by the first sub-group, wherein the respective conviction indicator provides an indication of conviction for each chat message; the processing the second conversational dialogue in step (h) further comprises determining a respective conviction indicator for each chat message entered by the second sub-group, wherein the respective conviction indicator provides an indication of conviction for each chat message; and the processing the third conversational dialogue in step (i) further comprises determining a respective conviction indicator for each chat message entered by the third sub-group, wherein the respective conviction indicator provides an indication of conviction each chat message is in the expressions of the chat message.

In some aspects, the first unique portion of the population (i.e., a first sub-group) consists of no more than ten members of the population of human participants, the second unique portion consists of no more than ten members of the population of human participants, and the third unique portion consists of no more than ten members of the population of human participants.

In some aspects, the first conversational dialogue comprises chat messages comprising voice (i.e., real-time verbal content expressed during a conversation by a user 145 and captured by a microphone associated with their computing device 135.)

In some aspects, the voice includes words spoken, and at least one spoken language component selected from the group of spoken language components consisting of tone, pitch, rhythm, volume and pauses. In some embodiments, the verbal content is converted into textual content (by well-known speech to text methods) prior to transmission to the collaboration server 145.)

In some aspects, the first conversational dialogue comprises chat messages comprising video (i.e., real-time verbal content expressed during a conversation by a user 145 and captured by a camera and microphone associated with their computing device 135).

In some aspects, the video includes words spoken, and at least one language component selected from the group of language components consisting of tone, pitch, rhythm, volume, pauses, facial expressions, gestures, and body language.

In some aspects, the each of the repeating steps occurs after expiration of an interval.

In some aspects, the interval is a time interval.

In some aspects, the interval is a number of conversational interactions.

In some aspects, the first different sub-group is the second sub-group, and the second different sub-group is the third sub-group.

In some aspects, the first different sub-group is a first randomly selected sub-group, the second different sub-group is a second randomly selected sub-group, and the third different sub-group is a third randomly selected sub-group, wherein the first randomly selected sub-group, the second randomly selected sub-group and the third randomly selected sub-group are not the same sub-group.

Some examples of the methods, apparatuses, non-transitory computer readable medium, and systems described herein further include processing, in step (g), the first conversational dialogue at the collaboration server using the large language model to identify and express the first conversational argument in conversational form, wherein the identifying of the first conversational argument comprises identifying at least one viewpoint, position or claim in the first conversational dialogue supported by evidence or reasoning, wherein the first conversational argument is not identified in the first different sub-group. Some examples further include processing, in step (h), the second conversational dialogue at the collaboration server using the large language model to identify and express the second conversational argument in conversational form, wherein the identifying of the second conversational argument comprises identifying at least one viewpoint, position or claim in the second conversational dialogue supported by evidence or reasoning, wherein the second conversational argument is not identified in the second different sub-group. Some examples further include processing, in step (i), the third conversational dialogue at the collaboration server using the large language model to identify and express the third conversational argument in conversational form, wherein the identifying of the third conversational argument comprises identifying at least one viewpoint, position or claim in the third conversational dialogue supported by evidence or reasoning, wherein the third conversational argument is not identified in the third different sub-group.

One or more aspects of the methods, apparatuses, non-transitory computer readable medium, and systems described herein include sending, in step (a), the conversational prompt to the plurality of networked computing devices, the conversational prompt comprising a question, issue, or topic to be collaboratively discussed by the population of human participants; presenting, in step (b), substantially simultaneously, a representation of the conversational prompt to each member of the population of human participants on a display of the computing device associated with that member; dividing, in step (c), the population of human participants into a first sub-group consisting of a first unique portion of the population, a second sub-group consisting of a second unique portion of the population, and a third sub-group consisting of a third unique portion of the population, wherein the first unique portion consists of a first plurality of members of the population of human participants, the second unique portion consists of a second plurality of members of the population of human participants and the third unique portion consists of a third plurality of members of the population of human participants, comprising dividing the population of human participants as a function of user initial responses to the to the conversational prompt; collecting and storing, in step (d), a first conversational dialogue in a first memory portion at the collaboration server from members of the population of human participants in the first sub-group during an interval via a user interface on the computing device associated with each member of the population of human participants in the first sub-group; collecting and storing, in step (e), a second conversational dialogue in a second memory portion at the collaboration server from members of the population of human participants in the second sub-group during the interval via a user interface on the computing device associated with each member of the population of human participants in the second sub-group; collecting and storing, in step (f), a third conversational dialogue in a third memory portion at the collaboration server from members of the population of human participants in the third sub-group during the interval via a user interface on the computing device associated with each member of the population of human participants in the third sub-group; processing, in (g), step the first conversational dialogue at the collaboration server using a large language model to express a first conversational summary in conversational form; processing, in step (h), the second conversational dialogue at the collaboration server using the large language model to express a second conversational summary in conversational form; processing, in step (i), the third conversational dialogue at the collaboration server using the large language model to express a third conversational summary in conversational form; sending, in step (j), the first conversational summary expressed in conversational form to each of the members of a first different sub-group, wherein the first different sub-group is not the first sub-group; sending, in step (k), the second conversational summary expressed in conversational form to each of the members of a second different sub-group, wherein the second different sub-group is not the second sub-group; sending, in step (l), the third conversational summary expressed in conversational form to each of the members of a third different sub-group, wherein the third different sub-group is not the third sub-group; and repeating, in step (m), steps (d) through (l) at least one time.

Some examples of the methods, apparatuses, non-transitory computer readable medium, and systems described herein further include sending, in step (j), the first conversational summary expressed in conversational form to each of the members of a first different sub-group expressed in first person as if the first conversational summary were coming from an additional member (simulated) of the first different sub-group of the population of human participants. Some examples further include sending, in step (k), the second conversational summary expressed in conversational form to each of the members of a second different sub-group expressed in first person as if the as if the second conversational summary were coming from an additional member (simulated) of the second different sub-group of the population of human participants. Some examples further include sending, in step (l), the third conversational summary expressed in conversational form to each of the members of a third different sub-group expressed in first person as if the third conversational summary were coming from an additional member (simulated) of the third different sub-group of the population of human participants.

Some examples of the methods, apparatuses, non-transitory computer readable medium, and systems described herein further include processing, in step (n), the first conversational summary, the second conversational summary, and the third conversational summary using the large language model to generate a global conversational summary expressed in conversational form.

Some examples of the methods, apparatuses, non-transitory computer readable medium, and systems described herein further include sending, in step (o), the global conversational summary expressed in conversational form to each of the members of the first sub-group, the second sub-group, and the third sub-group.

In some aspects, a final global conversational summary is generated by weighting more recent ones of the global conversational summaries more heavily than less recent ones of the global conversational summaries.

In some aspects, the dividing the population of human participants, in step (c), comprises: assessing the initial responses to determine the most popular user perspectives the dividing the population to distribute the most popular user perspectives amongst the first sub-group the second sub-group and the third sub-group.

Some examples of the methods, apparatuses, non-transitory computer readable medium, and systems described herein further include presenting, substantially simultaneously, in step (b), a representation of the conversational prompt to each member of the population of human participants on a display of the computing device associated with that member, wherein the presenting further comprises providing a set of alternatives, options or controls for initially responding to the conversational prompt.

In some aspects, the dividing the population of human participants, in step (c), comprises: assessing the initial responses to determine the most popular user perspectives the dividing the population to group users having the first most popular user perspective together in the first sub-group, users having the second most popular user perspective together in the second sub-group, and users having the third most popular user perspective together in the third sub-group.

One or more aspects of the methods, apparatuses, non-transitory computer readable medium, and systems described herein include monitoring, in step (n), the first conversational dialogue for a first viewpoint, position or claim not supported by first reasoning or evidence; sending, in step (o), in response to monitoring the first conversational dialogue, a first conversational question to the first sub-group requesting first reasoning or evidence in support of the first viewpoint, position or claim; monitoring, in step (p), the second conversational dialogue for a second viewpoint, position or claim not supported by second reasoning or evidence; sending, in step (q), in response to monitoring the second conversational dialogue, a second conversational question to the second sub-group requesting second reasoning or evidence in support of the second viewpoint, position or claim; monitoring, in step (r), the third conversational dialogue for a third viewpoint, position or claim not supported by third reasoning or evidence; and sending, in step(s), in response to monitoring the third conversational dialogue, a third conversational question to the third sub-group requesting third reasoning or evidence in support of the third viewpoint, position or claim.

One or more aspects of the methods, apparatuses, non-transitory computer readable medium, and systems described herein include monitoring, in step (n), the first conversational dialogue for a first viewpoint, position or claim supported by first reasoning or evidence; sending, in step (o), in response to monitoring the first conversational dialogue, a first conversational challenge to the first sub-group questioning the first reasoning or evidence in support of the first viewpoint, position or claim; monitoring, in step (p), the second conversational dialogue for a second viewpoint, position or claim supported by second reasoning or evidence; sending, in step (q), in response to monitoring the second conversational dialogue, a second conversational challenge to the second sub-group questioning second reasoning or evidence in support of the second viewpoint, position or claim; monitoring, in step (r), the third conversational dialogue for a third viewpoint, position or claim supported by third reasoning or evidence; and sending, in step(s), in response to monitoring the third conversational dialogue, a third conversational challenge to the third sub-group questioning third reasoning or evidence in support of the third viewpoint, position or claim.

Some examples of the methods, apparatuses, non-transitory computer readable medium, and systems described herein further include sending, in step (o), the first conversational challenge to the first sub-group questioning the first reasoning or evidence in support of the first viewpoint, position, or claim, wherein the questioning the first reasoning or evidence includes a viewpoint, position, or claim collected from the second different sub-group or the third different sub-group.

One or more aspects of the methods, apparatuses, non-transitory computer readable medium, and systems described herein include processing, in step (n), the first conversational summary, the second conversational summary, and the third conversational summary using the large language model to generate a list of positions, reasons, themes or concerns from across the first sub-group, the second sub-group, and the third sub-group; displaying, in step (o), to the human moderator using the collaboration server the list of positions, reasons, themes or concerns from across the first sub-group, the second sub-group, and the third sub-group; receiving, in step (p), a selection of at least one of the positions, reasons, themes or concerns from the human moderator via the collaboration server; and generating, in step (q), a global conversational summary expressed in conversational form as a function of the selection of the at least one of the positions, reasons, themes or concerns.

In some aspects, the providing the local moderation application on at least one networked computing device, the local moderation application configured to allow the human moderator to observe the first conversational dialogue, the second conversational dialogue, and the third conversational dialogue.

In some aspects, the providing the local moderation application on at least one networked computing device, the local moderation application configured to allow the human moderator to selectively and collectively send communications to members of the first sub-group, send communications to members of the second sub-group, and send communications to members of the third sub-group.

Some examples of the methods, apparatuses, non-transitory computer readable medium, and systems described herein further include sending, in step (r), the global conversational summary expressed in conversational form to each of the members of the first sub-group, the second sub-group, and the third sub-group.

One or more aspects of the methods, apparatuses, non-transitory computer readable medium, and systems described herein include processing, in step (g), the first conversational dialogue at the collaboration server using a large language model to express a first conversational summary in conversational form; processing, in step (h), the second conversational dialogue at the collaboration server using the large language model to express a second conversational summary in conversational form; processing, in step (i), the third conversational dialogue at the collaboration server using the large language model to express a third conversational summary in conversational form; sending, in step (j), the first conversational summary expressed in conversational form to each of the members of a first different sub-group, wherein the first different sub-group is not the first sub-group; sending, in step (k), the second conversational summary expressed in conversational form to each of the members of a second different sub-group, wherein the second different sub-group is not the second sub-group; sending, in step (l), the third conversational summary expressed in conversational form to each of the members of a third different sub-group, wherein the third different sub-group is not the third sub-group; repeating, in step (m), steps (d) through (l) at least one time; and processing, in step (n), the first conversational summary, the second conversational summary, and the third conversational summary using the large language model to generate a global conversational summary expressed in conversational form.

Some examples of the methods, apparatuses, non-transitory computer readable medium, and systems described herein further include processing, in step (n), the first conversational summary, the second conversational summary, and the third conversational summary using the large language model to generate a first global conversational summary expressed in conversational form, wherein the first global conversational summary is tailored to the first sub-group, generate a second global conversational summary, wherein the second global conversational summary is tailored to the second sub-group, and generate a third global conversational summary, wherein the third global conversational summary is tailored to the third sub-group. Some examples further include sending, in step (o), the first global conversational summary expressed in conversational form to each of the members of the first sub-group, send the second global conversational summary expressed in conversational from to the each of the members of the second sub-group, and send the third global conversational summary expressed in conversational from to each of the members of the third sub-group.

Some examples of the methods, apparatuses, non-transitory computer readable medium, and systems described herein further include processing, in step (n), the first conversational summary, the second conversational summary, and the third conversational summary using the large language model to generate a first global conversational summary expressed in conversational form, wherein the first global conversational summary is tailored to the first sub-group by including a viewpoint, position, or claim not expressed in the first sub-group, generate a second global conversational summary, wherein the second global conversational summary is tailored to the second sub-group by including a viewpoint, position, or claim not expressed in the second sub-group, and generate a third global conversational summary, wherein the third global conversational summary is tailored to the third sub-group by including a viewpoint, position, or claim not expressed in the third sub-group.

Some examples of the methods, apparatuses, non-transitory computer readable medium, and systems described herein further include processing, in step (n), the first conversational summary, the second conversational summary, and the third conversational summary using the large language model to generate a first global conversational summary expressed in conversational form, wherein the first global conversational summary is tailored to the first sub-group by including a viewpoint, position, or claim not expressed in the first sub-group, wherein the viewpoint, position, or claim not expressed in the first sub-group is collected from the first different subgroup, wherein the second global conversational summary is tailored to the second sub-group by including a viewpoint, position, or claim not expressed in the second sub-group, wherein the viewpoint, position, or claim not expressed in the second sub-group is collected from the second different subgroup, wherein the third global conversational summary is tailored to the third sub-group by including a viewpoint, position, or claim not expressed in the third sub-group, wherein the viewpoint, position, or claim not expressed in the third sub-group is collected from the third different subgroup.

One or more aspects of the methods, apparatuses, non-transitory computer readable medium, and systems described herein include sending, in step (a), the conversational prompt to the plurality of networked computing devices, the conversational prompt comprising a question, issue, or topic to be collaboratively discussed by the population of human participants; presenting, in step (b), substantially simultaneously, a representation of the conversational prompt to each member of the population of human participants on a display of the computing device associated with that member; dividing, in step (c), the population of human participants into a first sub-group consisting of a first unique portion of the population, a second sub-group consisting of a second unique portion of the population, and a third sub-group consisting of a third unique portion of the population, wherein the first unique portion consists of a first plurality of members of the population of human participants, the second unique portion consists of a second plurality of members of the population of human participants and the third unique portion consists of a third plurality of members of the population of human participants; collecting and storing, in step (d), a first conversational dialogue in a first memory portion at the collaboration server from members of the population of human participants in the first sub-group during an interval via a user interface on the computing device associated with each member of the population of human participants in the first sub-group, wherein the first conversational dialogue comprises chat messages comprising a first segment of video including at least one member of the first sub-group; collecting and storing, in step (e), a second conversational dialogue in a second memory portion at the collaboration server from members of the population of human participants in the second sub-group during the interval via a user interface on the computing device associated with each member of the population of human participants in the second sub-group, wherein the first conversational dialogue comprises chat messages comprising a second segment of video including at least one member of the second sub-group; collecting and storing, in step (f), a third conversational dialogue in a third memory portion at the collaboration server from members of the population of human participants in the third sub-group during the interval via a user interface on the computing device associated with each member of the population of human participants in the third sub-group, wherein the first conversational dialogue comprises chat messages comprising a second segment of video including at least one member of the third sub-group; processing, in step (g), the first conversational dialogue at the collaboration server using a large language model to express a first conversational summary in conversational form; processing, in step (h), the second conversational dialogue at the collaboration server using the large language model to express a second conversational summary in conversational form; processing, in step (i), the third conversational dialogue at the collaboration server using the large language model to express a third conversational summary in conversational form; sending, in step (j), the first conversational summary expressed in conversational form to each of the members of a first different sub-group, wherein the first different sub-group is not the first sub-group; sending, in step (k), the second conversational summary expressed in conversational form to each of the members of a second different sub-group, wherein the second different sub-group is not the second sub-group; sending, in step (l), the third conversational summary expressed in conversational form to each of the members of a third different sub-group, wherein the third different sub-group is not the third sub-group; and repeating, in step (m), steps (d) through (l) at least one time.

Some examples of the methods, apparatuses, non-transitory computer readable medium, and systems described herein further include sending, in step (j), the first conversational summary expressed in conversational form to each of the members of a first different sub-group expressed in first person as if the first conversational summary were coming from an additional member (simulated) of the first different sub-group of the population of human participants. Some examples further include sending, in step (k), the second conversational summary expressed in conversational form to each of the members of a second different sub-group expressed in first person as if the as if the second conversational summary were coming from an additional member (simulated) of the second different sub-group of the population of human participants. Some examples further include sending, in step (l), the third conversational summary expressed in conversational form to each of the members of a third different sub-group expressed in first person as if the third conversational summary were coming from an additional member (simulated) of the third different sub-group of the population of human participants.

Some examples of the methods, apparatuses, non-transitory computer readable medium, and systems described herein further include sending, in step (j), the first conversational summary expressed in conversational form to each of the members of a first different sub-group expressed in first person as if the first conversational summary were coming from an additional member (simulated) of the first different sub-group of the population of human participants, including sending the first conversational summary in a first video segment comprising a graphical character representation expressing the first conversational summary through movement and voice. Some examples further include sending, in step (k), the second conversational summary expressed in conversational form to each of the members of a second different sub-group expressed in first person as if the as if the second conversational summary were coming from an additional member (simulated) of the second different sub-group of the population of human participants, including sending the second conversational summary in a second video segment comprising a graphical character representation expressing the second conversational summary through movement and voice. Some examples further include sending, in step (l), the third conversational summary expressed in conversational form to each of the members of a third different sub-group expressed in first person as if the third conversational summary were coming from an additional member (simulated) of the third different sub-group of the population of human participants, including sending the second conversational summary in a second video segment comprising a graphical character representation expressing the second conversational summary through movement and voice.

Some examples of the methods, apparatuses, non-transitory computer readable medium, and systems described herein further include sending, in step (j), the first conversational summary expressed in conversational form to each of the members of a first additional different sub-group. Some examples further include sending, in step (k), the second conversational summary expressed in conversational form to each of the members of a second additional different sub-group. Some examples further include sending, in step (l), the third conversational summary expressed in conversational form to each of the members of a third additional different sub-group.

Some examples of the methods, apparatuses, non-transitory computer readable medium, and systems described herein further include processing, in step (g), the first conversational dialogue at the collaboration server using a large language model to express a first conversational summary in conversational form, wherein the first conversational summary includes a first graphical representation of a first artificial agent. Some examples further include processing, in step (h), the second conversational dialogue at the collaboration server using the large language model to express a second conversational summary in conversational form, wherein the second conversational summary includes a second graphical representation of a second artificial agent. Some examples further include processing, in step (i), the third conversational dialogue at the collaboration server using the large language model to express a third conversational summary in conversational form, wherein the third conversational summary includes a third graphical representation of a third artificial agent.

Collective Superintelligence

One or more embodiments of the present disclosure provide systems and methods based on which a large population of users can hold a single unified conversation via a communication structure that divides the population into a plurality of small subgroups. The subgroups overlap based on assignment of an artificial agent (i.e., an AI agent) to each subgroup that expresses as natural first-person dialog.

In some cases, a conversational introduction can be used to enable subgroups to easily integrate the comments/insights expressed by the Surrogate within its group. For example, the Surrogate Agent within a room (i.e., chatroom or video conference room) can initially be introduced in the first person, telling the participants the name and function. In some examples, the surrogate agent may be introduced as "Hi my name is Sparky and I'm the Conversational AI assigned to this room. There are currently 24 other rooms like this one. My job is to receive insights from those other rooms as they deliberate and tell you about them so you can consider their views during your deliberations. My job is also to pass your insights to other rooms so they can consider your views during their deliberations. This will make all of us smarter together."

Additionally, the AI agents are Conversational Surrogate Agents (CSai) that are based on LLM and repeatedly observe the conservation of the associated subgroup, extract insights, assess numerical measure(s), store the observed insights and associated numerical measures and associated user, aggregate the numerical measures across unique insights, pass insights to other Surrogate Agents of other subgroups, receive insights of other subgroups from other Conversational Surrogates, express insights of other subgroups to the associated subgroup, and insights to the associated subgroup received from the Observer Agent. In some cases, the CSai may be configured to pass insights to Global Agent and receive insights from a Global Observer Agent.

According to one or more embodiments, the said insight may be passed as language, said insights may be passed along with said aggregated numerical measures of CONFIDENCE and/or CONVICTION and/or SCOPE. According to one or more embodiments, the said insights may include textual language representing the insights and numerical measures of the subgroup's CONVICTION and/or CONFIDENCE and/or SCOPE in said insights. The CSai expresses insights to the associated subgroup received from the Global Agent (in first person language).

Figure 19:
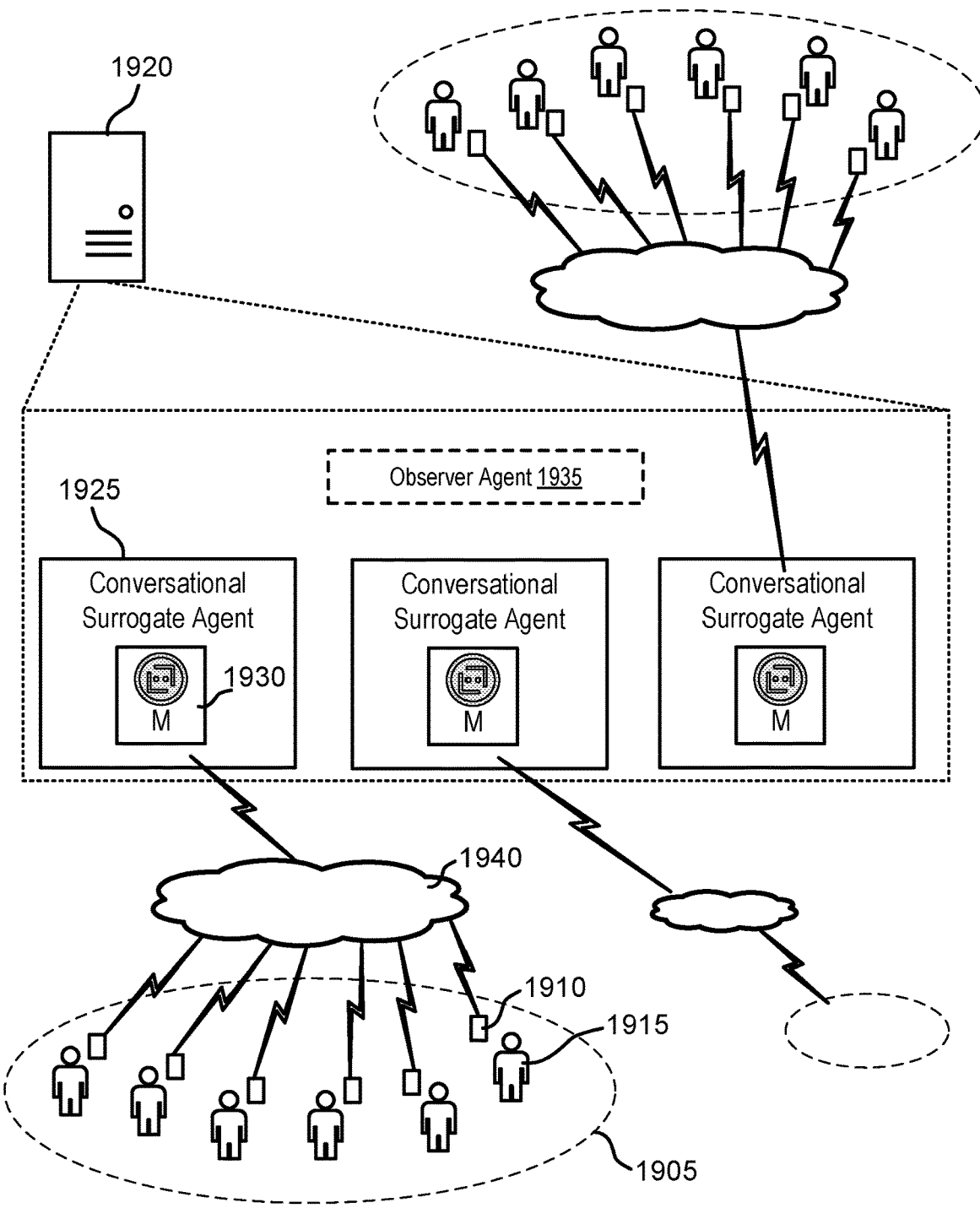
FIG. 19 shows an example of a system for real-time communication, conversation analysis, and insight extraction according to aspects of the present disclosure.

FIG. 19 shows an example of a system 1900 for real-time communication, conversation analysis, and insight extraction according to aspects of the present disclosure. In one aspect, system 1900 includes subgroups 1905 and central server 1920, where each subgroup 1905 includes computing devices 1910 (and corresponding participants or users 1915).

In one aspect, central server 1920 includes (e.g., or implements) one or more conversational surrogate agents 1925 and observer agents 1935. A conversational surrogate agent 1925 is an example of, or includes aspects of, the corresponding element described with reference to FIGS. 2, 5, 6, 8, 9, 11, and 20-24. In one aspect, conversational surrogate agent 1925 includes LLM-powered module 1930. Observer agent 1935 is an example of, or includes aspects of, the corresponding element described with reference to FIGS. 5, and 22-24.

In some embodiments the functions of the surrogate agent 1925 and the observer agent 1935 are combined into a single agent. In such embodiments, the single combined agent may be configured to observe conversational dialog within a first sub-group and send content (such as observed conversational insights) to the collaboration server or to other sub-groups, receive content (such as conversational insights) from one or more other sub-groups or from the collaboration server, and express received content conversationally to members of the first sub-group.

Subgroup 1905 is an example of, or includes aspects of, the corresponding element described with reference to FIGS. 3-6, 8, 9, and 20-24. Computing device 1910 is an example of, or includes aspects of, the corresponding element described with reference to FIG. 5. User 1915 is an example of, or includes aspects of, the corresponding element described with reference to FIGS. 1, 2, 4-6, 8, 9, and 20-24. Central server 1920 is an example of, or includes aspects of, the corresponding element described with reference to FIGS. 10 and 11.

One or more aspects of the systems and apparatuses described herein may include a plurality of networked computing devices 1910 associated with members of a population of participants (users 1915), and networked via and a central server 1920 in a computer network 1920 in communication with the plurality of networked computing devices 1910, the central server 1920 dividing the population into a plurality of subgroups 1905 and enabling a conversational surrogate agent 1925 (CSai) associated with each subgroup 1905, each conversational surrogate agent 1925 comprising an LLM-powered module 1930 that is assigned to a unique subgroup 1905 of the population of participants and tasked with repeatedly performing the assigned functions in real-time.

According to some aspects, each conversational surrogate agent 1925 observes, via the computer network 1940, a conversation among members of its assigned subgroup 1905, distils and stores content of the conversation, extracts insights from the conversation at intervals, assessing a numerical measure of conviction, confidence or scope associated with each unique insight within the conversation among the members of the assigned subgroup 1905, stores the insights and associated numerical measures and associated members in a memory by passing data to one or more other computational processes accessible to the central server 1920, aggregates the associated numerical measures across unique insights expressed within the assigned subgroup 1905, passes insights to other conversational surrogate agents 1925 assigned to other subgroups 1905, the insights being passed as language, each insight being passed along with the associated numerical measures having been aggregated, receives insights from the other conversational surrogate agents 1925 assigned to other subgroups 1905, each insight includes textual language representing the insight and aggregated numerical measures associated with the other subgroups 1905, and conversationally expresses received insights to the assigned subgroup 1905, the expressing includes modulating a strength of the textual language based at least in part on the received aggregated numerical measures.

Some examples of the apparatuses, systems, and methods described herein further include the central server 1920 identifying, for each of the plurality of subgroups 1905, a connection set comprising a set of other subgroups 1905 that the assigned subgroup 1905 can exchange insights with via transmission of insights, and wherein the conversational surrogate agent 1925 performs the following additional step in real time, comprising: determining at a moment in time which insight to transmit from the assigned subgroup 1905 and which other subgroup 1905 or subgroups 1905 within the connection set will receive the insight by considering which of the other subgroups 1905 of the connection set are currently in a ready to receive state at the moment in time, wherein the determining which insight to transmit comprises determining which insight has the highest support within the assigned subgroup 1905.

In some aspects, the determining which other subgroup(s) 1905 within the connection set will receive the insight further includes considering which of the other subgroups 1905 within the connection set have not yet considered the insight. In some embodiments support is computed as a measure of aggregated sentiment in favor or against the insight across members of the assigned subgroup. In some such embodiments, it is computed by aggregating at least one or more assessed values such as the confidence, conviction, or scope associated with conversational comments made by a plurality of members of the assigned sub-group related to that insight.

Some examples of the apparatuses, systems, and methods described herein further include the central server 1920 identifying for each of the plurality of subgroups 1905 a connection set comprising a set of other subgroups that the assigned subgroup 1905 can share or exchange insights with via transmission of insights, wherein the conversational surrogate agent 1925 periodically performs the following additional step on a prescribed period in real time, comprising: determining at a moment in time which insight to transmit from the assigned subgroup 1905 and which other subgroup 1905 or subgroups 1905 within the connection set will receive the insight by considering which of the other subgroups 1905 of the connection set are currently in a ready to receive state at the moment in time, wherein the determining which insight to transmit comprises determining which insight has the highest support within the assigned subgroup 1905, and wherein the prescribed period varies as a function of how high support is for the insight within the assigned subgroup 1905.

In some aspects, the determining which other subgroup 1905 or subgroups 1905 within the connection set will receive the insight further includes considering which of the other subgroups 1905 within the connection set have not yet considered the insight. In some aspects, the prescribed period shortens as a level of support increases for the insight within the assigned subgroup 1905.

In some aspects, the conversational surrogate agent 1925 periodically performs the following additional step on a prescribed period in real time, comprising: determining at the moment in time whether to set a ready to send state as a function of whether the insight determined to transmit from the assigned subgroup 1905 is a minority opinion amongst insights for each of the plurality of subgroups 1905.

In some aspects, the assigned subgroup 1905 will not send the determined insight to the determined subgroup 1905 or subgroups 1905 unless the ready to send state is set. In some aspects, the conversational surrogate agent 1925 periodically performs the following additional step on a prescribed period in real time, comprising: determining at the moment in time whether to set a ready to send state as a function of an amount of time since the ready to send state was set.

In some aspects, the conversational surrogate agent 1925 periodically performs the following additional step on a prescribed period in real time, comprising: determining at the moment in time whether to set a ready to send state as a function of an amount of conversational content that has been generated among members of the assigned subgroup 1905 since the ready to send state was set.

In some aspects, the conversational surrogate agent 1925 periodically performs the following additional step on a prescribed period in real time, comprising: determining at the moment in time whether to set a ready to send state as a function of whether the insight determined to transmit from the assigned subgroup 1905 has a confidence, conviction, and/or scope exceeding a prescribed threshold value.

In some aspects, the determining which insight to transmit comprises determining a set of insights that have the highest support within the assigned subgroup 1905, and randomly selecting one of the insights from the set of insights.

Some examples of the apparatuses, systems, and methods described herein further include the central server 1920 identifying for each of the plurality of subgroups 1905 a connection set comprising a set of other subgroups 1905 that the assigned subgroup 1905 can share or exchange insights with via transmission of insights, wherein the conversational surrogate agent 1925 performs the following additional steps in real time, comprising: determining at a moment in time which insight to transmit from the assigned subgroup 1905 and to which other subgroups 1905 within the connection set will receive the insight by considering which of the other subgroups 1905 of the connection set are currently in a ready to receive state at the moment in time; and selecting via a mechanism one or more the other subgroups 1905 of the connection set that are in the ready to receive state to receive the insight.

In some aspects, the mechanism comprises prioritizing for receiving the insight the one or more the other subgroups 1905 that have not yet discussed the insight. In some aspects, the mechanism comprises prioritizing for receiving the insight the one or more the other subgroups 1905 that have a lowest level of support for the insight.

In some aspects, the mechanism comprises prioritizing for receiving the insight the one or more the other subgroups 1905 that have not yet discussed the insight and in the event that there are none of the other subgroups 1905 that have not yet discussed the insights, prioritizing for receiving the insight the one or more the other subgroups 1905 that have a lowest level of support for the insight.

In some aspects, the mechanism comprises prioritizing for receiving the insight the one or more the other subgroups 1905 as a function of random selection. In some aspects, the mechanism comprises prioritizing for receiving the insight the one or more the other subgroups 1905 as a function of random selection amongst the one or more the other subgroups 1905 that have a lowest level of support for the insight.

In some aspects, the mechanism comprises prioritizing for receiving the insight the one or more the other subgroups 1905 as a function of random selection amongst the one or more the other subgroups 1905 that have a lowest level of support for the insight. In some aspects, the mechanism comprises prioritizing for receiving the insight the one or more the other subgroups 1905 as a function of random selection amongst the one or more the other subgroups 1905 that have a particular range of support levels for the insight.

Some examples of the apparatuses, systems, and methods described herein further include the central server 1920 identifying for each of the plurality of subgroups 1905, a connection set comprising a set of other subgroups 1905 that the assigned subgroup 1905 can share or exchange insights with via transmission of insights, wherein the conversational surrogate agent 1925 receives feedback on insights passed to other conversational surrogate agents 1925 assigned to the other subgroups 1905 in real-time.

In some embodiments, the feedback conversationally reflects the degree to which the shared insight was accepted or rejected by the members of the receiving sub-group. In embodiments the feedback includes a numerical measure that quantifies the degree to which the shared insight was accepted or rejected by the members of the receiving sub-group. In some embodiments the numerical measure is an indication of support computed based on aggregated sentiments in favor or against the insight across members of the assigned subgroup. In some such embodiments, the measure of support is computed by aggregating at least one or more values such as the confidence, conviction, scope or associated with conversational comments made by members of the receiving sub-group in response to the received insight.

In some aspects, the numerical measure of conviction, confidence or scope is calculated based on a sentiment data structure of each individual in the population of participants. In some aspects, the numerical measure of conviction is calculated as a fraction of positive sentiment directed towards each insight that has been conversationally deliberated within the assigned subgroup 1905 during a period of time.

In some aspects, the positive sentiment of an individual in an insight represents a degree to which that individual believes that insight is a good answer to a question or issue being deliberated. In some aspects, the positive sentiment is calculated and stored in real-time for each individual in the population of participants.

Some examples of the apparatuses, systems, and methods described herein further include a natural language processing apparatus used to transform a batch of an individual's dialog into an estimation of a degree to which the individual supports or rejects each insight. In some aspects, the positive sentiment is calculated on a zero-centered scale, wherein a center of the scale is equivalent to not having mentioned that insight or not having expressed an opinion about the insight that leans positive or negative. Furthermore, the zero-centered scale is such that a positive value on the scale indicates increasing positive support for the insight while an increasingly negative value on the scale indicates increasing rejection of the insight.

In some aspects, a new sentiment data structure is applied to an individual's existing sentiment data structure using heuristics, comprising a combination of the following rules:

(i) if the insight already exists in the existing sentiment data structure and exists in the new sentiment data structure, apply smoothing by taking a weighted average of a new sentiment value of the insight and an existing sentiment value of the insight, (ii) if the insight does not already exist in the existing sentiment data structure and exists in the new sentiment data structure, increase the existing sentiment value by some fraction of the new sentiment value, and (iii) if the insight already exists in the existing sentiment data structure and does not exist in the new sentiment data structure, apply some decay to the existing sentiment value.

In some aspects, the numerical measure of scope is calculated as a fraction of users 1915 who have mentioned or referenced the insight at least once, as identified by a natural language processing tool or a sentiment data structure. In some aspects, the numerical measure of conviction, confidence or scope is calculated at an individual level, averaged for each subgroups 1905 and reported as that subgroup 1905's conviction, confidence or scope for each insight, or averaged over the population of participants and reported as a global conviction, confidence or scope for each insight.

In some aspects, assessing the numerical measure of conviction, confidence or scope associated with each unique insight within the conversation among the members of the assigned subgroup 1905 further comprises: assessing a numerical measure of exposure associated with each unique insight within the conversation among the members of the assigned subgroup 1905, wherein the numerical measure of exposure is calculated as a fraction of users 1915 that an idea, answer, reason or insight has been conversationally presented to, as identified by a natural language processing tool or a sentiment data structure.

According to an embodiment, when Surrogates (e.g., conversational surrogate agents 1925) pass insight to other Surrogates (or to an Observer Agent 1935), observed Conviction or Confidence within the subgroup 1905 is passed as a parameter associated with answers and/or reasons. Additionally, a measure of SCOPE within the subgroup (i.e., the number or percentage of participants within that subgroup 1905 who have expressed a sentiment in favor or against the insight) is passed as a parameter. Accordingly, the receiving agent knows the amount of conviction and/or confidence the group has in a particular answer and/or reason.

Accordingly, in some cases, when a Surrogate 1925 receives insights from other Surrogates 1925 (or Observer Agent 1935), the surrogate 1925 uses the received numerical measures of Confidence, Conviction, and/or Scope to modulate the strength of the language when expressing the insights in the associated local room. In some examples, a low conviction may be expressed as "Group 3 supports DeSantis by a small margin, but it is generally torn as it is also considering other options" while a high conviction may be expressed as "Group 3 strongly supports DeSantis by a wide margin".

Numerical Assessment

One or more embodiments of the present invention are configured to accelerate information transfer among subgroups 1905 to support faster and more effective convergence on optimized solutions. In some cases, an AI agent (e.g., Conversational Surrogate Agents 1925, CSai) extracts insights and assesses numerical measure(s) based on the observed insights, stores the numerical measures, and aggregates the numerical measures across unique insights. For example, the conversational surrogate agents 1925 may observe the conversation among the members of its subgroup 1905, distill and store content. In some cases, a conversational surrogate agent 1925 may extract insights from the observed subgroup conversation at intervals. The insights may include, for example (but not limited thereto), identifying proposed solutions to a current question, and/or proposed reasons in support or opposition to one or more said solutions.

Further, a conversational surrogate agent 1925 assesses numerical measure(s) of "conviction" and/or "confidence" associated with each unique insight that is observed within the conversation among the user 1915 of the corresponding subgroup 1905. The numerical assessments are associated with each solution and/or reason that is expressed by users 1915 of the subgroup 1905. Additionally, the numerical measures are associated with the user 1915 who expressed the insight (i.e., solution and/or reason). In some cases, the conversational surrogate agent 1925 stores the observed insights and associated numerical measures and associated users in a memory (database) by passing the data to one or more other computational processes.

According to an embodiment, the sentiment value of a user 1915 in an "answer choice" (i.e., in an idea or solution or other insight that a user is supporting or opposing in a conversational comment) represents the degree to which the user 1915 believes the answer choice is a good answer to the question or issue being deliberated. The sentiment is calculated and stored in real-time for each user 1915 in the full population of users 1915.

A user's sentiment in each answer choice may be computed based on a natural language processing system such as a large language model that is used to transform a batch of the user's dialog (i.e., language via entered text, or generated via voice to text) in-context (i.e., including another user's dialog messages that appear in the same time frame for context) into an estimation of the degree to which the user supports each answer choice. In some embodiments, a zero-centered scale is used, such as from −3 (strong negative support) to +3 (strong positive support), such that the center of the scale (no preference) is equivalent to not having mentioned the answer choice (or having expressed no preference for the answer choice).

In some cases, the sentiment assessment may be stored directly in the sentiment data structure associated with that user. For example, the storage may include overwriting the previous sentiment assessment with the new one. In some embodiments, the new measurement may be incorporated such that noise and the limited context window used over time is considered. In an embodiment, the sentiment of each user 1915 in a group is evaluated frequently in small batches of up to 10 messages at a time, and then a new sentiment data structure is calculated for each user in the group using a natural language processing system. The new sentiment data structure may be applied to the user's existing sentiment data structure using heuristics.

In an embodiment, the heuristics apply a combination of rules. For example, the rules may include (but not limited thereto) applying smoothing by taking a weighted average of the new answer's sentiment and the existing answer's sentiment in case the answer already exists in the user's existing sentiment data structure, and/or increasing the existing sentiment value by some fraction of the new sentiment value in case the answer does not exist, and/or applying a decay to the existing sentiment value in case a previous answer is not mentioned.

In some cases, sentiment may be calculated at the user level, and averaged over the users in a subgroup 1905 and reported as the subgroup sentiment or averaged over users 1915 in a group (i.e., subgroup 1905 or chatroom) and reported as the average global sentiment. Accordingly, the mean subgroup sentiment for each insight that is surfaced (i.e., each answer surfaced, solution surfaced, and or justification or opposition for an answer or solution) can be updated in real-time or close to real-time. Similarly, the mean n sentiment for each insight that surfaces conversationally (i.e., each answer surfaced, solution surfaced, and or justification or opposition for an answer or solution) may be updated in real-time (or close to real-time).

Conviction refers to the fraction of positive sentiment directed towards each insight that is conversationally deliberated (i.e., each surfaced answer or solution or idea, and/or each surfaced justification in support or opposition of an answer or solution). Conviction may be calculated at the user level, based on the sentiment data structure. In some cases, in case someone had a +2 sentiment for Answer A, +1 sentiment for Answer B, and –2 sentiment for Answer C, the convictions may be the percentage of the overall sentiment (across the answers) that is directed at a particular answer: {Answer A: 67%, Answer B: 33%, Answer C: 0%}. A similar process may be used for justifications in support or opposition to an answer (i.e., the conviction in a justification for an answer is the percentage of overall sentiment (across justifications for the answer) that is directed at a particular justification.

In some cases, negative sentiment may be treated as 0 for the calculation of conviction since a user who opposes an idea has no conviction in the answer, and is not deemed to have negative conviction. Thus, conviction is a scale from 0 to 100% and indicates the fraction of positive support for an answer choice (or answer justification), and may not be modified by critics of an idea (i.e., people with negative sentiment for an idea). In some cases, conviction may be averaged over subgroups and reported as the subgroup conviction for each answer choice or averaged over the entire population and reported as the global conviction for each answer choice. In case of structures in which subgroups have different levels (i.e., subgroups of subgroups), conviction is computed for each level and the values are then used in heuristics associated with the level of the structure.

The exposure of an idea is calculated as the fraction of users that an idea has been presented to, as identified by a Natural Language processing tool or the sentiment data structure. For example, in a HyperChat with 10 subgroups of 5 users each, in case two groups mention Answer A, the exposure of the idea is approximately 20%, since only 20% of users are exposed to the idea in their subgroups. In case a message is passed that provides Answer A to a subgroup that had not mentioned the idea previously, the exposure is 30%, since 3 out of 10 subgroups may have seen the idea.

In some cases, exposure is calculated from the sentiment data structure and Conversational Surrogate message log based on tallying each chatroom in which a Conversational Surrogate has mentioned the idea or in which a user has directly mentioned the idea as tracked by the sentiment data structure. In other embodiments, a natural language processing tool examines the chat log of each chatroom directly to evaluate whether the idea has been mentioned. Accordingly, the number of users who may reasonably consider the idea are quantified.

The scope of an insight, also referred to as the engagement with the insight, is calculated as the fraction of users who mention or reference the insight (i.e., the answer or solution or idea) at least once, as identified by a Natural Language processing tool or the Sentiment data structure. Therefore, the degree to which an idea is being discussed by the group may be quantified. For example, in case 80% of the subgroup is exposed to an idea, and only 40% of the group has mentioned the idea, the idea may not include sufficient engagement within the subgroups (e.g., the idea may not get sufficient/desired traction within the subgroups).

In some embodiments, scope is calculated from the sentiment data structure by tallying the chatrooms in which a user has directly mentioned the idea as tracked by the Sentiment data structure. In some embodiments, a natural language processing tool examines the chat log of each chatroom directly to evaluate whether the idea has been mentioned and identify the user mentioning the idea.

According to one or more embodiments, the CSai aggregates the described numerical measures across unique insights expressed within the subgroup. For example, the conviction expressed and/or confidence is aggregated by computing over time the quantity and/or percentage of messages and/or unique users that expressed confidence and/or conviction in that particular insight. In some instances, the aggregation is scaled by the strength of the assessed confidence or conviction in each observation. In some embodiments, time is used as a factor, with a decay function in conviction and/or confidence as observed insights age versus newer insights observed from users. In some embodiments, the aggregated numerical measures include an indication of scope which is a percentage (or number) of users within the subgroup that have expressed support and/or have expressed opposition to a particular insight. Thus, a particular insight (i.e. the Yankees will win the world series) may be computed that may be associated with a confidence measure of +1.9 on a scale of –3 to +3. For example, the aggregation may be computed based on three users within a five-member subgroup expressed sentiments related to the Yankees. In the example, the SCOPE of the confidence measure is $\frac{3}{5}$ or 60%.

Accordingly, the conversational surrogate agent 1925 passes insights to other conversational surrogate agents 1925 associated with other subgroups 1905, said insight is passed as language, said insights is passed along with said aggregated numerical measures of confidence and/or conviction and/or scope. The strength of the first-person language (i.e. phrasing, emphasis, emotion) is modulated based at least in part upon on strength of received numerical measures (in relation to other insights received during the conversation). Facilitating Subgroup Communication An embodiment of the present disclosure includes an architecture (e.g., a CSI architecture) configured to enable bidirectional flow of content into and out of subgroups 1905 at certain intervals based on elapsed time, elapsed conversational flow within subgroups, reaching threshold conviction, confidence, or scope levels within subgroups, and other measures.

For instance, in some embodiments, intelligent heuristics are used to pass insights from a first subgroup A to a second subgroup B among a large number of subgroups (for example, A through X) based on subgroup A having discussed with strong conviction and/or confidence in an insight (i.e., a solution or reason) that has not yet been surfaced (or been discussed to a threshold level) in subgroup B. The heuristic ensures that information propagates efficiently, giving preferential passage of insights surfaced in 'first groups' that have not yet been deliberated upon in 'second groups' at a meaningful level.

In some embodiments, a frequent and/or efficient information flow is performed to facilitate fast and/or smart population-wide deliberations. A form of valuable and accelerating bidirectional communication is enabling one subgroup to provide a response and/or feedback to insights that are obtained from a surrogate in another subgroup, the response selectively being passed to the originating subgroup.

In some aspects, the usage of the term "bidirectional" may imply that two groups (e.g., two subgroups 1905, two conversational surrogate agents 1925, etc.) may trade insights in either direction. However, in any of the described embodiments, insights (or any other communications or information sharing) may be relayed instead of, or in addition to, bidirectionally traded. For instance, a subgroup A may trade insights with B, B may trade insights with C, and C may trade insights with A. In many preferred embodiments, subgroups share insights with other subgroups without exchanging bidirectionally at any moment in time. For example, subgroup A may share an insight with subgroup B, while subgroup B may share an insight with subgroup C, and subgroup C may share an insight with subgroup A.

In some cases, a fast solution may be to enable participants within a subgroup 1905 to provide simple expressions of appreciation and/or support for an insight from another subgroup 1905 that is expressed in the subgroup 1905. For example, if a text, voice, or video insight from another subgroup 1905 is passed into a subgroup 1905, the insight may be a text and/or audio for the members of the subgroup 1905. In response, members may learn that a simple text response such as "Good Insight" will trigger the surrogate in the room to document and tally a favorable response. Additionally or alternatively, in some cases, a single such response may not be enough to trigger feedback to the originating room. In some cases, a threshold metric can be used. According to an example, the threshold is a majority such that if a majority of participants within a subgroup respond to the injected insight with "Good Insight" or another similar phrase, the Conversational Surrogate in the chatroom can be configured to send a response message to the Surrogate that passed the insight, informing the surrogate that the insight was "well received" or "appreciated" by a majority of members of the subgroup.

An exemplary embodiment of the present disclosure considers a conversational swarm of 100 people broken into 20 subgroups of 5 people. For example, the number the subgroups may be referred to as SG1, SG2, . . . SG20 and each of the 20 subgroups are conversationally deliberating possible solution to Water Scarcity in Arizona. In some examples, five people holding a deliberative real-time conversation in SG15 are collectively in favor of "investing in hydro-panels that harvest water from the air." In some cases, the conversation surrogate of the group may pass the insight into another subgroup (e.g., SG12) along with numerical indications of conviction, confidence, and/or scope of support within the subgroup.

The Conversation Surrogate in SG12 expresses the insight to the members of SG12 as first-person dialog integrated into the conversational flow. In some examples, the numerical support within SG15 is very high, the Surrogate Agent is SG12 expresses the insight using strong language such as "Hello everyone, group 15 is in very strong favor of hydro-panels that extract water from the air. The primary reasons they've expressed is that it's cost effective compared to desalinization and low maintenance."

For example, if a majority (at least 3 of 5) members of subgroup SG12 respond conversationally to the comment with "Good Insight", "Useful Insight", or a similar phrase, the Conversational Surrogate can be configured to send a message to the surrogate for SG15, indicating that members of SG12 think that was a useful insight. The message reported may indicate the strength of support, for example, indicating that 60% (or ⅗) of SG15 members found the insight useful. The strength of the first-person language fed back to SG15 (i.e., phrasing, emphasis, or emotion) can be modulated in part based on the strength of received numerical measures.

According to an embodiment, a shortcut can be implemented for enabling members of a subgroup to provide feedback to an insight passed in from another subgroup. In some cases, a graphical icon such as a "CLAP" symbol may be used. In some cases, the members of SG15 may click the CLAP icon in response to the insight being displayed visually or audibly within the local conversation. In case a majority of the users clap, a response message is triggered, e.g., a textual response such as "Good Insight" triggers. According to some embodiments, textual responses and clap icon clicks can be aggregated, giving users multiple alternate options for expressing support. According to some embodiments, users may only clap (or verbally support) a particular insight once. In some cases, the users may clap (or verbally support) multiple times. Accordingly, in some aspects, a quantifiable method and a clear threshold trigger is achieved.

The strength of the first-person language fed back to SG15 (i.e., phrasing, emphasis, or emotion) may be modulated in part based on the strength of the received numerical measures (e.g., in relation to other insights received during the conversation). For example, a user in a chatroom may be able to clap for a received insight. In some cases, if a majority of users in a room clap for a received insight, that gets reported back to the other room. "A majority in Room 3 liked your justification of Answer C."

Conversational feedback pathway encourages members to more thoughtfully consider the insights from other subgroups. Moreover, participants are encouraged to come up with good insights in the respective subgroups that get passed to other subgroups and receive positive feedback. Additionally, the participants provide for a new channel of messaging which increases the frequency of messages passing between subgroups. The conversational feedback pathway provides analytical algorithms within the Central Server more information to discern levels of support for ideas and/or reasons being discussed across the population.

Figure 20:
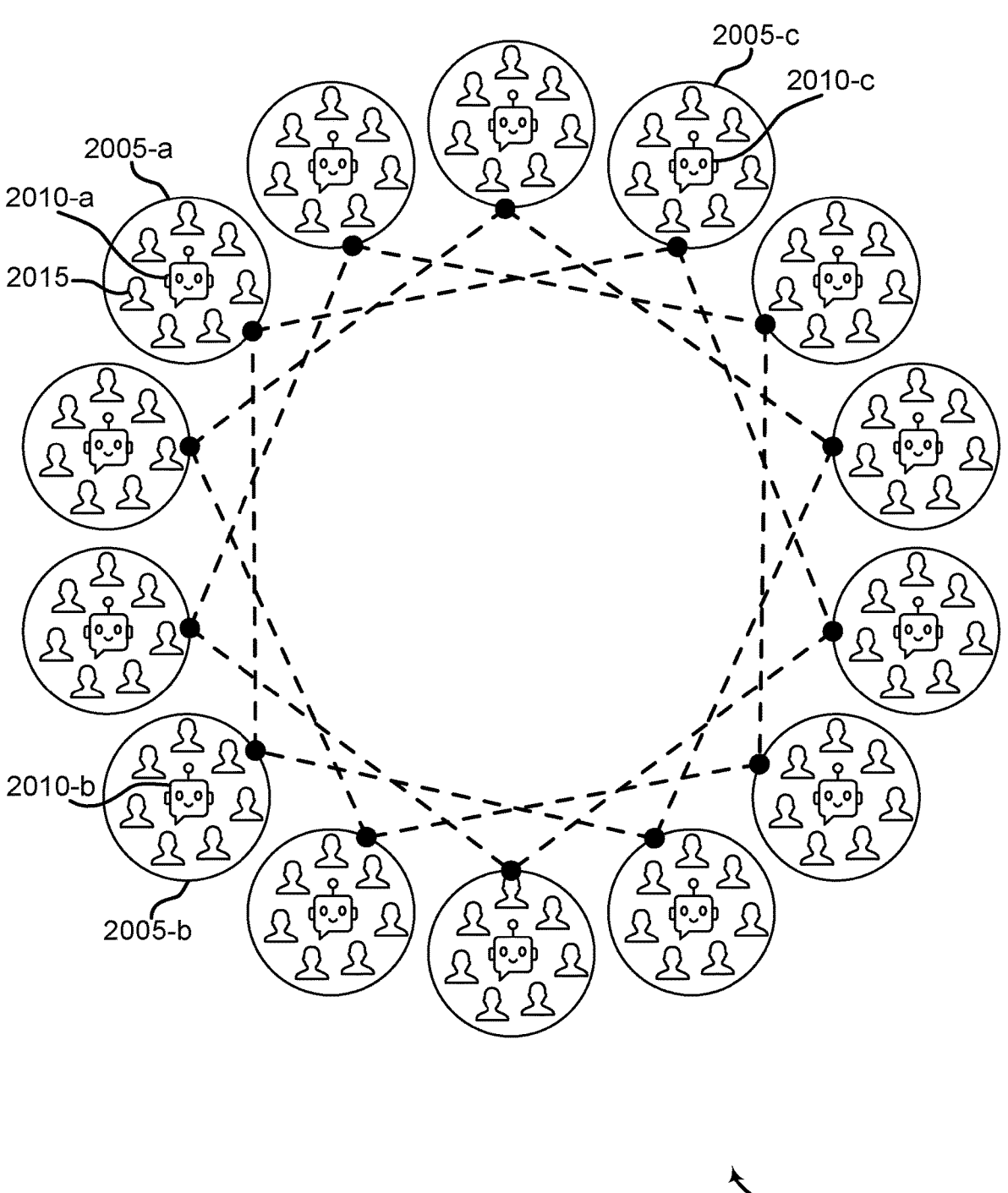
FIGS. 20 through 24 show examples of a network architecture according to aspects of the present disclosure.

FIG. 20 shows an example of a network architecture 2000 according to aspects of the present disclosure. Network architecture 2000 is an example of, or includes aspects corresponding element described with reference to FIGS. 21-24. In one aspect, network architecture 2000 includes subgroups 2005. In one aspect, each subgroup 2005 includes a conversational surrogate agent 2010 and one or more users 2015.

For instance, a population of real-time networked users (e.g., users 2015) can be configured into a unique architecture where the entire population is divided into a set of small subgroups 2005, such as sub-groups 2005-*a*, 2005-*b*, 2005-*c*, etc., sized for thoughtful conversational deliberation. For example, FIG. 20 shows a large group of 84 users that can be divided into 14 subgroups (such as subgroup 2005) of 6 users (such as users 2015) each.

Each subgroup 2005 (e.g., sub-groups 2005-*a*, 2005-*b*, 2005-*c*, etc.) is provided with a conversational surrogate agent 2010 (e.g., conversational surrogate agents 2010-*a*, 2010-*b*, 2010-*c*, etc.) that can pass and receive insights from one or more other subgroups 2005. In some examples, each conversational surrogate agent 2010 can exchange insights with conversational surrogate agents 2010 in two other subgroups 2005. For example, referring to FIG. 20, conversational surrogate agent 2010-*a* may exchange insights of subgroup 2005-*a* with two other subgroups (i.e., subgroup 2005-*b*, via conversational surrogate agent 2010-*b*, and subgroup 2005-*c*, via conversational surrogate agent 2010-*c*, as indicated by the dotted lines).

Subgroup 2005 is an example of, or includes aspects of, the corresponding element described with reference to FIGS. 3-6, 8, 9, 19, and 21-24. Conversational surrogate agent 2010 is an example of, or includes aspects of, the corresponding element described with reference to FIGS. 2, 5, 6, 8, 9, 11, 19, and 21-24. User 2015 is an example of, or includes aspects of, the corresponding element described with reference to FIGS. 1, 2, 4-6, 8, 9, 19, and 21-24.

Figure 21:
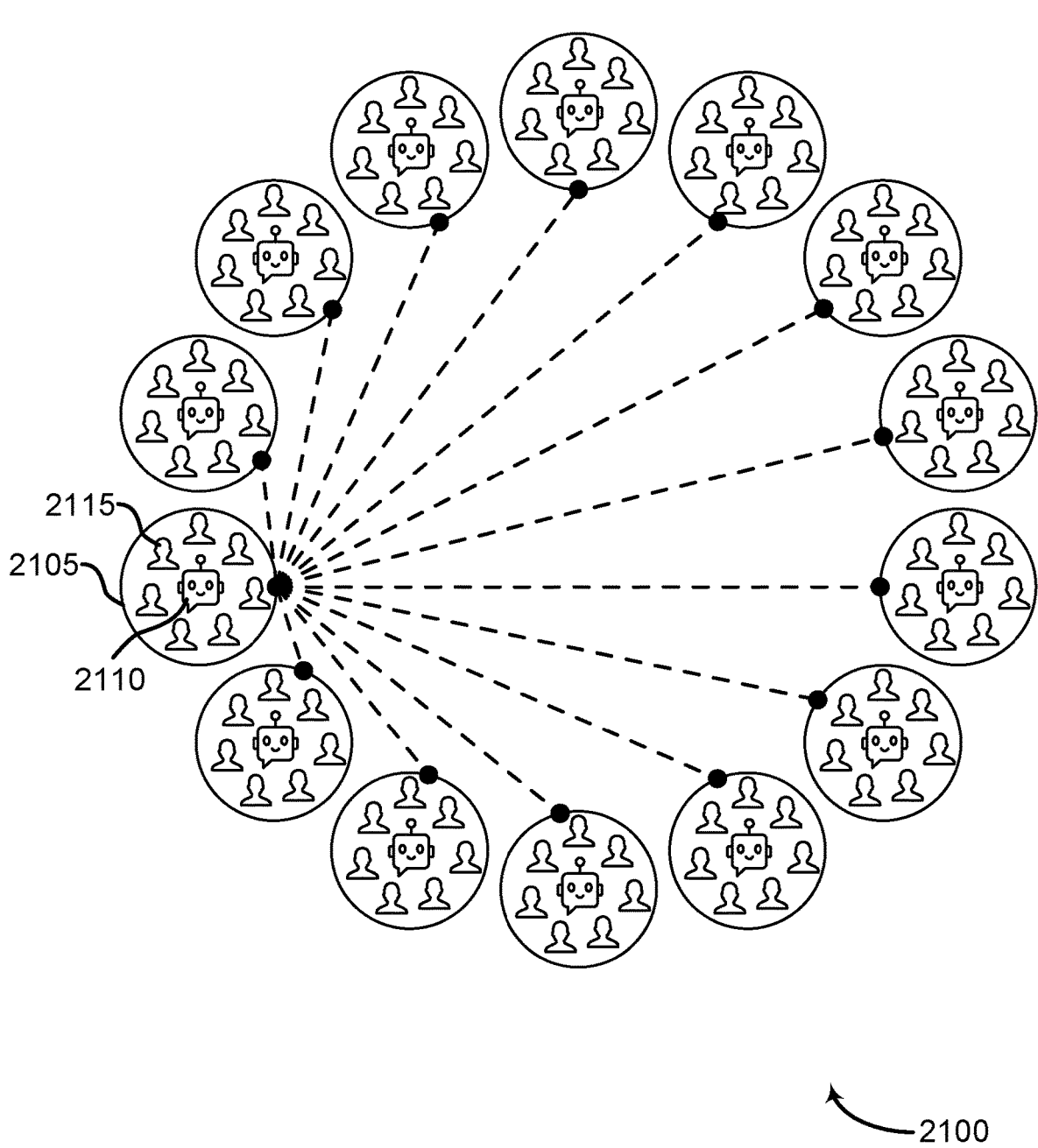

FIG. 21 shows an example of a network architecture 2100 according to aspects of the present disclosure. In one aspect, network architecture 2100 includes subgroups 2105. In one aspect, each subgroup 2105 includes a conversational surrogate agent 2110 and one or more users 2115.

According to an example, each conversational surrogate agent 2110 can communicate with any one of the other surrogate agents (e.g., any conversational surrogate agent 2110 in any of the other subgroups 2105). Accordingly, the structure represents the bi-directional connections between a single subgroup 2105 and every other subgroup 2105. In some cases, similar (or same) connections may be drawn for each of the other subgroups 2105. Referring to FIG. 21, only connections from one subgroup 2105 are shown for clarity.

Network architecture 2100 is an example of, or includes aspects of, the corresponding element described with reference to FIGS. 20, and 22-24. Subgroup 2105 is an example of, or includes aspects of, the corresponding element described with reference to FIGS. 3-6, 8, 9, 19, 20, and 22-24. Conversational surrogate agent 2110 is an example of, or includes aspects of, the corresponding element described with reference to FIGS. 2, 5, 6, 8, 9, 11, 19, 20, and 22-24. User 2115 is an example of, or includes aspects of, the corresponding element described with reference to FIGS. 1, 2, 4-6, 8, 9, 19, 20, and 22-24.

In case of a fully connected structure (such as that shown with reference to FIG. 21), message passing is based on (e.g., requires) an additional level of intelligence since passing insights from each subgroup 2105 to every other subgroup 2105 is a complex process. Accordingly, intelligent heuristics are used to organize message passing such that different aspects of conversational deliberation are facilitated.

In case of intelligent heuristics, each subgroup, such as subgroup 2105 (or chatroom) is assigned two flags (i.e., variables) that are associated with the Conversational Surrogate Agent, such as conversational surrogate agent 2110 for the room (CSai-n). In some cases, the flags may be a READY TO TRANSMIT flag and a READY TO RECEIVE flag.

READY TO TRANSMIT (RTT) may be a binary flag that is set to "0" when the CSai for the room is not ready to transmit insights to other rooms. In some cases, the CSai may not be ready to transmit insights if it transmitted insights (e.g., recently transmitted an insight) and is waiting for additional insights to be generated conversationally by the users of the subgroup. In some cases, the CSai may not be ready to transmit insights in case the session recently started and the conversation has not produced any meaningful insights in the subgroup. In some examples, a minimum transmission delay may not be expired. For example, the minimum transmission delay refers to a variable that is set to ensure that a subgroup does not transmit insights at a high frequency (i.e., at a frequency that exceeds a defined threshold) since a minimum conviction threshold has not been met. In some examples, the minimum conviction threshold refers to a variable that requires the conviction and/or confidence and/or scope among users of the subgroup with respect to a particular insight (i.e. a solution and/or reasons to support or dispute a solution) that exceeds a certain threshold.

According to an example, a subgroup may be discussing/ debating the team that will win the Super Bowl and the conviction may be very low because each of the six users favor a different solution. In some cases, when support for a particular solution gains conviction over time (as the users of the group deliberate) the solution may exceed the minimum conviction threshold and thus put the CSai into a state of ready to transmit. For example, other requirements are assumed to be met such as the minimum interval delay. In some cases, the minimum interval delay may not be a single value but a function of the conviction level supporting the top choice (e.g., most popular choice) being discussed in the subgroup and/or a function of the conversational content being exchanged among the participants in the subgroup. In some instances, a minimum conversational threshold is set which requires a minimum amount of conversational content (measured in terms of characters, words, messages, or informational content) that has been exchanged in the chatroom.

Accordingly, a conversational surrogate associated with a particular subgroup may have the READY TO TRANSMIT flag set to 0. The flag may transition to 1 when a sufficient amount of time has passed since it was set to 0 and/or a sufficient amount of conversational content has been exchanged among members of the subgroup since the flag was set to 0. In some examples, the flag may transition to 1 when at least one insight being discussed within the room has exceeded a threshold level of confidence, conviction, and/or scope as determined by the conversational content among group (e.g., users), members and/or when an integration over the amount of time, conversational content, and subgroup conviction exceeds a threshold value. However, embodiments are not limited thereto, and the flag may transition to 1 based on a combination of the described conditions.

READY TO RECEIVE (RTR) may be a binary flag that is set to "0" when the CSai for a chatroom is not ready to receive insights from other rooms. For example, the flag may be set to 0 because an insight may be recently received and the CSai is waiting for the members of the sub-group to consider and discuss the insight. In some cases, the session may have recently started and the subgroup may not have a chance to have sufficient internal discussion. In some cases, a minimum receive delay may not be expired, where the minimal receive delay refers to a variable that is set to ensure that a subgroup does not receive insights at a high frequency (i.e., at a frequency that exceeds a defined threshold). In some cases, a minimum conversational content threshold may not be met, where the minimum conversational content threshold refers to a minimum amount of content exchanged among the members of the subgroup since the last insight was received from outside the group. The minimum conversational content may be measured in characters, words, messages, or informational content that have been exchanged in the chatroom.

Accordingly, a conversational surrogate agent associated with a particular subgroup may have the READY TO RECEIVE flag set to 0. The flag may transition to 1 when a sufficient amount of time has passed since the flag has been set to 0 and/or a sufficient amount of conversational content has been exchanged among members of the subgroup since the flag has been set to 0.

In one or more embodiments of the present disclosure, each subgroup may be connected for bidirectional transmission of insights with a plurality of other subgroups. In some cases, a subgroup may be connected to a small number of neighbors which define a connection set that is available for possible insight exchange. In some cases, a subgroup can be connected to each of the other subgroups as potentials for information exchange. In some examples, the set of other subgroups that a single subgroup can exchange insights with is referred to as the connection set of the subgroup. In case of the fully connected models, the connection set for each of the subgroups is the other subgroups.

When a CSai associated with a subgroup transitions from 'NOT READY TO TRANSMIT' (i.e., RTT=0) to 'READY TO TRANSMIT' (i.e., RTT=1), a coordination process on the central server (such as central server 1920 as described with reference to FIG. 19) is triggered that identifies the insight being discussed within the particular subgroup that is the signal transmitted to another subgroup (or subgroups). Additionally, the coordination process identifies the other subgroup(s) that receives the signal that is transmitted. As used herein, the signal refers to a representation of the insight (i.e. a representation of an answer and/or reasons in support of an answer) along with optional numerical indicators that represent the strength of support for the insight within the subgroup (i.e., conviction, confidence, and/or scope measures associated with the insight within the subgroup).

In some cases, a simple heuristic may be defined to pick the insight (among a set of possible insights) that has the highest support within the subgroup (i.e. the highest confidence, and/or conviction and/or scope within that subgroup) to determine the insights that may be transmitted from the subgroup. In some cases, complex heuristics may use random selection among a set of the highest supported insights (e.g., insights with maximum support) in the chatroom. The complex heuristics is useful when subgroups discuss many insights during a short period of time, and when the subgroups have similar support levels. In some cases, random selection includes a memory so that the next time subgroup transitions to 'READY TO TRANSMIT', an alternate insight may be selected (i.e., not the insight that is previously selected).

In some cases, the heuristic may be defined to consider the CONNECTION SET of possible subgroups that can be a target, and then consider only the subgroups within the CONNECTION SET that are currently in the 'READY TO RECEIVE' state (i.e., RTR=1) to determine the subgroup (or subgroups) that will receive the transmitted insight. Accordingly, the system defines a 'READY TO RECEIVE CONNECTION SET' for the moment in time. In case the set has more than one subgroup, the heuristic is defined further with a mechanism to select one or more subgroups to receive the insight. According to one or more embodiments, one subgroup may be chosen from the 'READY TO RECEIVE CONNECTION SET'. According to one or more embodiments, a 'number of receivers' variable may be defined. For example, when the 'number of receivers' variable is set to 3, the heuristic may pick three subgroups from the READY TO RECEIVE CONNECTION SET (e.g., when larger than three subgroups exist).

A current heuristic is used that compares the insight that is ready to be sent, with the insights being discussed in each of the subgroups within the READY TO RECEIVE CON- NECTION SET to identify subgroup(s) that are chosen from the READY TO RECEIVE CONNECTION SET. For example, a top priority for the heuristic is to select a subgroup(s) (in case allowed) that have not discussed the insight in question. In some examples, subgroups with 0 conviction, confidence, and/or scope for an insight. In case no such subgroups (or not enough subgroups) have 0 conviction, confidence, and/or scope for the insight (i.e., each subgroup may have discussed the insight at some level), then the heuristic selects the subgroup(s) with the lowest level of support for the INSIGHT which may include groups that have negative conviction or confidence (i.e., subgroups that may have considered and rejected the insight), which provides for the subgroup to potentially consider other arguments/reasons in favor of a previously rejected insight.

Accordingly, a subgroup that triggers to READY TO TRANSMIT may send the highest supported insight to one or more other subgroups that have not considered the insight and/or have considered the insight with the lowest current level of support (i.e., confidence, conviction, and/or scope). In some cases, the lowest support may be negative support.

In some cases, complex heuristics may use random selection among the READY TO RECEIVE CONNECTION SET, especially in case of multiple subgroups that have not discussed the insight in question and/or have similar support values. In some cases, selection includes a memory such that the next time the subgroup transitions to READY TO TRANSMIT, an alternate subgroup or subgroups may be selected as the recipient (i.e., subgroups different from previously selected subgroups).

In some cases, the conversational surrogate agent associated with each of the receiving subgroups transmits an insight (e.g., an insight that is selected and a subgroup or subgroups that is selected to receive that insight). Each of the Conversational Surrogate Agents may express the insight to the respective group as first person dialog which immediately enables the subgroups to transition from READY TO RECEIVE (RTR=1) back to (RTR=0) since the groups may be internally discussing insights for a period of time. In addition, the transmitting subgroup may transition from READY TO TRANSMIT (RTT=1) back to (RTT=0) until the threshold requirements are met.

The set of heuristics creates an organic flow of insights around the network structure. In addition, the system is preferably configured such that groups with higher level of support for the top insight among the users, transmit the insight at a higher frequency than subgroups that have low levels of support for the top insight. Accordingly, top ideas and/or answers and/or reasons that have strong conviction within subgroups are propagated more often than top ideas and/or answers and/or reasons in subgroups that are only mildly supported verses other ideas.

In an embodiment, the minimum transmission delay in a particular subgroup is modulated based on the strength of support for the strongest insight currently being discussed in the subgroup such that subgroups that have strong internal agreement for a particular insight may transmit more frequently to other subgroups than the strongest insight in subgroups where the insight may be heavily debated among a set of possible alternative insights.

In an embodiment, the READY TO TRANSMIT flag may be set dynamically using an integrate-and-fire model that amplifies insights that are minority opinions in the global group (i.e., that are assessed across the full population of individual participants). In some cases, the flag may transition to 1 based on an integral of the amount of time that has passed since the time was set to 0, and/or an integral of the amount of conversational content that may be exchanged among members of the subgroup since the flag is set to 0, and/or an integral of the confidence, conviction, and/or scope of the top insight being discussed having exceeded some threshold value within the chatroom as determined by the conversational content among users (or group members), and/or an integral of the degree to which the top insight is not the top insight found in most other chatrooms. In some cases, the top insights may be distributed globally (i.e., across the entire population of individual users) and "READY TO TRANSMIT" may be triggered (e.g., triggered faster) for groups supporting minority opinions. Accordingly, global minority positions may be amplified.

In addition, each subgroup may be configured with a means of responding to the insights that are received including by clapping or by arguing which provides feedback to the subgroup from which the insight originated. Thus, support for the insight is significantly impacted, potentially causing the insight to drop below the support of other insights (e.g., have low priority). The feedback loop enables complex interactions around the network of subgroups to emerge organically. In some examples, the emergent properties of the networked structure favor the elevation of the smartest and/or best supported insights which amplify the collective intelligence of the entire population.

A Scalable Collaborative System

The present disclosure describes systems and methods for enabling collective superintelligence. Embodiments include HyperChat and/or Conversational Swarm Intelligence that are configured to support different forms of large-scale language-based communication (i.e., vocalized communication or transmitted via Brain-Computer-Interfaces (BCI)). In some cases, language-based communication includes human-to-human communication through BCI which may enable conversations by thinking language instead of explicitly typing or uttering language.

One or more embodiments of the present disclosure include an architecture of subgroups that is scalable to multiple users. For example, the architecture described with reference to the present disclosure may be scalable to hundreds or thousands of users. In some cases, a recursive structure may be used in which small groups of users are organized into deliberative subgroups (i.e., each with a surrogate agent), and/or small sets of subgroups are organized into subsets (i.e., each subset includes a global agent), and/or small sets of subsets are organized into larger subsets, etc. to enable (e.g., massively) scalable populations.

Figure 22:
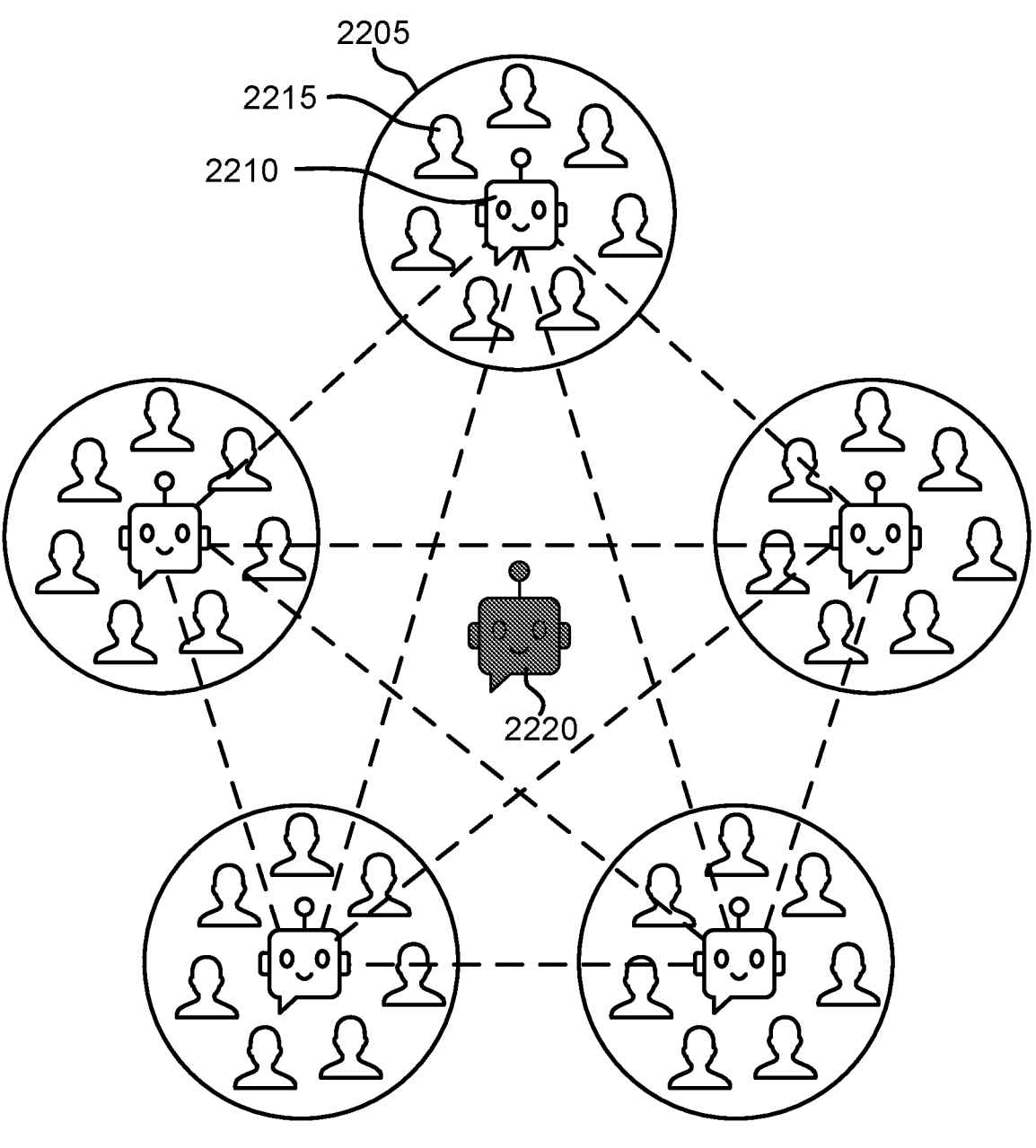

FIG. 22 shows an example of a network architecture 2200 according to aspects of the present disclosure. In one aspect, network architecture 2200 includes subgroups 2205 and observer agent 2220. In one aspect, each subgroup 2205 includes a conversational surrogate agent 2210 and one or more users 2215.

FIG. 22 shows an example network architecture 2200 according to aspects of the present disclosure. For instance, a network architecture 2200 shows a small population (e.g., 30) of users 2215 divided into 5 subgroups 2205, where each subgroup 2205 includes (e.g., is populated with) a conversational surrogate agent 2210 that can pass or receive messages from any of the other conversational surrogate agents 2210. Moreover, observer agent 2220 (e.g., at the center) may send and receive insights with any of the conversational surrogate agents 2210. In some aspects, FIG. 22 shows an example of one set of five subgroups 2205. In some aspects, the network architecture 2200 shown in FIG. 22 may be referred to as 'LEVEL 0' subset architecture (e.g., the observer agent 2220 may be referred to as a LEVEL 0 observer agent 2220). In this way, Level 0 observer agent 2220 can aggregate and assess the emerging ideas, insights, and sentiments across the five subgroups of this structure as the conversations progress in the five sub-group shown. This gives observer agent 2220 the ability to assess and summarize the collective sentiments across the population of 35 individuals participating in the structure shown.

Network architecture 2200 is an example of, or includes aspects of, the corresponding element described with reference to FIGS. 20, 21, 23, and 24. Subgroup 2205 is an example of, or includes aspects of, the corresponding element described with reference to FIGS. 3-6, 8, 9, 19-21, 23, and 24. Conversational surrogate agent 2210 is an example of, or includes aspects of, the corresponding element described with reference to FIGS. 2, 5, 6, 8, 9, 11, 19-21, 23, and 24. User 2215 is an example of, or includes aspects of, the corresponding element described with reference to FIGS. 1, 2, 4-6, 8, 9, 19-21, 23, and 24. Observer agent 2220 is an example of, or includes aspects of, the corresponding element described with reference to FIGS. 5, 19, 23, and 24.

Figure 23:
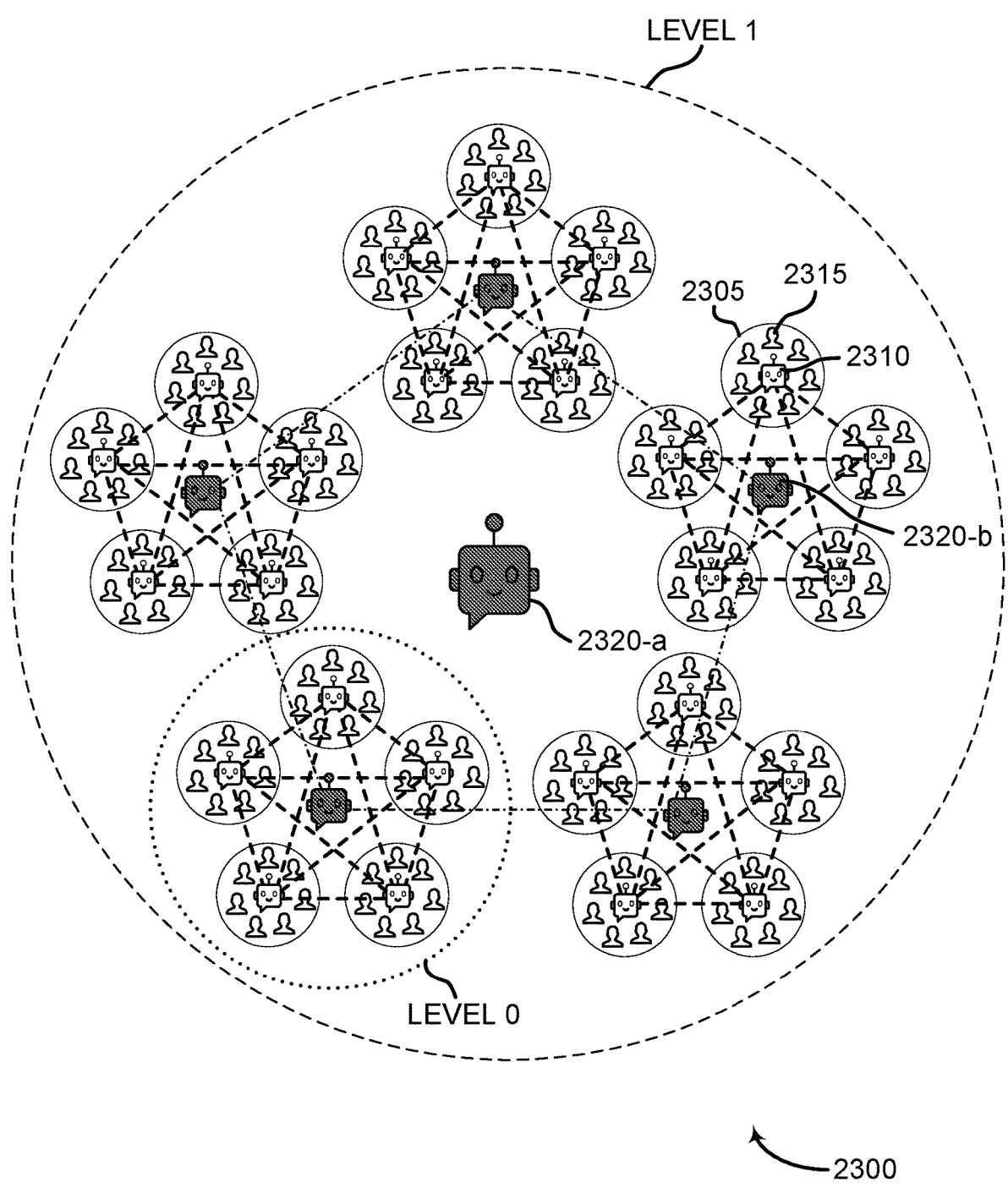

FIG. 23 shows an example of a network architecture 2300 according to aspects of the present disclosure. In one aspect, network architecture 2300 includes subgroups 2305 and observer agents 2320. In one aspect, each subgroup 2305 includes a conversational surrogate agent 2310 and one or more users 2315.

FIG. 23 shows an example network architecture 2300 according o aspects of the present disclosure. For instance, a network architecture 2300 shows an example structure of 175 users 2315 in five sets of five subgroups 2305 (e.g., or 25 total subgroups 2305) that are fully connected through bidirectional messaging among the observer agents 2320. In other words, each subgroup 2305 may have a corresponding conversational surrogate agent 2310, and each set of five subgroups 2305 (and the five corresponding conversational surrogate agents 2310) may have a corresponding observer agent 2320.

In some aspects, network architecture 2300 illustrates an example of what may be referred to as a LEVEL 1 subset (e.g., that includes five sets of LEVEL 0 subset network architectures, aspects of which are further described herein, for example, with reference to network architecture 2200 as described in FIG. 22). A higher-level observer agent 2320-a (e.g. a LEVEL 1 observer agent 2320-a) is enabled that communicates with the lower level observer agents 2320 (e.g. LEVEL 0 observer agents 2320-b), fully connected for passing insights in both directions. Moreover, each of the subset level observer agents 2320 (e.g. the LEVEL 0 observer agents 2320-b) are connected with each other for passing insights. In this way, Level 1 observer agent 2320-a can aggregate and assess the emerging ideas, insights, and sentiments across the five Level 0 structures as the conversations progress in the five Level-0 structures shown, each with 35 participants. This gives observer agent 2320-a the ability to assess and summarize the collective sentiments across the population of 175 individuals participating in the structure shown.

Network architecture 2300 is an example of, or includes aspects of, the corresponding element described with reference to FIGS. 20-22, and 24. Subgroup 2305 is an example of, or includes aspects of, the corresponding element described with reference to FIGS. 3-6, 8, 9, 19-22, and 24. Conversational surrogate agent 2310 is an example of, or includes aspects of, the corresponding element described with reference to FIGS. 2, 5, 6, 8, 9, 11, 19-22, and 24. User 2315 is an example of, or includes aspects of, the corresponding element described with reference to FIGS. 1, 2, 4-6, 8, 9, 19-22, and 24. Observer agent 2320 is an example of, or includes aspects of, the corresponding element described with reference to FIGS. 5, 19, 22, and 24.

Figure 24:
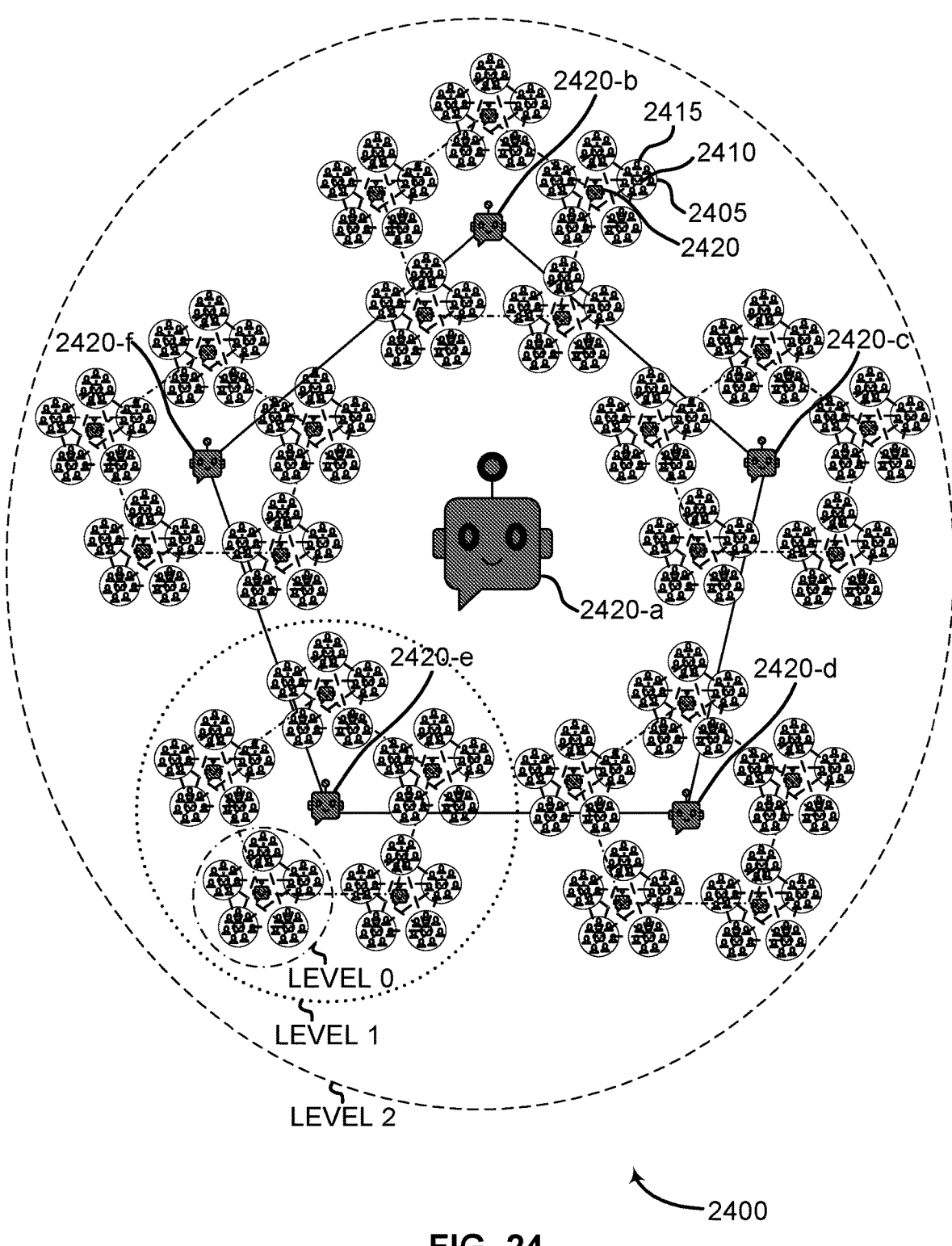

FIG. 24 shows an example of a network architecture 2400 according to aspects of the present disclosure. In one aspect, network architecture 2400 includes subgroups 2405 and observer agent 2420. In one aspect, each subgroup 2405 includes a conversational surrogate agent 2410 and one or more users 2415.

For instance, a network architecture 2400 shows an example structure of 875 users 2415. The users 2415 are in five Level 1 sets, where each level 1 set includes five level 0 sets, and each level 0 set includes five subgroups 2405. Therefore, all 125 subgroups 2415 are combined to form a higher-level of sets, resulting in 875 users being fully connected through bidirectional messaging among the observer agents 2420 within each set (within each set of five subgroups 2405). In some examples, network architecture 2400 illustrates an exemplary structure referred to as LEVEL 2 that includes five sets of LEVEL 1 network architectures (network architecture 2300 as described in FIG. 23). As described with reference to FIG. 23, each of the LEVEL 1 architecture includes five sets of LEVEL 0 network architectures (network architecture 2200 as described in FIG. 22). In this way, Level 2 observer agent 2420-*a* can aggregate and assess the emerging ideas, insights, and sentiments across the five Level 1 structures as the conversations progress in the five Level-1 structures shown, each with 175 participants. This gives observer agent 2420-*a* the ability to assess and summarize the collective sentiments across the population of 875 individuals participating in the structure shown.

For instance, a population of a large number of users 2415 may be fully connected through bidirectional messaging among global agents 2420 at the center of each subgroup 2405 (or subset). In the example network architecture 2400, users 2415 (e.g., 875 individuals) may be structured or organized into five sets of five subgroups 2405 fully connected through bidirectional messaging among the global agents 2420 at the center of each subgroup 2405. In addition, a higher-level global agent 2420-*a* is enabled that communicates with the subset level global agents (e.g., global agent 2420-*b*, global agent 2420-*c*, global agent 2420-*d*, global agent 2420-*e*, and global agent 2420-*f*), which are fully connected for passing insights in both directions. However, this is an example, and the number of subgroups, subsets, and global agents are not limited thereto.

In the example structure shown in FIG. 24 (i.e., network architecture 2400 with 875 participating users 2415), each individual user 2415 is placed in a subgroup of six users 2415 (e.g., which is well sized for real-time conversational deliberation). Each subgroup 2405 may include a conversational surrogate agent 2410 that monitors the subgroup 2405 and shares insights bidirectionally with other (e.g., similar) surrogate agents 2410 within each of five subgroups 2405. As described, the five subgroups 2405 (e.g., each of 30 users 2415) may be referred to as a LEVEL 1 SUBSET. Each LEVEL 1 SUBSET (e.g., of 175 people/users 2415) is given a global agent 2420 (e.g., global agent 2420-*b*, global agent 2420-*c*, global agent 2420-*d*, global agent 2420-*e*, and global agent 2420-*f*) that shares insights bidirectionally with similar observer agents 2420 (e.g., the other of global agent 2420-*b*, global agent 2420-*c*, global agent 2420-*d*, global agent 2420-*e*, and global agent 2420-*f*) within each of five LEVEL 1 SUBSETS. This creates a LEVEL 2 SUBSET (of 875 people/users 2415) of five LEVEL 1 SUBSETS. A LEVEL 2 observer agent 2420-*a* communicates with the five LEVEL 1 observer agents 2420 (i.e., global agent 2420-*b*, global agent 2420-*c*, global agent 2420-*d*, global agent 2420-*e*, and global agent 2420-*f*), enabling bidirectional insight passing.

Accordingly, in the example of FIG. 24, five subgroups 2405 may be referred to as LEVEL 1 SUBSETS. Each LEVEL 1 SUBSET (e.g., of 5 subgroups 2405 or 175 users 2415) is provided with an observer agent. Each LEVEL 1 observer agent shares insights bidirectionally with other LEVEL 1 observer agents within each of five LEVEL 1 SUBSETS. For instance, LEVEL 1 observer agent 2420-*b* communicates (e.g., shares insights bidirectionally) with other LEVEL 1 observer agents including observer agent 2420-*c*, observer agent 2420-*d*, observer agent 2420-*e*, and observer agent 2420-*f*. This creates a LEVEL 2 SUBSET (e.g., of 875 users 2415) of five LEVEL 1 SUBSETs. A LEVEL 2 global agent (global agent 2420-*a*) communicates with the five LEVEL 1 global agents (observer agent 2420-*b*, observer agent 2420-*c*, observer agent 2420-*d*, observer agent 2420-*e*, and observer agent 2420-*f*), enabling bidirectional insight passing.

Network architecture 2400 is an example of, or includes aspects of, the corresponding element described with reference to FIGS. 20-23. Subgroup 2405 is an example of, or includes aspects of, the corresponding element described with reference to FIGS. 3-6, 8, 9, and 19-23. Conversational surrogate agent 2410 is an example of, or includes aspects of, the corresponding element described with reference to FIGS. 2, 5, 6, 8, 9, 11, and 19-23. User 2415 is an example of, or includes aspects of, the corresponding element described with reference to FIGS. 1, 2, 4-6, 8, 9, and 19-23. Observer agent 2420 is an example of, or includes aspects of, the corresponding element described with reference to FIGS. 5, 19, 22, and 23.

The method may be extended to an even high number of users, thereby enabling exponential growth. For example, five of the structures (LEVEL 2 SUBSETs) described with reference to FIG. 24 may be connected as a LEVEL 3 SUBSET (enabling 4,375 people to communicate and pass bidirectional insight in real-time) with a global agent at center of the structure. Similarly, another level may be added, i.e., a plurality of the structures of LEVEL 3 may be combined (as described with reference to FIGS. 23-24 to a LEVEL 4 SUBSET (of 21,875 people). Embodiments are not limited thereto, and the number of users may be exponentially increased by combining the subsets at each level.

In some cases, the transmission heuristics for chatrooms that are READY TO RECEIVE and READY TO TRANSMIT may be structured such that the CONNECTION SET available for each subgroup is defined by the SUBSETS at different levels. For example, the CONNECTION SET may refer to the other groups in the same LEVEL 1 SUBSET. Additionally or alternatively, the CONNECTION SET may refer to the other subgroups in the same LEVEL 2 SUBSET. Similarly, the CONNECTION SET may refer to the other subgroups in the same LEVEL 3 SUBSET and LEVEL 4 SUBSET.

In some embodiments, the heuristics change over time such that at the a beginning of conversational deliberation, the CONNECTION SET is defined as a small set of other subgroups (for example, the LEVEL 1 subset described with reference to FIG. 24) but as the conversation continues, the CONNECTION SET is expanded to large sets of subgroups (e.g., the LEVEL 2 subset described with reference to FIG. 24). Additionally, the CONNECTION SET may be expanded to the LEVEL 3 subset and the LEVEL 4 subset.

According to some embodiments, an individual subgroup first transmits insights to one other subgroup at a time. In some cases, as the conversation continues over time, each individual subgroup may transmit to more than one subgroup upon trigger. In some embodiments, the number of subgroups that are selected to receive an insight (from the CONNECTION SET of possible subgroups) increases with strength of support (i.e., conviction, confidence, and or scope) in the insight of the subgroup.

FIG. 25 shows an example of a method 2500 for real-time communication, conversation analysis and insight extraction, according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 2505, the system observes via the computer network a conversation among members of its assigned subgroup. In some cases, the operations of this step refer to, or may be performed by, a central server or conversational surrogate agent as described with reference to FIGS. 2, 5, 6, 8-11, and 19-23.

At operation 2510, the system distills and stores content of the conversation. In some cases, the operations of this step refer to, or may be performed by, a central server or conversational surrogate agent as described with reference to FIGS. 2, 5, 6, 8-11, and 19-23.

At operation 2515, the system extracts insights from the conversation at intervals. In some cases, the operations of this step refer to, or may be performed by, a central server or conversational surrogate agent as described with reference to FIGS. 2, 5, 6, 8-11, and 19-23.

At operation 2520, the system assesses a numerical measure of conviction, confidence or scope associated with each unique insight within the conversation among the members of the assigned subgroup. In some cases, the operations of this step refer to, or may be performed by, a central server or conversational surrogate agent as described with reference to FIGS. 2, 5, 6, 8-11, and 19-23.

At operation 2525, the system stores the insights and associated numerical measures and associated members in a memory by passing data to one or more other computational processes accessible to the central server. In some cases, the operations of this step refer to, or may be performed by, a central server or conversational surrogate agent as described with reference to FIGS. 2, 5, 6, 8-11, and 19-23.

At operation 2530, the system aggregates the associated numerical measures across unique insights expressed within the assigned subgroup. In some cases, the operations of this step refer to, or may be performed by, a central server or conversational surrogate agent as described with reference to FIGS. 2, 5, 6, 8-11, and 19-23.

At operation 2535, the system passes insights to other conversational surrogate agents assigned to other subgroups, the insights being passed as language, each insight being passed along with the associated numerical measures having been aggregated. In some cases, the operations of this step refer to, or may be performed by, a central server or conversational surrogate agent as described with reference to FIGS. 2, 5, 6, 8-11, and 19-23.

At operation 2540, the system receives insights from the other conversational surrogate agents assigned to other subgroups, each insight including textual language representing the insight and aggregated numerical measures associated with the other subgroups. In some cases, the operations of this step refer to, or may be performed by, a central server or conversational surrogate agent as described with reference to FIGS. 2, 5, 6, 8-11, and 19-23.

At operation 2545, the system conversationally expresses received insights to the assigned subgroup, the expressing including modulating a strength of the textual language based on the received aggregated numerical measures. In some cases, the operations of this step refer to, or may be performed by, a central server or conversational surrogate agent as described with reference to FIGS. 2, 5, 6, 8-11, and 19-23.

Accordingly, the present disclosure includes the following aspects. Embodiments include methods and systems for enabling collective superintelligence. One or more aspects of the methods and systems include a plurality of networked computing devices associated with members of a population of participants, and networked via a computer network and a central server in communication with the plurality of networked computing devices, the central server dividing the population into a plurality of subgroups and enabling a conversational surrogate agent (CSai) associated with each subgroup, each conversational surrogate agent comprising an LLM-powered module that is assigned to a unique subgroup of the population of participants and tasked with repeatedly performing the following steps in real-time, comprising: observing via the computer network a conversation among members of its assigned subgroup, distilling and storing content of the conversation, extracting insights from the conversation at intervals, assessing a numerical measure of conviction, confidence or scope associated with each unique insight within the conversation among the members of the assigned subgroup, storing the insights and associated numerical measures and associated members in a memory by passing data to one or more other computational processes accessible to the central server, aggregating the associated numerical measures across unique insights expressed within the assigned subgroup, passing insights to other conversational surrogate agents assigned to other subgroups, the insights being passed as language, each insight being passed along with the associated numerical measures having been aggregated, receiving insights from the other conversational surrogate agents assigned to other subgroups, each insight including textual language representing the insight and aggregated numerical measures associated with the other subgroups, and conversationally expressing received insights to the assigned subgroup, the expressing including modulating a strength of the textual language based at least in part on the received aggregated numerical measures.

Some examples of the apparatus, system, and method further include the central server identifying for each of the plurality of subgroups a connection set comprising a set of other subgroups that the assigned subgroup can exchange insights with via transmission of insights, and wherein the conversational surrogate agent performs the following additional step in real time, comprising:

determining at a moment in time which insight to transmit from the assigned subgroup and which other subgroup or subgroups within the connection set will receive the insight by considering which of the other subgroups of the connection set are currently in a ready to receive state at the moment in time, wherein the determining which insight to transmit comprises determining which insight has the highest support within the assigned subgroup.

In some aspects, the determining which other subgroup or subgroups within the connection set will receive the insight further includes considering which of the other subgroups within the connection set have not yet considered the insight.

Some examples of the apparatus, system, and method further include the central server identifying for each of the plurality of subgroups a connection set comprising a set of other subgroups that the assigned subgroup can exchange insights with via transmission of insights, wherein the conversational surrogate agent periodically performs the following additional step on a prescribed period in real time, comprising: determining at a moment in time which insight to transmit from the assigned subgroup and which other subgroup or subgroups within the connection set will receive the insight by considering which of the other subgroups of the connection set are currently in a ready to receive state at the moment in time, wherein the determining which insight to transmit comprises determining which insight has the highest support within the assigned subgroup, and wherein the prescribed period varies as a function of how high support is for the insight within the assigned subgroup.

In some aspects, the determining which other subgroup or subgroups within the connection set will receive the insight further includes considering which of the other subgroups within the connection set have not yet considered the insight. In some aspects, the prescribed period shortens as a level of support increases for the insight within the assigned subgroup.

In some aspects, the conversational surrogate agent periodically performs the following additional step on a prescribed period in real time, comprising: determining at the moment in time whether to set a ready to send state as a function of whether the insight determined to transmit from the assigned subgroup is a minority opinion amongst insights for each of the plurality of subgroups.

In some aspects, the assigned subgroup will not send the determined insight to the determined subgroup or subgroups unless the ready to send state is set. In some aspects, the conversational surrogate agent periodically performs the following additional step on a prescribed period in real time, comprising: determining at the moment in time whether to set a ready to send state as a function of an amount of time since the ready to send state was set.

In some aspects, the conversational surrogate agent periodically performs the following additional step on a prescribed period in real time, comprising: determining at the moment in time whether to set a ready to send state as a function of an amount of conversational content that has been generated among members of the assigned subgroup since the ready to send state was set.

In some aspects, the conversational surrogate agent periodically performs the following additional step on a prescribed period in real time, comprising: determining at the moment in time whether to set a ready to send state as a function of whether the insight determined to transmit from the assigned subgroup has a confidence, conviction, and/or scope exceeding a prescribed threshold value. In some aspects, the determining which insight to transmit comprises determining a set of insight that have the highest support within the assigned subgroup, and randomly selecting one of the insights from the set of insights.

Some examples of the apparatus, system, and method further include the central server identifying for each of the plurality of subgroups a connection set comprising a set of other subgroups that the assigned subgroup can exchange insights with via transmission of insights, wherein the conversational surrogate agent performs the following additional steps in real time, comprising: determining at a moment in time which insight to transmit from the assigned subgroup and to which other subgroups within the connection set will receive the insight by considering which of the other subgroups of the connection set are currently in a ready to receive state at the moment in time; and selecting via a mechanism one or more the other subgroups of the connection set that are in the ready to receive state to receive the insight.

In some aspects, the mechanism comprises prioritizing for receiving the insight the one or more the other subgroups that have not yet discussed the insight. In some aspects, the mechanism comprises prioritizing for receiving the insight the one or more the other subgroups that have a lowest level of support for the insight.

In some aspects, the mechanism comprises prioritizing for receiving the insight the one or more the other subgroups that have not yet discussed the insight and in the event that there are none of the other subgroups that have not yet discussed the insights, prioritizing for receiving the insight the one or more the other subgroups that have a lowest level of support for the insight.

In some aspects, the mechanism comprises prioritizing for receiving the insight the one or more the other subgroups as a function of random selection. In some aspects, the mechanism comprises prioritizing for receiving the insight the one or more the other subgroups as a function of random selection amongst the one or more the other subgroups that have a lowest level of support for the insight.

In some aspects, the mechanism comprises prioritizing for receiving the insight the one or more the other subgroups as a function of random selection amongst the one or more the other subgroups that have a lowest level of support for the insight. In some aspects, the mechanism comprises prioritizing for receiving the insight the one or more the other subgroups as a function of random selection amongst the one or more the other subgroups that have a particular range of support levels for the insight.

Some examples of the apparatus, system, and method further include the central server identifying for each of the plurality of subgroups a connection set comprising a set of other subgroups that the assigned subgroup can exchange insights with via transmission of insights, wherein the conversational surrogate agent performs the following additional step in real time, comprising: receiving feedback on insights passed to other conversational surrogate agents assigned to the other subgroups.

In some aspects, the numerical measure of conviction, confidence or scope is calculated based on a sentiment data structure of each individual in the population of participants. In some aspects, the numerical measure of conviction is calculated as a fraction of positive sentiment directed towards each insight that has been conversationally deliberated within the assigned subgroup during a period of time.

In some aspects, the positive sentiment of an individual in an insight represents a degree to which that individual believes that insight is a good answer to a question or issue being deliberated. In some aspects, the positive sentiment is calculated and stored in real-time for each individual in the population of participants.

Some examples of the apparatus, system, and method further include a natural language processing apparatus is used to transform a batch of an individual's dialog into an estimation of a degree to which the individual supports each insight. In some aspects, the positive sentiment is calculated on a zero-centered scale, wherein a center of the scale is equivalent to not having mentioned that insight.

In some aspects, a new sentiment data structure is applied an individual's existing sentiment data structure using heuristics, comprising a combination of the following rules: (i) if the insight already exists in the existing sentiment data structure and exists in the new sentiment data structure, apply smoothing by taking a weighted average of a new sentiment value of the insight and an existing sentiment value of the insight, (ii) if the insight does not already exist in the existing sentiment data structure and exists in the new sentiment data structure, increase the existing sentiment value by some fraction of the new sentiment value, and (iii) if the insight already exists in the existing sentiment data structure and does not exist in the new sentiment data structure, apply some decay to the existing sentiment value.

In some aspects, the numerical measure of scope is calculated as a fraction of users who have mentioned or referenced the insight at least once, as identified by a natural language processing tool or a sentiment data structure. In some aspects, the numerical measure of conviction, confidence or scope is calculated at an individual level, averaged for each subgroups and reported as that subgroup's conviction, confidence or scope for each insight, or averaged over the population of participants and reported as a global conviction, confidence or scope for each insight.

In some aspects, assessing the numerical measure of conviction, confidence or scope associated with each unique insight within the conversation among the members of the assigned subgroup further comprises: assessing a numerical measure of exposure associated with each unique insight within the conversation among the members of the assigned subgroup, wherein the numerical measure of exposure is calculated as a fraction of users that an idea has been conversationally presented to, as identified by a natural language processing tool or a sentiment data structure.

Some of the functional units described in this specification have been labeled as modules, or components, to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While only a few embodiments of the disclosure have been shown and described, it will be obvious to those skilled in the art that many changes and modifications may be made thereunto without departing from the spirit and scope of the disclosure as described in the following claims.

The methods and systems described herein may be deployed in part or in whole through machines that execute computer software, program codes, and/or instructions on a processor. The disclosure may be implemented as a method on the machine(s), as a system or apparatus as part of or in relation to the machine(s), or as a computer program product embodied in a computer readable medium executing on one or more of the machines. In embodiments, the processor may be part of a server, cloud server, client, network infrastructure, mobile computing platform, stationary computing platform, or other computing platforms. A processor may be any kind of computational or processing device capable of executing program instructions, codes, binary instructions and the like, including a central processing unit (CPU), a general processing unit (GPU), a logic board, a chip (e.g., a graphics chip, a video processing chip, a data compression chip, or the like), a chipset, a controller, a system-on-chip (e.g., an RF system on chip, an AI system on chip, a video processing system on chip, or others), an integrated circuit, an application specific integrated circuit (ASIC), a field programmable gate array (FPGA), an approximate computing processor, a quantum computing processor, a parallel computing processor, a neural network processor, or other type of processor. The processor may be or may include a signal processor, digital processor, data processor, embedded processor, microprocessor or any variant such as a co-processor (math co-processor, graphic co-processor, communication co-processor, video co-processor, AI co-processor, and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache, network-attached storage, server-based storage, and the like.

A processor may include one or more cores that may enhance speed and performance of a multiprocessor. In embodiments, the process may be a dual core processor, quad core processors, other chip-level multiprocessor and the like that combine two or more independent cores (sometimes called a die).

The methods and systems described herein may be deployed in part or in whole through machines that execute computer software on various devices including a server, client, firewall, gateway, hub, router, switch, infrastructure-as-a-service, platform-as-a-service, or other such computer and/or networking hardware or system. The software may be associated with a server that may include a file server, print server, domain server, internet server, intranet server, cloud server, infrastructure-as-a-service server, platform-as-a-service server, web server, and other variants such as secondary server, host server, distributed server, failover server, backup server, server farm, and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for the execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (Saas), platform as a service (PaaS), and/or infrastructure as a service (IaaS).

The methods, program codes, and instructions described herein and elsewhere may be implemented on a cellular network with multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, 4G, 5G, LTE, EVDO, mesh, or other network types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic book readers, music players and the like. These devices may include, apart from other components, a storage medium such as flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, network-attached storage, network storage, NVME-accessible storage, PCIE connected storage, distributed storage, and the like.

The methods and systems described herein may transform physical and/or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable code using a processor capable of executing program instructions stored thereon as a monolithic software structure, as stand-alone software modules, or as modules that employ external routines, code, services, and so forth, or any combination of these, and all such implementations may be within the scope of the disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices, artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described in the disclosure may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described in the disclosure, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the devices described in the disclosure, as as well heterogeneous combinations of processors, processor architectures, or combinations of different hardware and software, or any other machine capable of executing program instructions. Computer software may employ virtualization, virtual machines, containers, dock facilities, portainers, and other capabilities.

Thus, in one aspect, methods described in the disclosure and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described in the disclosure may include any of the hardware and/or software described in the disclosure. All such permutations and combinations are intended to fall within the scope of the disclosure.

While the disclosure has been disclosed in connection with the preferred embodiments shown and described in detail, various modifications and improvements thereon will become readily apparent to those skilled in the art. Accordingly, the spirit and scope of the disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "with," "including," and "containing" are to be construed as open-ended terms (i.e., meaning "including, but not limited to,") unless otherwise noted. Recitations of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. The term "set" may include a set with a single member. No language in the specification should be construed as indicating any non-claimed element as essential to the practice of the disclosure.

While the foregoing written description enables one skilled to make and use what is considered presently to be the best mode thereof, those skilled in the art will understand and appreciate the existence of variations, combinations, and equivalents of the specific embodiment, method, and examples herein. The disclosure should therefore not be limited by the above-described embodiment, method, and examples, but by all embodiments and methods within the scope and spirit of the disclosure.

All documents referenced herein are hereby incorporated by reference as if fully set forth herein.

While the invention herein disclosed has been described by means of specific embodiments, examples and applications thereof, numerous modifications and variations could be made thereto by those skilled in the art without departing from the scope of the invention as set forth in the claims.

What is claimed is:

1. A system for real-time AI-facilitated conversation among a population of networked human participants, comprising:

a plurality of networked computing devices, each computing device running a local conversation application that is associated with a unique member of the population;

a central server in communication with the plurality of networked computing devices and connected to at least one memory and to at least one Large Language Model;

a collaboration process performed by the central server in combination with a plurality of conversation applications and the at least one Large Language Model, the process including:

assigning each unique member of the population to one of a plurality of parallel subgroups, each subgroup consisting of a unique portion of the population, configuring each conversation application to enable a real-time groupwise conversation among its associated unique member and the other members of the one of the plurality of parallel subgroups, initiating a plurality of parallel real-time conversations, each of said parallel real-time conversations among the members of a different unique subgroup, including sending a conversational prompt to the members of the different unique subgroups, monitoring the plurality of parallel real-time conversations by processing intervals of conversational dialog among the members of each conversing subgroup, said processing performed at least in part by a Large Language Model and including the following steps that are repeatedly performed for each of said subgroups:

(i) extracting one or more insights from a recent interval of dialog among the members of that subgroup, and (ii) storing a representation of each extracted insight in a memory along with an indication of at least one member of that subgroup who expressed it; and enabling insights to propagate across a plurality of parallel conversations by repeatedly performing the following steps:

(i) selecting a stored insight that was extracted from an interval of dialog among the members of a first subgroup and sending a representation of the selected insight to the local conversation applications of the members of a second subgroup, (ii) presenting a representation of said selected insight to the members of said second subgroup as conversational content displayed by the conversation applications of the members of said second subgroup, and (iii) repeatedly performing steps (i) and (ii) for a plurality of first and second subgroups during said plurality of parallel conversations.

2. The system of claim 1 wherein said interval of conversational dialog is based on elapsed conversational content within a given subgroup.

3. The system of claim 1 wherein said interval of conversational dialog is based on elapsed time.

4. The system of claim 1 wherein said monitoring further includes the following steps that are repeatedly performed for each of said subgroups:

(i) computing a numerical measure of conviction, confidence, and/or sentiment for each extracted insight in the recent interval of conversational dialog; and (ii) storing each numerical measure in a memory accessible to the central server along with an indication of the insight the numerical measure relates to.

5. The system of claim 4 wherein said computing is performed at least in part by a Large Language Model that is directed to assess a sentiment value associated with a language representation of said insight.

6. The system of claim 4 wherein said conversational content presented to said second subgroup is generated by a large language model that is instructed to modulate the strength of the expressed insight based at least in part upon a numerical measure associated with said insight.

7. The system of claim 1 wherein said enabling insights to propagate is mediated by an intelligent process that selects said second subgroup to receive said selected insight based on an assessment that the members of said second subgroup have not yet discussed said selected insight.

8. The system of claim 1 wherein said enabling insights to propagate is mediated by an intelligent process that selects said second subgroup to receive said selected insight based at least in part on an assessment that the members of said second subgroup have not yet discussed said selected insight with a sufficient level of confidence, conviction, and/or sentiment.

9. The system of claim 1 wherein said enabling insights to propagate is mediated by an intelligent process that selects said insight to send to said second subgroup based at least in part on an assessment of how much time has elapsed since that insight has been sent to another of said plurality of parallel subgroups for presentation.

10. The system of claim 1 wherein said enabling insights to propagate is mediated by an intelligent process that selects said insight to send to said second subgroup based at least in part on a numerical conviction level, confidence level, scope level, or sentiment level associated with said insight.

11. The system of claim 1 wherein said enabling insights to propagate is mediated by an intelligent process that selects said second subgroup to receive said selected insight based at least in part on an assessment said second subgroup has not received an insight from another parallel subgroup for a minimum amount of time.

12. The system of claim 1 wherein said enabling insights to propagate is mediated by an intelligent process that selects an insight extracted from said first subgroup from among a plurality of insights extracted from said first subgroup based at least in part on which of the plurality of extracted insights has the highest level of support within said first subgroup.

13. The system of claim 12 wherein said highest level of support is assessed based at least in part upon one or more numerical measures of conviction, confidence, scope, or sentiment associated with said selected insight in said first subgroup.

14. The system of claim 1 wherein said presenting a representation of said selected insight includes conveying the insight as conversational dialog integrated into the flow of the parallel conversation of said second subgroup.

15. The system of claim 14 wherein said conversational dialog is presented as text chat within the conversation applications of the members of said second subgroup.

16. The system of claim 14 wherein said conversational dialog is presented as an audio-based simulated voice within the conversation applications of the members of said second subgroup.

17. The system of claim 14 wherein said conversation application is a video conferencing application and wherein said conversational dialog is presented by an AI-generated voice and animated image of a simulated user within the video conferencing applications of the members of said second subgroup.

18. The system of claim 1 wherein said enabling insights to propagate includes a feedback process in which the members of the first subgroup from which an insight was extracted is presented with an indication of a conversational reaction that the members of said second subgroup had when presented with said insight.

19. The system of claim 18 wherein said indication is presented as dialog within a conversational flow of the parallel conversation among the first subgroup.

20. The system of claim 1 wherein said presenting a representation of said selected insight includes presenting an indication of which subgroup the insight was extracted from.

21. A method for real-time AI-facilitated conversation among a population of networked human participants, comprising:
   running a local conversation application on a plurality of networked computing devices, each associated with a unique member of the population;
   communicating with a central server connected to at least one memory and at least one Large Language Model;
   performing a collaboration process by the central server in combination with the conversation applications and the Large Language Model, including:
   assigning each unique member to one of a plurality of parallel subgroups,
   configuring each conversation application to enable real-time groupwise conversation among subgroup members,
   initiating parallel real-time conversations among subgroup members, including sending conversational prompts,
   monitoring the conversations by processing intervals of dialog using the Large Language Model, extracting insights, and storing them in memory,
   enabling insights to propagate across conversations by selecting and presenting insights to different subgroups as conversational content.

22. The method of claim 21, wherein the interval of conversational dialog is based on elapsed conversational content within a given subgroup.

23. The method of claim 21, wherein the interval of conversational dialog is based on elapsed time.

24. The method of claim 21, further including:
   computing a numerical measure of conviction, confidence, and/or sentiment for each extracted insight; and
   storing each numerical measure in memory along with the related insight.

25. The method of claim 24, wherein the computing is performed at least in part by a Large Language Model directed to assess a sentiment value associated with the insight.

26. The method of claim 24, wherein the conversational content presented to subgroups is generated by a Large Language Model instructed to modulate the strength of presented insights based on numerical measures.

27. The method of claim 21, wherein enabling insights to propagate is mediated by an intelligent process that selects subgroups based on an assessment that they have not yet discussed the selected insight.

28. The method of claim 21, wherein enabling insights to propagate is mediated by an intelligent process that selects subgroups based on an assessment that they have not yet discussed the selected insight with sufficient confidence, conviction, and/or sentiment.

29. The method of claim 21, wherein enabling insights to propagate is mediated by an intelligent process that selects insights based on the elapsed time since the insight was last sent to another subgroup.

30. The method of claim 21, wherein enabling insights to propagate is mediated by an intelligent process that selects insights based on numerical conviction, confidence, scope, or sentiment levels.

31. The method of claim 21, wherein enabling insights to propagate is mediated by an intelligent process that selects subgroups based on an assessment that they have not received an insight from another subgroup for a minimum amount of time.

32. The method of claim 21, wherein enabling insights to propagate is mediated by an intelligent process that selects insights from a plurality of extracted insights based on the highest level of support within the subgroup.

33. The method of claim 32, wherein the highest level of support is assessed based on numerical measures of conviction, confidence, scope, or sentiment.

34. The method of claim 21, wherein presenting selected insights includes conveying the insights as first person conversational dialog integrated into the flow of the conversation.

35. The method of claim 34, wherein the conversational dialog is presented as text chat within the conversation applications.

36. The method of claim 34, wherein the conversational dialog is presented as an audio-based simulated voice within the conversation applications.

37. The method of claim 34, wherein the conversation application is a video conferencing application, and the conversational dialog is presented by an AI-generated voice and animated image of a simulated user.

38. The method of claim 34, wherein enabling insights to propagate includes a feedback process in which the members of a first subgroup are presented with an indication of the conversational reaction of a second subgroup.

39. The method of claim 38, wherein the indication is presented as dialog within the conversational flow of the first subgroup.

40. The method of claim 21, wherein presenting a representation of the selected insight includes indicating which subgroup the insight was extracted from.

* * * * *